US006463438B1

United States Patent
Veltri et al.

(10) Patent No.: US 6,463,438 B1
(45) Date of Patent: Oct. 8, 2002

(54) NEURAL NETWORK FOR CELL IMAGE ANALYSIS FOR IDENTIFICATION OF ABNORMAL CELLS

(75) Inventors: Robert W. Veltri, Oklahoma City, OK (US); Kaveh Ashenayi, Tulsa, OK (US); Ying Hu, Tulsa, OK (US); Gerard J. O'Dowd, Edmond, OK (US)

(73) Assignee: Urocor, Inc., Oklahoma City, OK (US)

( * ) Notice: Subject to any disclaimer, the term of this patent is extended or adjusted under 35 U.S.C. 154(b) by 0 days.

(21) Appl. No.: 08/253,933

(22) Filed: Jun. 3, 1994

(51) Int. Cl.[7] .............................................. G06F 15/18

(52) U.S. Cl. ........................................ 707/15; 707/13

(58) Field of Search .............................. 395/22, 23, 21; 364/413.02, 413.1; 607/14; 128/736; 706/15, 16, 20, 13, 28, 31

(56) References Cited

U.S. PATENT DOCUMENTS

| | | | |
|---|---|---|---|
| 3,287,649 A | | 11/1966 | Rosenblatt ..................... 328/55 |
| 3,333,248 A | * | 7/1967 | Greenberg et al. |
| 4,447,545 A | | 5/1984 | DeFazio et al. ............. 436/518 |
| 4,660,166 A | | 4/1987 | Hopfield ..................... 364/807 |
| 4,719,591 A | | 1/1988 | Hopfield et al. ............. 364/807 |
| 4,965,725 A | * | 10/1990 | Rutenberg ................ 364/413.1 |
| 5,142,665 A | | 8/1992 | Bigus ........................... 395/21 |
| 5,251,626 A | * | 10/1993 | Nickolls et al. ............... 607/14 |
| 5,260,871 A | * | 11/1993 | Goldberg ................ 364/413.02 |
| 5,264,343 A | | 11/1993 | Krystosek et al. ............. 435/6 |
| 5,287,272 A | * | 2/1994 | Rutenberg et al. ..... 364/413.01 |
| 5,301,681 A | * | 4/1994 | Deban et al. ................ 128/736 |
| 5,331,550 A | * | 7/1994 | Stafford et al. ......... 364/413.02 |
| 5,463,548 A | * | 10/1995 | Asada et al. ........... 364/413.02 |

FOREIGN PATENT DOCUMENTS

EP 0336608 10/1989 ........... G06F/15/06

OTHER PUBLICATIONS

Revenu, et al., "An automatic system for the classification of cellular categories in cytological images," *Intelligent Robots and Computer Vision XII: Algorithms and Techniques, Proceedings of the International Society for Optical Engineering*, 2055:32–43 (1993).

Koss, L., et al., "Computer Discrimination Between Benign and Malignant Urothelial Cells," *Acta Cytologica*, vol. 19, No. 4, Jul.–Aug., 1975, pp. 378–391.

Imasato, Y., et al., "Cybest—Automated Pap Smear Pre-screener," *Toshiba Review*, No. 100, Nov.–Dec. 1975, pp. 60–63.

Pressman, N., "Markovian Analysis of Cervical Cell Images," *The Journal of Histochemistry and Cytochemistry*, vol. 24, No. 1, 1976, pp. 138–144.

Koss, L., "Application of Cytology to the Diagnosis of Urothelial Tumors," *Diagnostic Cytology and Its Histopathological Bases*, vol. 2, 3d ed., 1979, pp. 767–774.

Tanaka, N., "Cybest Model 3 Automated Cytologic Screening System for Uterine Cancer Utilizing Image Analysis Processing," *Analytical and Quantitative Cytology*, vol. 4, No. 4, Dec., 1982, pp. 279–285.

(List continued on next page.)

Primary Examiner—Sanjiv Shah
(74) Attorney, Agent, or Firm—Fulbright & Jaworski

(57) ABSTRACT

A neural network is used in a system to detect abnormalities in cells, including cancer in bladder tissue cells. The system has an image analysis system for generating data representative of imaging variables from an image of stained cells. The set of data is provided to a neural network which has been trained to detect abnormalities from known tissue cells with respect to the data from the same set of imaging variables. A conventional sigmoid-activated neural network, or alternatively, a hybrid neural network having a combination of sigmoid, gaussian and sinusoidal activation functions may be utilized. The trained neural network applies a set of weight factors obtained during training to the data to classify the unknown tissue cell as normal or abnormal.

7 Claims, 9 Drawing Sheets

OTHER PUBLICATIONS

Noguchi, Y., "Cancer–Cell Detection System on Multispectral Images," *Analytical and Quantitative Cytology*, vol. 5, No. 2, Jun., 1983, pp. 143–151.

Zajicek, G., "Image Analysis of Nucleated Red Blood Cells," *Computers and Biomedical Research*, vol. 16, 1983, pp. 347–356.

Rumelhart, D., *Parallel Distributed Processing: Explorations in the Microstructure of Cognition*, vol. 1: Foundations, Chapters 8–11, 1986.

Lippmann, R., "An Introduction to Computing with Neural Nets," *IEEE ASSP Magazine*, vol. 4., No. 2, Apr., 1987, pp. 4–22.

Melder, K., "Automated Image Analysis in the Diagnosis of Bladder Cancer," *Applied Optics*, vol. 26, No. 16, Aug., 1987, pp. 3367–3372.

Fukushima, K., "Self–organizing Neural Network Models for Visual Pattern Recognition," *Acta Neurochirurgica*, Suppl. 41, 51–67, 1987.

Egbert, D., "Preprocessing of Biomedical Images for Neurocomputer Analysis," IEEE International Conference on Neural Networks, Jul. 24–27, 1988, pp. I–561—I–568.

Dayhoff, R., et al., "Segmentation of True Color Microscopic Images Using a Back Propagation Neural Network," *Neural Networks*, vol. 1, No. 1 Supp., 1988, p. 169.

Rennie, J., "Cancer Catcher: Neural Net Catches Errors that Slip Through Pap Tests," *Scientific American*, vol. 262, No. 5, May, 1990, p. 84.

Goldberg, V., "Predictability Considerations in Backpropagation Network Design for Breast Cancer Diagnosis," Proceedings of the IASTED International Symposium, Computers and Advanced Technology in Medicine, Healthcare and Bioengineering, Aug. 15–17, 1990, pp. 54–55.

Vogh, Jr., J., "A Modified Perception Capable of Forming Multiple Decision Boundaries," Master's Thesis, Chapters 1–4, The University of Tulsa, 1990.

Koss, L., "Image Cytophotometry and Flow Cytometry," *Diagnostic Flow Cytometry*, 1991, pp. 147–163.

Luck, R., et al., "PAPNET™: An Automated Cytology Screener Using Image Processing and Neural Networks," 20th AIPR Workshop, "Computer Vision Applications: Meeting the Challenges," Oct. 17–18, 1991, pp. 161–171.

Moallemi, C., "Classifying Cells for Cancer Diagnosis Using Neural Networks," *IEEE Expert*, vol. 6, No. 6, Dec., 1991, pp. 8–12.

Ashenayi, K., "Gaussian Perceptron Capable of Classifying "2N+1" Distinct Classes of Input Patterns," *Control and Computers*, vol. 20, No. 2, 1992, pp. 54–59.

Nazi, G., "Application of Artificial Neural Networks to Pump Cards Diagnosis," Master's Thesis, Chapters 6–9, The University of Tulsa, 1992.

Ashenayi, K., et al., "Multiple Threshold Perceptron Using Sinusoidal Function," *International Journal of Modelling & Simulation*, vol. 12, No. 1, 1992, pp. 22–26.

Malet, P., et al., "Chromosome Analysis by Image Processing in a Computerized Environment; Clinical Applications," *Journal of Radiation Research*, vol. 33 Suppl., Mar., 1992, pp. 171–188.

Wu, Y., et al., "Artificial Neural Networks in Mammography: Application to Decision Making in the Diagnosis of Breast Cancer," *Radiology*, vol. 187, No. 1, Apr., 1993, pp. 81–87.

Reed, T., et al., "A Review of Recent Texture Segmentation and Feature Extraction Techniques," *CPGIP: Image Understanding*, vol. 57, No. 3, May, 1993, pp. 359–372.

Bostock, R., et al., "Towards a Neural Network Based System for Skin Cancer Diagnosis," Third International Conference on Artificial Neural Networks, May 25–27, 1993, pp. 215–219.

Tsai, D., et al., "Breast Tumor Classification by Neural Networks Fed with Sequential–Dependence Factors to the Input Layer," *IEICE Transactions on Information and Systems*, vol. E76–D, No. 8, Aug., 1993, pp. 956–962.

Irinopoulou, T., et al., "Toward Objective Prognostic Grading of Prostatic Carcinoma Using Image Analysis," *Analytical and Quantitative Cytology and Histology*, vol. 15, No. 5, Oct., 1993, pp. 341–344.

Christen, R., et al., "Chromatin Texture Features in Hematoxylin and Eosin–Stained Prostate Tissue," *Analytical and Quantitative Cytology and Histology*, vol. 15, No. 6, Dec., 1993, pp. 383–388.

* cited by examiner

Sinusoidal Training Flow Chart

Gaussian Training Flow Chart

NEURAL NETWORK FOR CELL IMAGE ANALYSIS FOR IDENTIFICATION OF ABNORMAL CELLS

TECHNICAL FIELD OF THE INVENTION

The present invention relates, in general, to automated image recognition, and more particularly, to a neural network-based image recognition system for cancerous tissue cell detection.

BACKGROUND OF THE INVENTION

Bladder cancer is among one of the top causes of cancer-related deaths in the United States. In 1993, approximately 52,000 cases of bladder cancer were reported in the United States and 10,000 deaths were attributed to this disease. Early detection is essential in minimizing the risks involved with bladder cancer. The detection of bladder cancer is traditionally performed through cystoscopy, through the quantitation of plasma components of urine, or through detailed analysis of stained bladder cells obtained from urine or from a bladder wash.

Cystoscopy is the visual inspection of the bladder using a fiber optic device. Normally performed by a urologist, cystoscopy is discomforting to the patient and exposes the patient to the risks and costs associated with surgery. Further, cystoscopy only detects cancerous cells after the tumor has progressed to an advanced stage.

Significant progress in the detection and isolation of bladder tumor specific antigens has linked bladder cancer with an elevation of normal protein components in the plasma or urine of cancer patients. Thus, bladder cancer may be detected by identifying the abnormal presence of materials in the bladder cells. Since these tests are non-invasive, they could be routinely utilized to test those in high risk groups for early symptoms of bladder cancer. However, an approach using serum and plasma related components in urine appears to have limited usefulness in the early detection of bladder cancer as many of these identical components are also present in increased concentrations in urine from patients with non-neoplastic disease.

Another promising approach involves the analysis of bladder cells obtained from urine or a bladder wash. In this process, bladder cells are extracted from urine or a bladder wash. They are then prepared using conventional staining techniques such as the Papanicolaou technique for highlighting the region of interests in the sample cells. Conventionally, these cells are visually inspected for signs of cancer. Typically, after a cyto-technician has screened the sample cells, the final diagnostic is performed by an expert cytopathologist. This process is labor intensive because it requires exhausting inspection of thousands of cells. Naturally, the tedium and fatigue imposed upon the technician and the cytopathologist result in a high false negative rate.

Due to the vast amount of data to be processed, automation of the bladder cancer cell detection process is quite desirable. Various techniques have been proposed for the automated detection of cancer. Predominately, these prior attempts have relied on techniques such as feature extraction, template matching and other statistical or algorithmic methods. For instance, Melder and Koss described a decision tree representing the hierarchical classification scheme to classify extracted features from the triage of objects encountered in the urinary sediment. Karl K. Melder & Leopold G. Koss, "Automated Image Analysis in the Diagnosis of Bladder Cancer," 26 Applied Optics 16, 3367 (1987). Melder and Koss discussed the use of step-wise linear discriminant analysis in which features were automatically selected for the discriminant functions based on the pooled covariance matrix of more than sixty (60) cell features. Christen, et al., discussed the application of a linear discriminant model from the SPSS/PC+ statistical package to the classification of cancerous cells. Christen, et al., "Chromatin Texture Features in Hematoxylin and Eosin-Stained Prostate Tissue," 16 Analytical and Quantitative Cytology and Histology, 16, 383 (1993).

Recently, artificial neural networks have been applied to the cancer detection process. This step is a logical extension of the pattern recognition capability of artificial neural networks. Kunihiko Fukushima, "Neural Network Model for Selective Attention in Visual Pattern Recognition and Associative Recall," 26 Applied Optics 23, 4985 (1987); Dwight D. Egbert, et al., "Preprocessing of Biomedical Images for Neurocomputer Analysis," IEEE Int'l Conference on Neural Networks I-561 (Jul. 24–27, 1988).

A variety of neural network topologies have been experimented with. By way of illustration, some of these neural network models include the Perceptron, described in U.S. Pat. No. 3,287,649 issued to F. Rosenblatt and further described in M. Minsky and S. Papert, "Perceptrons, An Introduction to Computational Geometry," (MIT Press 1988); the Hopfield Net, described in U.S. Pat. Nos. 4,660, 166 and 4,719,591 issued to J. Hopfield; "The Hamming Network and Kohonen Self-Organizing Maps," described in R. Lippman, "An Introduction to Computing with Neural Nets," IEEE ASSP Magazine, April 1987 at 4–22; D. E. Rumelhart, G. E. Hinton and R. J. Williams, "Learning Internal Representations by Error Propagation," in 1 Parallel Distributed Processing 318–362 (D. E. Rumelhart, et al. eds., 1986); and G. O. Stone, "An Analysis of the Delta Rule and the Learning of Statistical Associations," in 1 Parallel Distributed Processing 444–459 (D. E. Rumelhart, et al. eds., 1986).

A particularly robust type of neural network is referred to as the back-propagation network. The training process for back-propagation type neural networks starts by modifying the weights at the output layer. Once the weights in the output layer have been altered, they can act as targets for the outputs of the hidden layer, changing the weights in the hidden layer following the same procedure as above. This way the corrections are back-propagated to eventually reach the input layer. After reaching the input layer, a new test is entered and forward propagation takes place again. This process is repeated until either a preselected allowable error is achieved or a maximum number of training- cycles has been executed.

Due to the sheer number of computational cycles in the training process, the computation of the activation function is crucial to the performance of the neural network. A traditional back-propagation neural network utilizes the non-linear sigmoid function as the activation function in its neurons. The effectiveness of traditional back-propagation neural networks is limited by the fact that the training procedure does not guarantee convergence to the global minima.

Traditional back-propagation neural networks have been applied to bladder cells in Ciamac Moallemi, "Classifying Cells for Cancer Diagnosis Using Neural Network," 6 IEEE Expert 6, 8 (1991). Moallemi describes the application of a conventional neural network in the classification of noisy particles versus cell images, including cancerous and noncancerous bladder cells. However, Moallemi does not teach the detection of malignant cells using a neural network.

The application of neural networks to the classification of cytological specimens is discussed in U.S. Pat. No. 4,965,725 to Rutenberg. Rutenberg describes the use of a two-staged classifier system. The first classifier is a statistical classifier which identifies cell nuclei of interest by measurement of their integrated optical density, or nuclear stain density, defined as the sum of the pixel gray values for the object. Rutenberg discloses that, compared to normal cells, malignant cells tend to possess a larger, more densely staining nucleus. Based on the data provided by the primary classifier, Rutenberg further employs a neural network as a secondary classifier for evaluating the nucleus and its surrounding cytoplasm based on the observation that the ratio between the nucleus and the cytoplasm is an important indicator for malignant cell classification. However, Rutenberg does not utilize other predictive information such as the pgDNA value of a cell.

One limitation with conventional back-propagation network is that it imposes considerable computational demands under its iterative gradient descent method. With the number of training cycles often numbering into the tens and hundreds of thousands for moderately complex problems, the usefulness of a neural network trained according to conventional methodology is limited. For instance, the training of Moallemi's neural network required a few hours on the Convex C-120, a mini-supercomputer. Additionally, conventional back-propagation neural networks have difficulty adjusting their learning rate, defined as the step-size taken along the path of steepest descent (i.e., the gradient vector) or other path of convergence to arrive at a local minimum.

Despite the above-described applications of neural networks to analyze biological samples, a need exists for a neural network that can be trained relatively rapidly using commonly available computers. There exists a current need for an improved gradient descent learning method that can more quickly find a global or local minimum for a given gradient vector and additionally adjust the gradient vector after identifying a ravine. Other inefficiencies are also present in conventional training methods which relate to the speed at which the set of weighting factors converge at the desired result, as will be described in further detail below.

SUMMARY OF THE INVENTION

In accordance with one aspect of the invention, a system is disclosed for self-adaptively and robustly distinguishing normal from abnormal tissue cells.

In accordance with a further aspect of the invention, a urological cancer detection system using a neural network is disclosed.

In accordance with yet another aspect of the invention, a system is disclosed for applying a neural network having a combination of activation functions, among them gaussian, sigmoid and sinusoid functions.

In accordance with yet another aspect of the invention, a cancer detection system using a rapidly trained neural network is disclosed.

In accordance with yet another aspect of the invention, a neural network is provided which detects cancerous cells by analyzing raw images of the cell and providing the imaging information derived from the pixels of the images to a neural network.

In accordance with yet another aspect of the invention, a neural network is provided which performs recognition of cancerous cells using information derived from an image of the cells, among others, the area, the average intensity, the shape, the texture, and the DNA content (pgDNA) of the cells.

In accordance with yet another aspect of the invention, a neural network is provided which performs such recognition of cancerous cells using textural information derived from an image of the cells, among them angular second moment, contrast, coefficient of correlation, sum of squares, difference moment, inverse difference moment, sum average, sum variance, sum entropy, entry, difference variance, difference entropy, information measures, maximal correlation coefficient, coefficient of variation, peak transition probability, diagonal variance, diagonal moment, second diagonal moment, product moment, triangular symmetry 11 and blobness.

These and other objects, advantages and features of the present invention will become evident to those of ordinary skill in the art after having read the following detailed description of the preferred embodiment. Other objects and advantages of the invention will be apparent to one skilled in the art having reference to the specification in conjunction with the drawings of the present invention.

DETAILED DESCRIPTION

Figure 1:
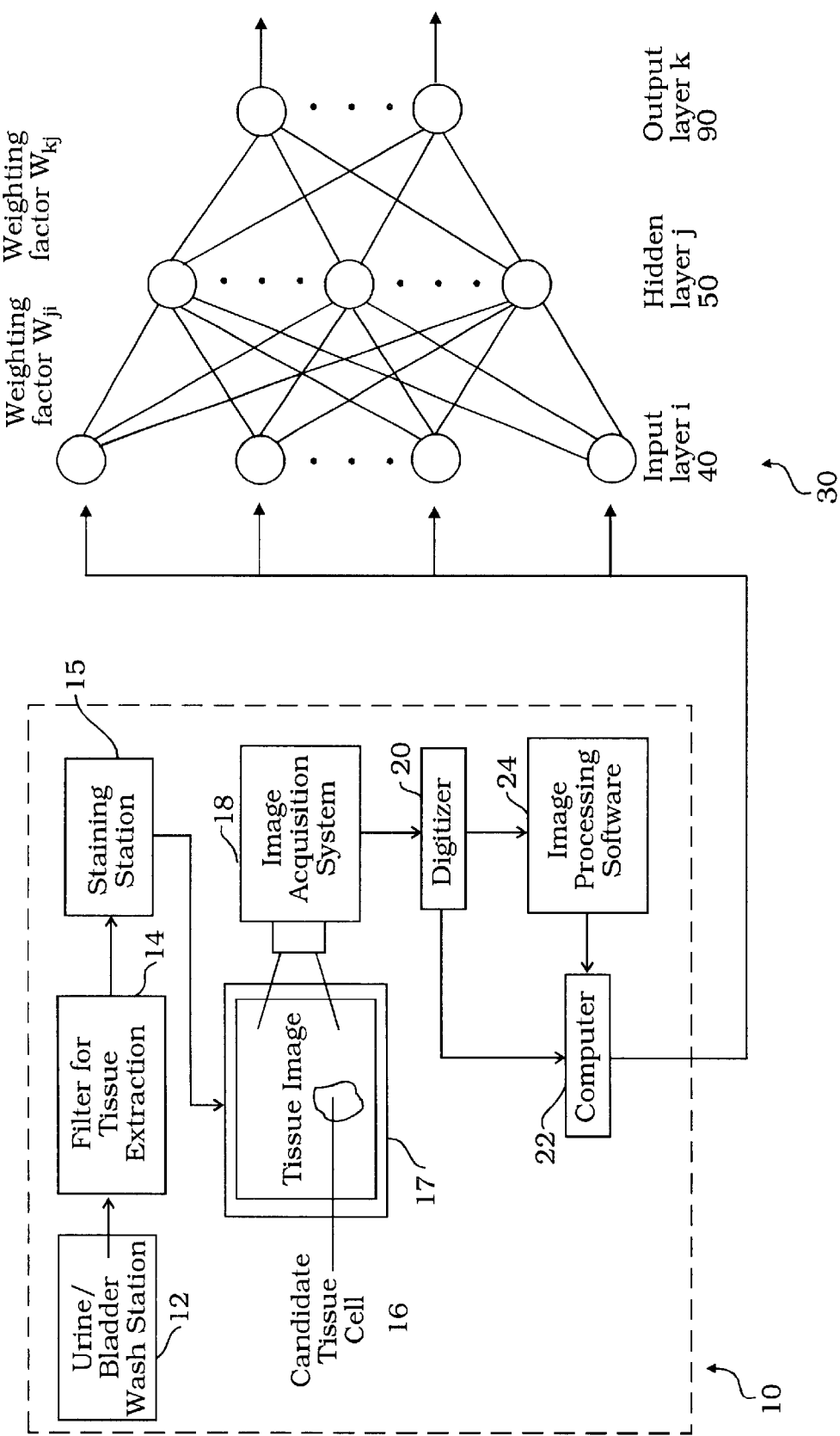
FIG. 1 is a diagram of the first embodiment of the present invention.

FIG. 1 illustrates the image analysis 10 of the present invention. Initially, extracted unknown tissue cells are obtained from patients either from urine or a bladder wash. The urine or bladder wash at station 12 is poured through a urine/bladder wash filter 14 and cells are collected on the filter. The cells from wash filter 14 are placed on a slide 17 treated with poly-L-lysine and pressed gently to transfer cells to the slide as an imprint. The cells may also be placed on slides by means of a cytocentrifuge to ensure a reasonably flat distribution of cells with relatively few overlaps.

These samples then are stained to make the cellular region of interest 16 more detectable. The Feulgen staining procedure is utilized in the present invention. The Feulgen procedure specifically stains the DNA contents based upon a hydrolysis of nucleic acid and subsequent Schiff-based reaction with free aldehyde groups on the nucleic acid. The amount of Feulgen stain bound to the DNA is stoichiometrically related to the concentration of the DNA present in the sample cells.

One modification of the Feulgen procedure is to combine it with an immuno-stain such as the M-344 antibody which permits an analysis of the nuclear DNA features in the Feulgen stain and then perform a bio-marker quantitation by an enzyme-immuno staining procedure. The Feulgen procedure can be combined with the M-344 method by placing of the slides in 5N HCl for an hour at room temperature. The slides are then placed in a stirred Feulgen stain solution for one hour at room temperature. The slides are rinsed with a Feulgen rinse solution and subsequently with water. Finally, the slides are destained in 1% acid alcohol for five minutes. Variations of this basic Feulgen staining procedure for bladder cytologies may be employed.

In addition to the described Feulgen procedure for staining cells, other cell identification procedures may be utilized as well. For instance, combined biochemical staining of the DNA (Feulgen stain) with specific immunochemical stains for oncogenes, tumor suppressor genes, and tumor associated antigens is an alternative staining procedure, as described in J. S. Coon and R. S. Weinstein, "Diagnostic Flow Cytometry," pp. 151–153 (Williams & Wilkins 1991). Another common staining procedure, the Papanicolaou process, can be used to stain the entire cell differentially for nuclear and cytoplasmic characteristics.

EXAMPLE 1

Preparation of Slide Imprints for M-344, DNA, and Cytology

For M-344, DNA and cytology analysis, slide imprints were prepared from fixed urine by first filtering the urine through membrane filters and then transferring the bladder cells from the filter onto a slide treated with poly-L-lysine. To filter urine specimens, two types of 25 mm polycarbonate membrane filters (Millipore, Milford, Mass.) were used: 5 micron for transparent or translucent specimens and 10 micron for turbid or bloody specimens. After mixing a urine specimen by shaking thoroughly for about ten seconds, an aliquot of the specimen was poured into a Millipore filtering apparatus containing the appropriate polycarbonate membrane filter, and a gentle vacuum was applied. While adjusting the vacuum to avoid taking the membrane filter to dryness, the specimen was added in small increments until the correct volume of urine had been filtered. If the specimen contained crystals which interfered with filtration, an equal volume of MOPSO/EDTA (3-(N-morpholino)-2-hydroxypropanesulfonic acid/ethylenediaminetetraacetic acid) (Sigma Chemical Co., St. Louis, Mo.) buffer was added to dilute the specimen, dissolve the crystals, and facilitate filtration. About 10–15 mL of an appropriate buffer was then added to rinse the funnel and membrane filter, and the vacuum was broken when approximately 2 mm of liquid was left on the membrane filter. Labeled slides, which had been pretreated with poly-L-lysine slide adhesive, were prepared by placing a drop (approximately 10 $\mu$L) of an appropriate buffer such as MOPSO/EDTA (Sigma) or Automation buffer (Biomeda Corp., Foster City, Calif.) at the desired location on the slide. The filtering apparatus was disassembled, and the membrane filter was placed filter-surface downward directly upon a drop of buffer on the poly-L-lysine treated slide. By rolling lint-free paper toweling in a continuous, gentle pressing motion over the membrane filter, the bladder cells were transferred from the filter to the surface of the slide. The resulting imprint was then fixed or dried.

EXAMPLE 2

M-344/Feulgen Staining Procedure for Bladder Cytologies

To measure DNA content and to highlight the M-344 tumor marker, which is expressed preferentially by low-grade bladder cancer cells, a combined M-344/Feulgen staining procedure was employed.

The Feulgen stain solution was prepared by adding to 90 ml Type 1 water (filtered to a resistance of 16 MOhms-cm) 10 ml of 1 N HCl and 1 vial of DNA stain reagent (Cell Analysis Systems, Elmhurst, Ill.), stirring the solution for at least one hour and filtering through Whatman No. 1 filter paper immediately before staining.

The Feulgen rinse solution was prepared immediately before rinsing by adding to 285 ml Type 1 water 15 ml of 1 N HCl and 1 vial of DNA rinse reagent (Cell Analysis Systems, Elmhurst, Ill.).

Control CAS calibration slides were fixed in 10% neutral buffered formalin for 30 minutes at room temperature and then rinsed in running deionized water for five minutes.

Both the CAS calibration slides and specimen slides were placed in 5N HCl for one hour at room temperature and then placed in a stirring Feulgen stain solution for one hour at room temperature. The slides were rinsed at room temperature in fresh batches of Feulgen rinse solution for 30, 5, and 10 minutes, respectively, and then rinsed in running water for five minutes. The slides were destained in 1 acid alcohol (700 ml Flex 95 (Richard Allan Medical, Richland, Mich.) and 10 ml 12 N HCl in 290 ml Type I water) for five minutes at room temperature.

Coverslips were applied to CAS calibration slides by dipping the slides in 95% ethanol ten times, in absolute ethanol 30 times, and in xylene twenty times. Coverslips were then applied using either a toluene or xylene based mounting media.

Specimen slides were then immunostained for M-344 using an alkaline phosphatase strepavidin-biotin assay at room temperature. The slides were first incubated with 20%. (v/v) normal rabbit serum diluted in Automation buffer (Biomeda Corp.) for twenty minutes. The slides were then incubated for one hour with the primary antibody solution of M-344 diluted (1:80) in a solution of 100 $\mu$l normal rabbit serum and 888 $\mu$l Automation buffer. The M-344 antibody was prepared according to the procedure found in U.S. Pat. No. 5,039,611 issued Aug. 13, 1991 to Yves Fradet entitled "Monoclonal Antibodies to Superficial Papillary Bladder Tumor Cells," herein incorporated by reference. After washing for ten seconds with Automation buffer, the slides were incubated with the secondary antibody, biotinylated rabbit $\alpha$-mouse IgG diluted 1:200 in a solution of 100 $\mu$l normal rabbit serum and 895 $\mu$l Automation buffer for thirty minutes. After washing with Automation buffer for ten seconds, the slides were incubated for thirty minutes with strepavidin alkaline phosphatase diluted (1:200) in a solution of 100 $\mu$l normal rabbit serum and 895 $\mu$l Automation buffer. The slides were washed for ten seconds in Automation buffer followed by staining with CAS Red Chromogen solution (Cell Analysis Systems) for twelve minutes and Type 1 water for one minute.

EXAMPLE 3

Papanicolaou Stain Procedure

Using the Papanicolaou staining procedure, the nuclei of bladder cells were stained dark purple in contrast to remaining cellular material staining yellowish green.

Bladder cells were obtained from filtered urine or bladder wash and slide imprints were prepared as described in Example 1. Scott's tap water was prepared by suspending 80 g magnesium sulfate and 16 g sodium bicarbonate in 8 liters of deionized water. Instant hematoxylin (Shandon Scientific, Inc., Cheshire WA7 1PR, England) was prepared by mixing Containers A and B provided by the manufacturer and incubating at room temperature for at least 12 hours prior to use. The nuclei of the cells were stained using the Papanicolaou (PAP) stain technique using the following schedule: 95% ethanol, 10 dips; 95% ethanol, 10 dips; deionized water, 10 dips; hematoxylin, 45 seconds; deionized water, 10 dips; deionized water, 10 dips; Scott's tap water, 1 minute; deionized water, 10 dips; 95% ethanol, 10 dips; 95% ethanol, 10 dips; 95% ethanol, 10 dips; OG-6 (Harleco), 4 minutes; 95% ethanol, 10 dips; 95% ethanol, 10 dips; 95% ethanol, 10 dips; EA-50 (Harleco), 1.5 minutes; 95% ethanol, 10 dips; 95% ethanol, 10 dips; 100 ethanol, 10 dips; 100% ethanol, 10 dips; ethanol/xylene (50%/50%), 10 dips; xylene, 10 dips; xylene, 10 dips; and xylene, 10 dips.

Analysis of Cells

After the cells have been chemically prepared, the first stage in the analysis of tissue cells for signs of cancer is the cell image acquisition in which the image of the sample tissue cell is digitized and separated from its background. The operation of the image analysis system 10 is described in more detail below.

After the cells have been chemically prepared, an image of the region of interest 16 of the slide 17 containing the sample cells is captured and converted into data files using image acquisition system 18. Essentially, the slide 17 containing the sample cells is illuminated and a video camera in image acquisition 18 is focused on the chosen area in such a way that the frame occupies a maximal area of the screen of a monitor connected to the camera output. The output of the video camera is connected to a video digitizer 20, which converts the video encoding of an image into a raster (bit-mapped) format that can be processed by a computer.

In one preferred embodiment, the CAS-200 RTM image analysis hardware and software (available from Cell Image Systems, Elmhurst, Ill.) provides intensity information (at 8 bits per pixel) and a 256×256 pixel image, with a resolution of approximately 0.3 micron to 0.5 micron per pixel and a 229 gray scale resolution. In another preferred embodiment, the Zeiss-IBAS RTM rapid scanning image analysis system (available from Roche Image Analysis Systems) provides a 1280×1024 image, with a 255 gray scale capability.

Because the conversion equipment alters the horizontal scale factor, in order to restore the aspect ratio distortion to 1:1, the original images are expanded horizontally by a factor of 1.78. After the aspect image ratio distortion correction, the cell images are tailored into an array of pixel images. The cell images are centrally aligned in this area. In the case of a large image, the image is clipped to fit into the given cell size within the boundary.

In this manner, three sets of bladder cell images were obtained for classification by the neural network. Two sets of images were fluorescent-labeled with the M-344 monoclonal antibody directed against a p300 bladder tumor associated antigen demonstrated to have clinical utility in identifying low grade bladder cancer cells in cytology specimens. One set of sixty (60) M-344 cell images were obtained at 32× in a 60×60 pixel array and included positive and false-positive images. The second set of eight hundred (800) M-344 cell images were collected at 12.5× magnification. Both sets of M-344 images were collected using an automated Zeiss-IBAS rapid scanning image analysis system. The third set of images covered the absorbance set of 467 cell images taken at 40×magnifications of Feulgen stained cells. Images of the third set were captured using the CAS-200 image analysis system.

In pattern recognition, only discriminate information contributes to correct classification, while information unrelated to the identification process does not and may even degrade performance. To reduce the input data and to focus the neural network on relevant variables, a pre-processing step is applied to extract cellular features from the raw image. Feature generation processing is used to extract information on the area, average intensity, shape (roundness), texture and pgDNA values. In the preferred embodiment, an image analysis system 10 is used to extract the list of imaging variables from the digitized images. These imaging variables are stored in an input vector consisting of the following:

Area

One of the significant differences between cancerous and normal cells is the area of the cell. Benign cells come in a small range of sizes, typically 100 to 400 pixels. Malignant cells, in contrast, can be detected as simply being too big or too small. Area is calculated by integrating the pixels underneath the cell outline.

Average Intensity

The average intensity is computed as:

$$I_x = \frac{\sum_{(i,j) \in \text{cell } x} G(i, j)}{\text{Area}}$$

Shape (Roundness)

Clinical experience has shown that most cancer cells exhibit irregular shapes while most healthy cells have an almost round shape. Thus, the roundness of the cell is a simple and effective discriminate feature. Shape factor is calculated as:

$$\text{Shape Factor} = \frac{\text{Perimeter}^2}{\text{Area}}$$

An ideal circle will give a shape factor of $4\pi$, while any shape other than a circle will produce a value greater than $4\pi$. Alternatively, the shape factor can be calculated as:

$$\text{Shape Factor} = \sqrt{\frac{\text{Perimeter}^2}{4\pi * \text{Area}}}$$

Texture

Texture describes the interdependent characteristics of pixels within a neighboring area. Regular texture has more or less periodical patterns, while random texture is best described by its "coarseness." In the preferred embodiment, texture is measured by a convolution using a 3×3 mask for extracting high frequency information (high pass filtering) from an image. The mask resembles a Laplacian kernel, commonly used for edge sharpening. Preferably, the filter G has a convolution mask of:

$$\begin{matrix} -1 & -1 & -1 \\ -1 & 8 & -1 \\ -1 & -1 & -1 \end{matrix}$$

This convolution mask is applied across every pixel in the interior area of a cell image, not including background. The texture for a particular cell can be obtained as follows:

$$T_x = \frac{\sum_{(i,j) \in \text{cell} x} O(i, j)}{\text{Area}} = \frac{\sum_{(i,j) \in \text{cell} x} \left(8G(i, j) - \sum_{(k,l) \in \pi} G(k, l)\right)^2}{\text{Area}}$$

where O(i,j) is the convolution output at location (i,j) on a cell image. G(i,j) corresponds to the intensity value at the location (i,j). π represents the 8 neighboring locations of (i,j).

Further, as only texture information of the cell surface is of interest, the high frequency information on the boundary between cell and background (zero pixel value) should be avoided. This step can be done by modifying the above equation to mask out the boundary regions:

$$T_x = \frac{\sum_{(i,j) \in \text{cell} x} O(i, j)}{\text{Area}} = \frac{\sum_{(i,j) \in \text{cell} x} \left(S \times G(i, j) - \sum_{(k,l) \in \pi} G(k, l)\right)^2}{\text{Area}}$$

where π represents the non-zero pixels in the 3×3 neighborhood region of (i,j) and S is the number of non-zero neighboring pixels in this neighboring region.

Although one particular texture feature has been described, other texture-related features can also be used. As discussed in Christen, et al. alternative texture-related parameters include: angular second moment, contrast, coefficient of correlation, sum of squares, difference movement, inverse difference moment, sum average, sum variance, sum entropy, entry, difference variance, difference entropy, information measures, maximal correlation coefficient, coefficient of variation, peak transition of probability, diagonal variance, diagonal moment, second diagonal moment, product moment, triangular symmetry, and blobness. See, N. J. Pressman, Markovian Analysis of Cervical Cell Imatges. J. Histochem. Cytochem. 1976; 24:138–144. In addition, texture-related features may be computed to include the first, second, third and fourth cell neighbors.

In one embodiment, twenty-one nuclear descriptions based upon the gray-level transition probabilities of Feulgen stained nuclei are provided by the CAS System. The CAS constructs a "Markovian" matrix from a normalized cell nucleus image using an operator selected step size ranging from 1 pixel to 254 pixels. The step size defines the size of the "grain" (in number of pixels) which is to be compared to the neighboring "grains". The default step size in the CAS System is 1 pixel, which was the step size used (i.e. every grain is equal to 1 pixel). In addition, each cell nucleus image is normalized by partitioning the image into eight equally frequent gray-levels, each level consisting of an equal number of pixels. This normalization process is done by first plotting the optical densities (gray-levels) above the operator set threshold against the number of pixels. This plot is divided into eight gray-level ranges (optical density ranges) which contain an equal number of pixels. This results in a normalized cell nucleus image consisting of gray-level values from 0–7.

An 8×8 gray-level transition matrix is constructed from the normalized cell nucleus image by comparing the gray-levels of neighboring "grains" (i.e. if a given "grain" has a normalized value of 4, and its neighboring "grain" has a normalized value of 3, an entry in the matrix is made at location Row-r and Column-3). This matrix is then transformed into an 8×8 conditioned gray-level transition probability matrix by dividing every matrix entry by the total number of pixels in the cell nucleus image. This "Markovian" probability matrix is then used to compute the plurality of Markovian texture features.

8×8 Conditional Gray-Level Transition-Probability Matrix ("Markovian" matrix):

$$M = \begin{vmatrix} P_L(0/0) & P_L(0/1) & \ldots & P_L(0/7) \\ P_L(1/0) & P_L(1/1) & \ldots & P_L(1/7) \\ \vdots & \vdots & \vdots & \vdots \\ P_L(7/0) & P_L(7/1) & \ldots & P_L(7/7) \end{vmatrix}$$

Where each matrix element $P_L(i/j)$ is defined as the conditional probability of gray-level i occurring L "grains" after gray-level j occurs, where L is defined as the step size. pgDNA The pixel measurements within the cell object, if properly calibrated to represent optical density, relate the resulting values to such cell constituents such as the total amount of DNA in nucleated cells, the amount of monoclonal antibody attached to nuclear or cytoplasmic receptor cites, etc. In the instant invention, the measurements are calibrated to reflect the mass in picograms of these cell constituents. The DNA measurements are carried out on Feulgen stained preparations using optical density at a wavelength of 620 nm and with 256 gray scale levels.

Each digitized image field may be described as a function n(x,y), where each value is a measured point of absorbance obeying the Beer-Lambert absorption law:

$$n(x, y) = \log \frac{I_o}{I_t} = \frac{\epsilon_{\lambda b} m}{a},$$

where $I_o$ is the incident light, $I_t$ is the transmitted light, $\epsilon$ is the specific extinction coefficient of the absorbing substance ($\mu m^2/pg$) at a chosen wavelength ($\lambda$) and with a specific bandpass (b), m is the mass of the absorbing substance in picograms (pg) for each x,y image field measurement point inside the object or cell, and a is the measurement spot size in ($\mu m^2$). Assuming the boundary points have been properly determined for a single cell in the field of view, where the summation occurs only over the cell or cell part of interest, $$M = \frac{a}{\epsilon_{\lambda b}} \sum_x \sum_y n(x, y)$$

defines the measurement of the total mass for that cell or cell part. Sometimes $a(\epsilon_{\lambda b})$ is determined as an experimental constant for a particular instrument, e.g., if $\epsilon_{\lambda b}$ is not known exactly, or depends on a chromophore from a staining reaction which changes from time to time.

Converting from transmitted light to optical density is necessary because the thickness of the object cells, or cell parts, can vary. This causes the light transmitted through any individual pixel to fall off exponentially as a function of the object thickness. The logarithm of the transmitted light converts this exponential function to a linear function and properly allows the summation of the pixels, whether they result from a part of the cell that is thinly spread or thickly condensed.

After the features have been extracted from images cell by cell, computer 22 creates a feature vector data list. Items on the feature list are then normalized by their corresponding standard deviations to prevent certain features that have substantially larger numerical values than others from dominating the training process. Even after normalization, certain cells still have feature values out of the transition region, beyond which is a saturated region of activation function. To keep the feature value within the transition region, a scaling factor is used in the activation function of neurons on the texture processing.

Once the feature vector is derived from the image acquisition system, the data is then processed by a neural network 30. A Sun,Sparcstation IPC workstation is used to train and test the neural network. The neural network 30 selected for the preferred embodiment of the present invention is a hybrid multilayer feed forward perceptron with error back-propagation training algorithm. The neural network 30 differs from conventional neural networks in that its architectural makeup consists of neuron elements with differing activation functions.

Figure 2:
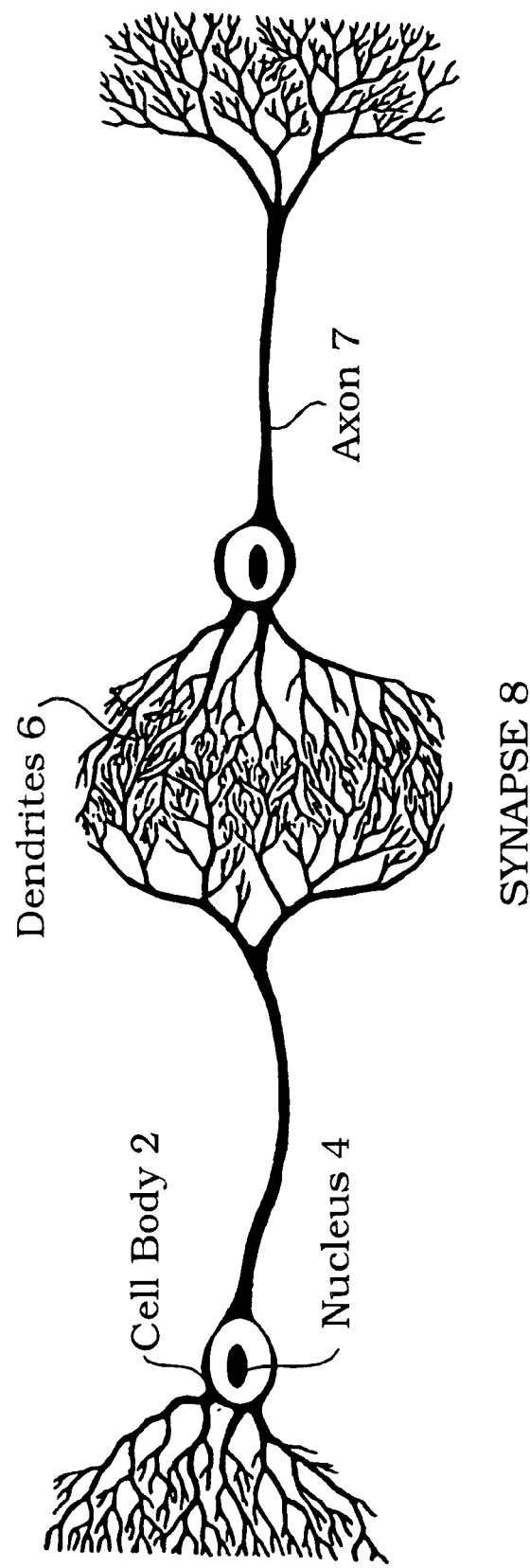
FIG. 2 is a diagram of a biological neural network.

Artificial neural networks consist of numerous, simple processing units that can be trained to collectively perform particular tasks. The architecture of each simple processing unit is roughly based on the structure of biological neuron cells found in nature. As seen in FIG. 2, a neuron in a biological neural network includes the dendrite 6, the cell body 2, the nucleus 4, the axon 7 and the synapse 8. In comparison, an artificial neural network is a highly parallel distributed system with the topology of a directed graph. The nodes in artificial neural networks are usually referred to as "processing elements" or "neurons" while the connection links are generally known as "interconnects."

Generally, an artificial neuron unit is configured to receive a large number of inputs, either from data input sources or from other artificial neuron units to replicate the way a biological neuron receives input signals from a plurality of attached dendrites 6. An artificial neuron unit mimics the activity of the cell body 2 of the biological neuron through the use of threshold and output functions. The artificial neuron initially accepts all inputs and performs a threshold computation to determine whether the sum of the input plus any previously existing activation input surpasses a threshold value. If so, the neuron processes the input according to an output function and sends an output to the plurality of other similarly configured neurons that are connected to it. In this manner, each processing element accepts multiple inputs and generates a single output signal which in turn are distributed to the other processing elements as input signals. Generally, the threshold function and output functions are combined into one function, collectively called an activation function, which accepts inputs and maps them to an output value in one step. Traditionally, a sigmoid activation function is used.

The connections between the individual processing units in an artificial neural network are also modeled after biological processes. Each input to an artificial neuron unit is weighted by multiplying it by a weight value in a process that is analogous to the biological function performed at synapse 8. In biological systems, a synapse 8 acts as a connector between one neuron and another, generally between the axon (output) 7 of one neuron and the dendrite (input) 6 end of another cell. Synaptic junctions have the ability to enhance or inhibit (i.e., weigh) the output of one neuron as it is inputted to another neuron. Artificial neural networks model the enhance or inhibit function by weighing the inputs to each artificial neuron.

Figure 3:
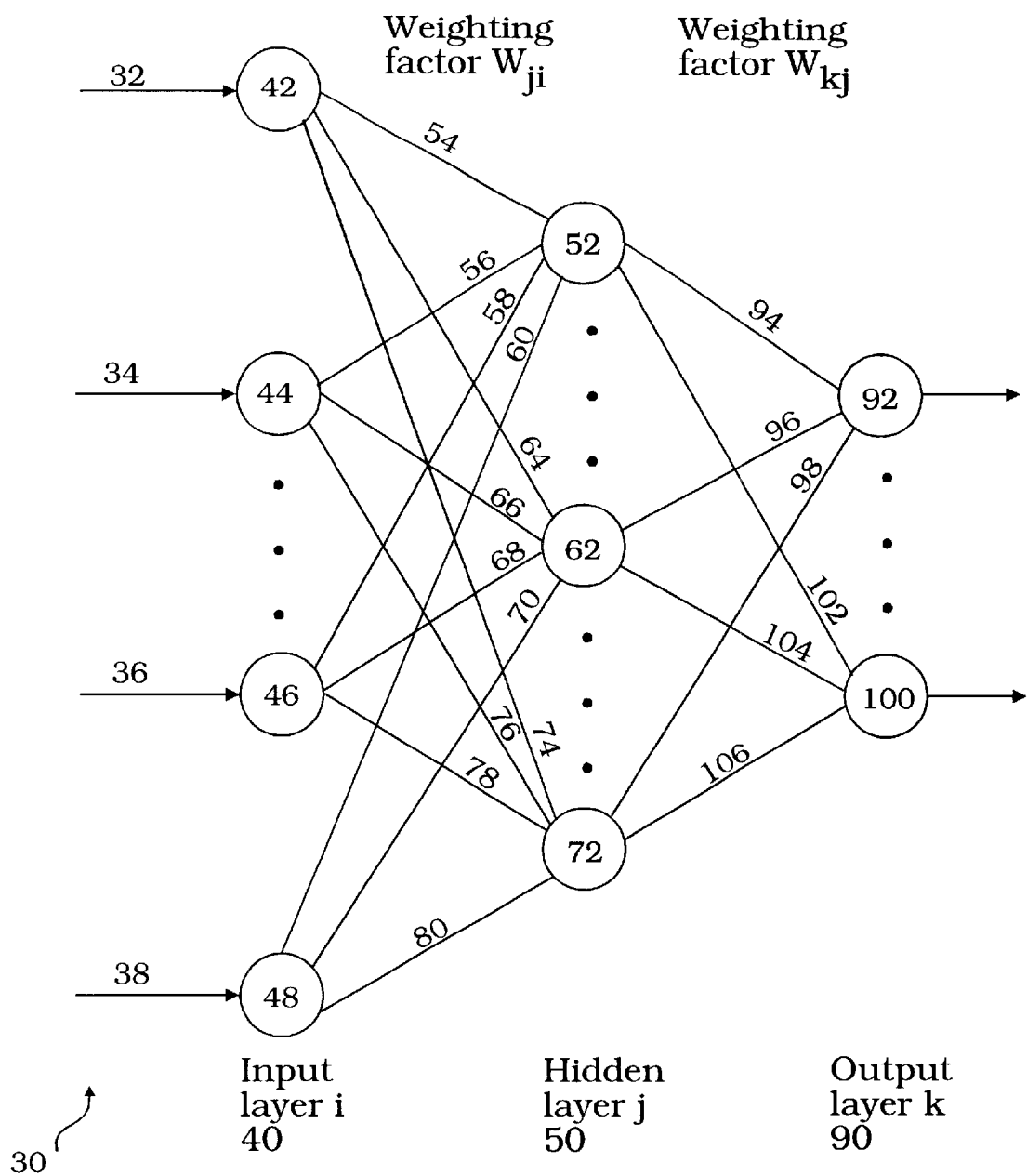
FIG. 3 is a diagram of an artificial neural network of FIG. 1.

FIGS. 1 and 3 depict sample representations of a multilayered, feed-forward back-propagation neural network 30 of this invention. The first layer of the neural network is the input layer 40, while the last layer is the output layer 90. Each layer in between is called a hidden layer 50. Each layer 40, 50, or 90 has a plurality of neurons 52, 62, 72, 92 and 100, or processing elements, each of which is connected to some or all the neurons in the adjacent layers.

The input layer 40 of the present invention comprises a plurality of nodes 42, 44, 46 and 48, which are configured to receive input information from a computer 22 outside of the neural network 30. The nodes of the input layer store data to be forward propagated to the neurons of the hidden layer 50. A hidden layer 50 comprising a plurality of neurons 52, 62 and 72, accepts as input the output of the plurality of neurons 42, 44, 46 and 48 from the input layer 40. The neurons of the hidden layer 50 transmit its outputs to a plurality of neurons 92 and 100 in the output layer 90. The output layer 90 comprises a plurality of neurons 92 and 100 that are configured to transmit an output pattern to an output source outside of the artificial neural network 30. One preferred embodiment employs 3,600 neurons in the input layer plus one neuron which holds a bias value to analyze the pixel information from the raw image of the cell. A second preferred embodiment employs five neurons in the input layer plus one bias neuron for analyzing an array of composite imaging variables of each cell. The second approach reduces the amount of information that must be processed by the neural network and thus improves the throughput of the neural network although at the expense of pre-processing computations. The neuron supplying the bias value is set to a constant value, such as one (1).

As mentioned earlier, each output of each neuron in the preceding intermediate hidden layer 50 is interconnected with each input of each neuron of the following hidden layer 50, until the last hidden layer 50 where each output of each neuron is interconnected with each input of each neuron in the output layer 90.

The selection of the number of neurons in hidden layer 50 are of particular importance in the training of a back-propagation neural network. The speed and robustness of the network convergence to the approximation of the discriminate surface, to a large degree, depends on the number of hidden neurons and the type of the activation function used for each neuron. Too many hidden neurons will degrade the generalization capability of the network, while too few hidden neurons will decrease the pattern retention capability of the neural network 30. In one configuration, preferred embodiment utilizes twenty (20) neurons were used in the hidden layer 50. Each output of each neuron 52, 62 or 72 in the hidden layer is interconnected with each input of each neuron in the output layer 90. The output layer has one neuron 92 which generates an output indicating that the tissue cell is benign. In some implementation, the output layer has an additional neuron 100 which generates an output indicating that the sample tissue cell is malignant.

Figure 4:
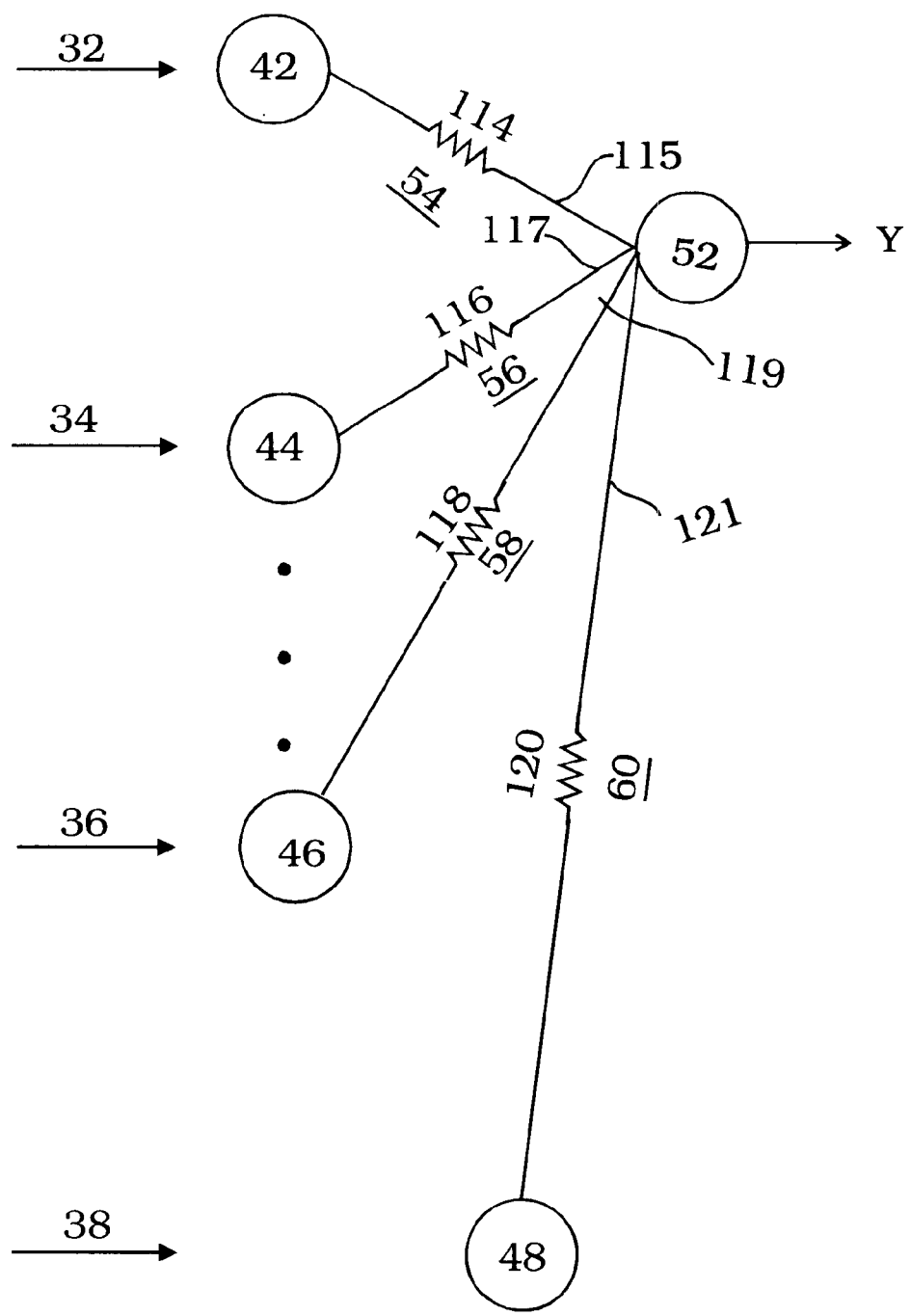
FIG. 4 is second diagram of an artificial neural network of FIG. 1.

Referring now to FIG. 4, neuron 52 receives inputs from a plurality of nodes 42, 44, 46 and 48. The interconnection between nodes 42, 44, 46 and 48 and neuron 52 have a plurality of weight factors 114, 116, 118 and 120 which adjust the value of the data coming from nodes 42, 44, 46 and 48. Weight factors 114, 116, 118 and 120 may be built from variables which can attenuate the incoming information appropriately. The inputs and the bias are supplied to multipliers which accept another input from a weight factor vector. Outputs from the multipliers are supplied to an adder unit for computing the weighted sum of the input values. In essence, the neurons perform a dot product of a vector of the weighted input values, including a bias value, with a vector representing the weights. The output value from the adder is passed through a non-linear function (sinusoid, sigmoid or gaussian) to generate a single neuron output value. The output of each neuron 52 in the input layer is propagated forward to each input of each neuron in the next layer, the hidden layer. In the case where the raw image data is fed directly to the neural network, the neurons of the input layer 40 scans 3,600 inputs which are neighboring input pixels, or gray values from an image. When the imaging variables are used, neurons of the input layer 40 scans its five input nodes. The feature inputs can be presented in any order. However, the order of presentation must match the order used for training. In using raw image data, the 3,600 gray scale levels are presented starting from upper left corner scanning to the right lower corner of the image. Using composite imaging data, the order of training data presentation must match the order used during the unknown sample data presentation.

Where the composite imaging variables are used, each data item representative of, among others, an area, an average intensity, a shape, a texture, and a DNA content, are provided to a neural network. The neural network is configured such that each data item is received by one neuron with the input layer.

A single neuron 52 of FIG. 3 and its corresponding input and output connections, with the associated weighting function, are presented in greater detail in FIG. 4. FIG. 4 shows a single neuron 52 connected to inputs from at least four other units from a previous layer, in this case nodes 42, 44, 46 and 48 from input layer 40. Nodes 42, 44, 46 and 48 are interconnected with neuron 52 through interconnections 54, 56, 58 and 60. As the input from a source is first transmitted to neuron 52 along a specified connection, each input is first weighted according to a preselected weighting factor. One common weighting factor comprises a formula which simply takes the output and multiplies it by a numerical weight factor that is usually set within certain bounds. As shown in FIG. 4, the weight factors are represented by resistances 114, 116, 118 and 120, representing the attenuative effects of the weight function used in FIG. 4.

The result of the weighting function for each input connection is then transmitted to an input connection of the neuron 52. Neuron 52 receives weighted data inputs 115, 117, 119 and 121 and applies an activation function to generates an output Y.

Each artificial neuron unit 52 in the hybrid neural network 30 will process input through the same or different activation function. Improvements to the performance of the classical back-propagation neural network has been found where a mix of non-linearity functions are used. The ability to mix neurons with different activation function gives rise to the hybrid distinction.

Each neuron of the neural network of the preferred embodiment could be a multiple threshold unit obtained by changing the non-linearity characteristic of the activation function. The substitution of sinusoid or gaussian activation function in place of the sigmoid function reduces the training time substantially in certain class of problems. In these problems, the sinusoid and gaussian functions are suitable choices for a neuron because their derivatives are defined for any possible value of input, and they can form multiple decision boundaries. Neural networks using these activation functions require fewer number of iterations, as compared to traditional back-propagation type of network, to converge to their trained states.

The above described neural network has been implemented in software. Such a neural network can reside in a program storage device such as in the memory of a computer, including the ROM, RAM, disk, tape, or the memory of another computer that is linked with the neural network via a LAN (local area network). In such systems, the program storage device contains a computer readable code implementing the neural network, the weight factor data structure, the activation function data structure, and the imaging variable data structure. The code implementing the neural network instructs the computer to process the data according to the operation of the neural network as described above.

Figure 5:
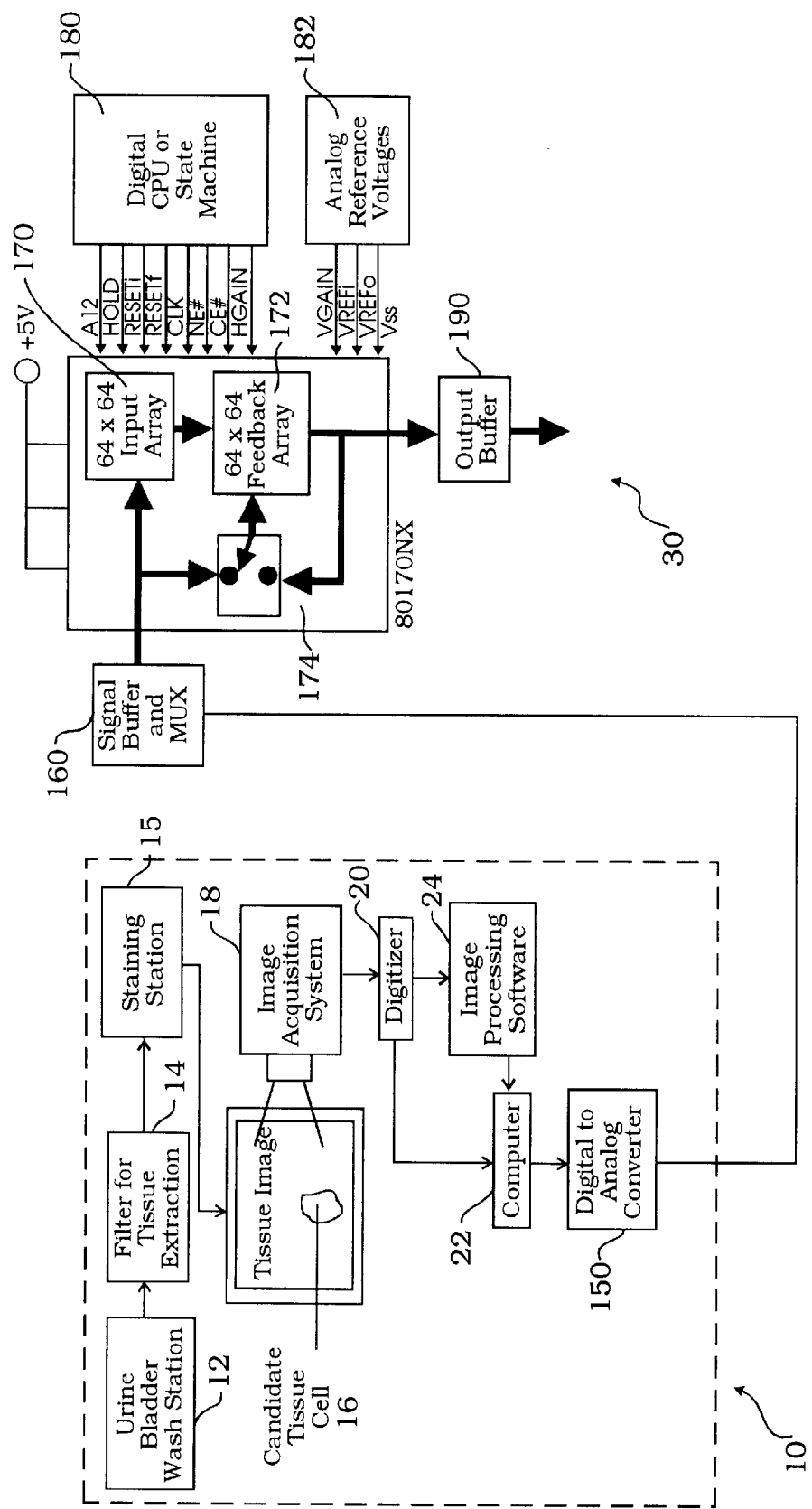
FIG. 5 is a diagram of a second embodiment of the present invention.

The neural network system may also be implemented in hardware for performance enhancement. Referring now to FIG. 5, a hardware-based neural network is disclosed. The neural network IC disclosed in FIG. 5 is the 80170NX Electrically Trainable Analog Neural Network (ETANN) chip from Intel Corporation (Santa Clara, Calif.). ETANN computes the inner (dot) products of an input vector and stored weight factor vectors, generating scalars which are passed through threshold functions to the outputs. The inner product of two vectors is a multiply-accumulate operation which is performed by an accumulator. It is thus related to how closely the two vectors match. The 80170NX in FIG. 5 has 64 processing elements which independently compute inner products on one or both of the two 64-input weight factor matrices. Because the 80170NX operates with analog inputs, a digital to analog converter 150 is used to convert the output of computer 22 to analog form. Analog buffer and MUX 160 is connected with digital to analog converter 150 to temporarily store information prior to feeding the data to the neural network device 174.

Although the function generator of the present version of 80170NX supports only sigmoid functions at each of the 64 outputs, it is anticipated that a future neural network ICs may support other types of activation functions, including gaussian and sinusoid functions. Further, it is also anticipated that the neural network IC can support a combination of neurons having sigmoid, gaussian or sinusoid activator functions on the same IC.

Figure 6:
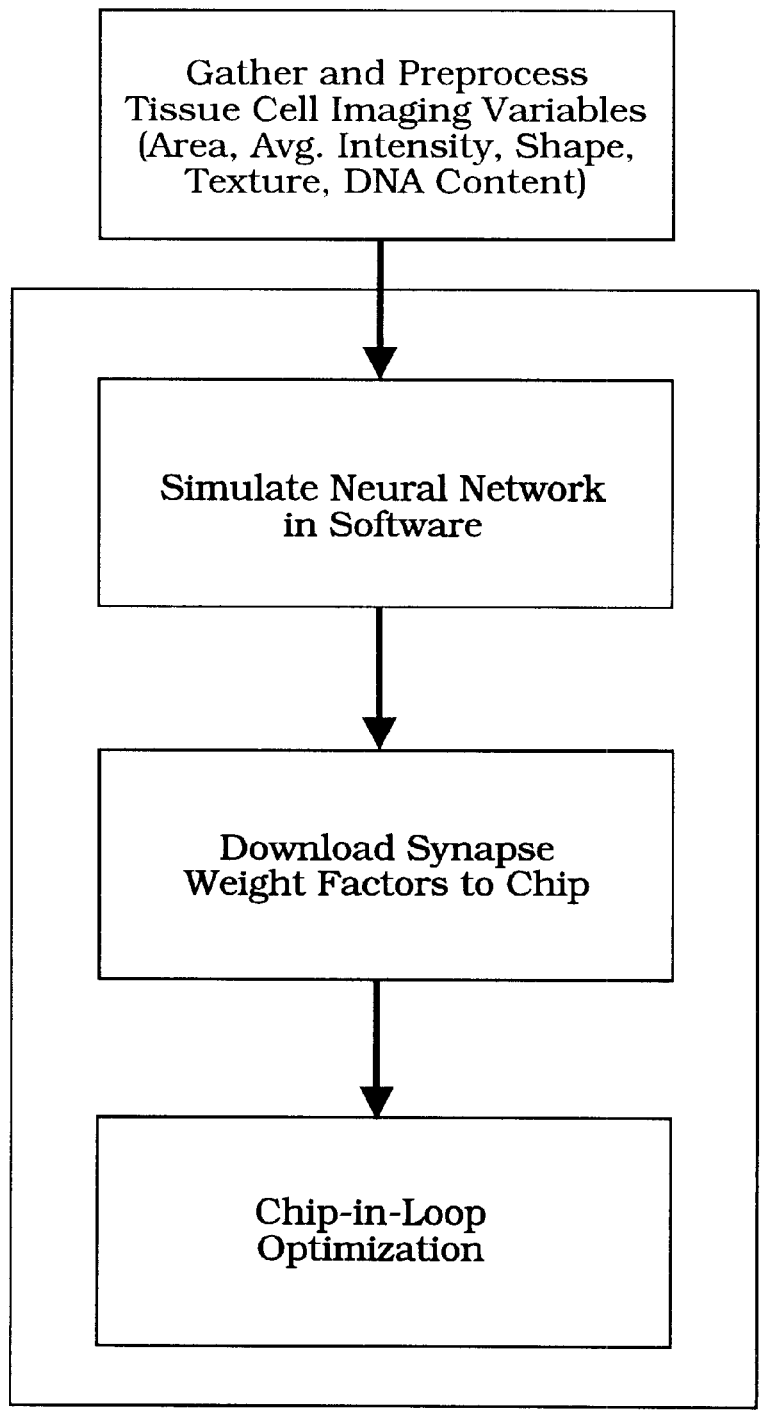
FIG. 6 is flow chart of the training procedure for the neural network of FIG. 5.

FIG. 6 discloses the training steps for the neural network of FIG. 5. The data gathering process is the same as that of FIG. 1. After data has been gathered, a simulation software is used to test the reliability and performance of a neural network application in software before committing to an actual neural network hardware configuration. In this step, the user can specify the number of processing elements (neurons) per layer and the number of layers. Learning rates can be altered or perturbed, and weight factors can be randomized. Individual weight factors can be examined, and diagnostics for training and performance are provided.

After simulation of the network configuration, the derived weight factors can be downed into the 80170NX or other neural network ICs device through an interface. The neural network ICs can then be instructed to perform chip-in-loop optimization on those specific ICs.

Figure 7:
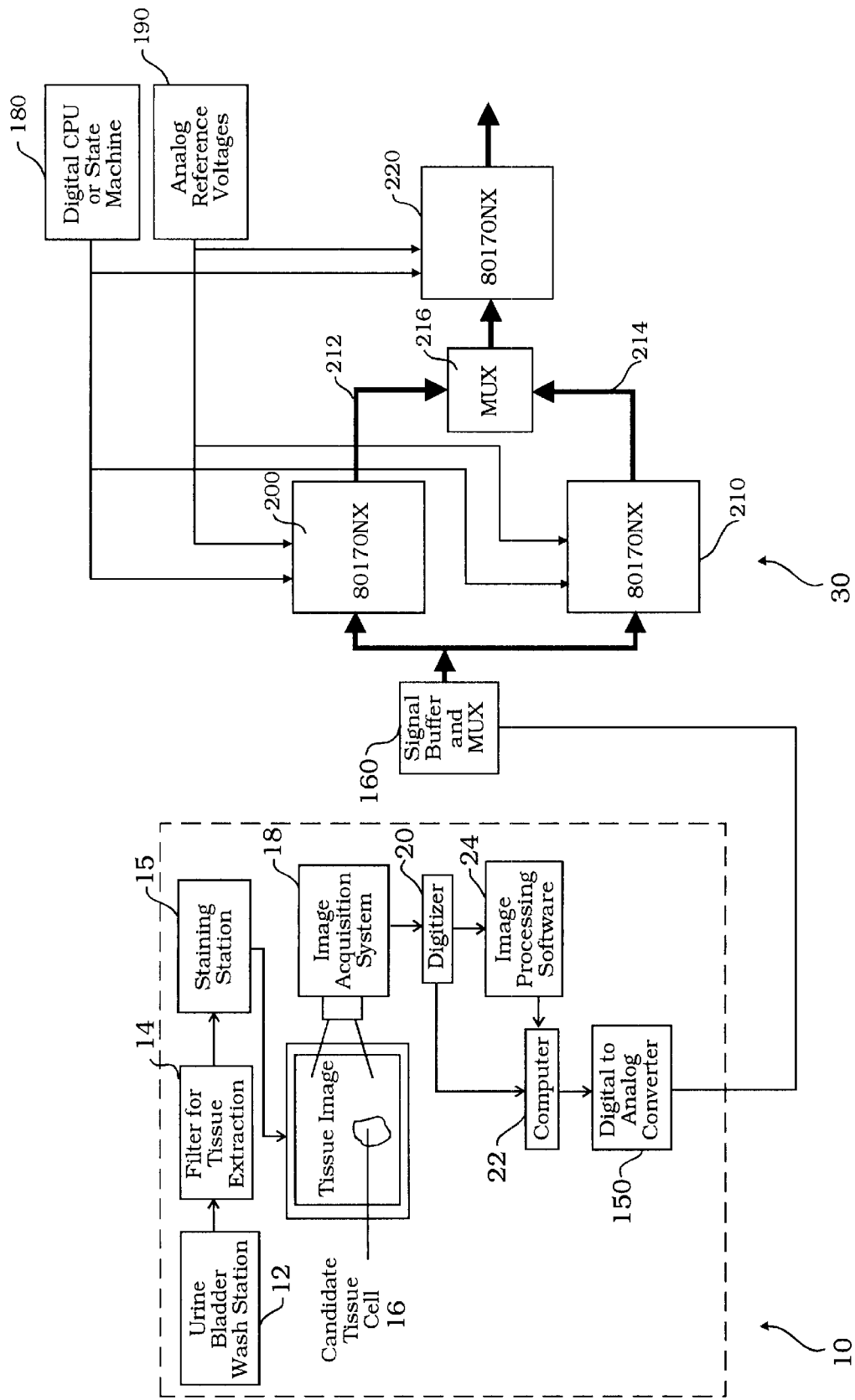
FIG. 7 is a diagram of a third embodiment of the present invention.

For higher performance, a plurality of neural network ICs can be utilized. FIG. 7 discloses an architecture utilizing multiple neural network ICs 200, 210 and 220 to provide more neural network processing power. In this configuration, neural network ICs 200 and 210 generates first and second sets of results 212 and 214. These results are multiplied through MUX 216 to a third neural network IC 220 which performs additional neuronal processing to classify the tissue cell as benign or malignant.

Adaptation of this network to a particular task is done by way of "training" the network with a number of examples (the training data set). From a pattern recognition viewpoint, a neural network essentially constructs a non-parametrical discriminate surface, or boundary, in its multidimensional input vector space. This surface is built up progressively by exploring the discriminate information from labeled patterns in the training process. Supervised feedforward neural network training provides the most tractable and thereby the most frequently applied process.

During the training of the network, information is encoded in the strength of the connections known as weights. The discriminate surface of a trained network is encoded into the weights and the activation function values of the network during the training process. In this manner, neural networks superimpose pattern information on a plurality of synaptic connections between neurons. Such networks usually generalize well on new input data (i.e., data not part of the training data) and give good results when presented with incomplete or noisy data.

The activation function of each neuron can be perceived as the underlying function decomposition mechanism utilized during the training of the network. The training process essentially presents inputs to the network, analyzes the output of the network, and adjusts the weighting factors according to the difference between the actual output and the desired output for the training example. In training the network, the data inputs are processed using the activation function employed in each neuron.

Each processing element, in an asynchronous fashion, computes the sum of products of the weight of each input line multiplied by the signal level on that input line. The computed outputs for given inputs are compared with actual outputs, and adjustments are made to the network's weights based on the differences. After repeating this process of modifying the weights after many presentations of input patterns, the network "learns" to produce the desired responses by converging to a state where the weights need not be updated any more. When it can do this sufficiently well, it is deemed to be "trained," and its weights will encode information on the mapping input data to outputs. The iterative process allows neural networks to store pattern or function information with distributed encoding, which is one reason why neural networks are successful at recognizing partial or noisy patterns and other ill-defined problems.

After the network has been trained, it can recognize and associatively retrieve patterns previously memorized. During the recognition phase, each processing element, in an asynchronous fashion, computes the sum of products of the weight of each input line multiplied by the signal level on that input line. Thus, based on the past experience gained during training, as encoded in the weights, the neural network can predict an outcome given a new set of patterns. Exemplary source code for the back-propagation technique with a sinusoidal activation function, implemented in the C programming language, is shown in Appendix I.

Figure 8:
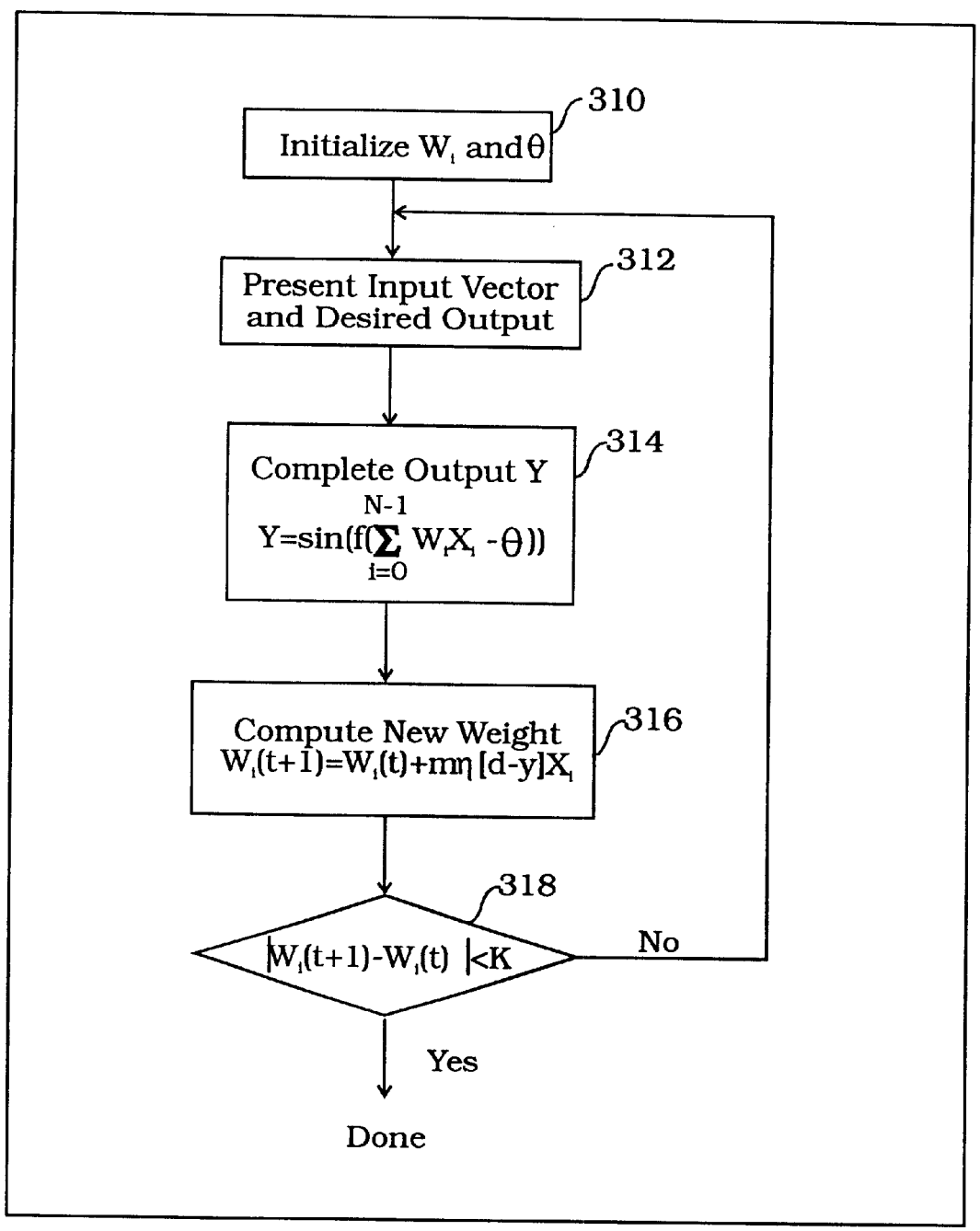
FIG. 8 is a flow chart of the procedure for training and utilizing the neural network with sinusoidal activation function of the present invention.

FIG. 8 shows the training process of a neuron having a sinusoidal activation function that may be used in conjunction with neuron 52 of FIG. 4. In that neuron, the weights 114, 116, 118 and 120 are multiplied with their respective inputs from nodes 42, 44, 46 and 48 to generate a plurality of weighted values 115, 117, 119 and 121. Neuron 52 then applies the activation function shown in block 314 of FIG. 8 to generate output Y.

The traditional back-propagation neural network was modified to use the sinusoid function fs, given below, in place of the sigmoid function:

$$fs = \sin(f*a)$$

where f is the frequency and a is the weighted sum of the neuron inputs.

After each iteration the weights in the output layer are adjusted as follows:

$$w(t+1) = \begin{matrix} w(t) + h(d - y(t))x(t) & \text{if slope of } fs > 0 \\ w(t) - h(d - y(t))x(t) & \text{if slope of } fs < 0 \end{matrix}$$

where w(t) is the weight at iteration t, h is a positive constant less than "1" called learning rate, and x(t) is the input pattern of interest. Variable d represents the desired output corresponding to x(t) and y(t) is the output.

In neurons that employ sinusoidal activations, it has been observed that the flatness of the sine function affects the stability of the neuron. Thus, when the function is flattened, larger acceptable regions are created and greater stability is achieved. Thus, in case of the flattened sinusoid activation function, the new weight modification equation is:

$$fs(net_{pj}) = \sin(fnet_{pj} - f\phi) - f_1 \sin(fnet_{pj} - f\phi)$$

$$3\ w(t+1) = w(t) + \eta(t_{pj} - \sin(fnet_{pj} - f\phi) +$$

$$f_1 \sin(fnet_{pj} - f\phi)$$

$$3)(\cos(fnet_{pj} - f\phi) - 3ff_1 \cos(fnet_{pj} - f\phi)) \sin(fnet_{pj} - f\phi))^{2)O}{}_{pi}$$

where f is the frequency, φ is the phase, $net_{pj}$ is the weighted sum of the $j^{th}$ neuron for pattern p, and $O_{pj}$ is either the input (or the output from a previous layer).

In the preferred embodiment, the threshold values used in the activation function are developed as part of the training process. The threshold values are replaced with weights associated with a neuron which always receive an input value of one so that the threshold values are propagated without disturbance to the input of the next neuron. Although the preferred embodiment does not utilize the magnitude and phase information of the sinusoidal function, it is contemplated that both information can be utilized as well.

Figure 9:
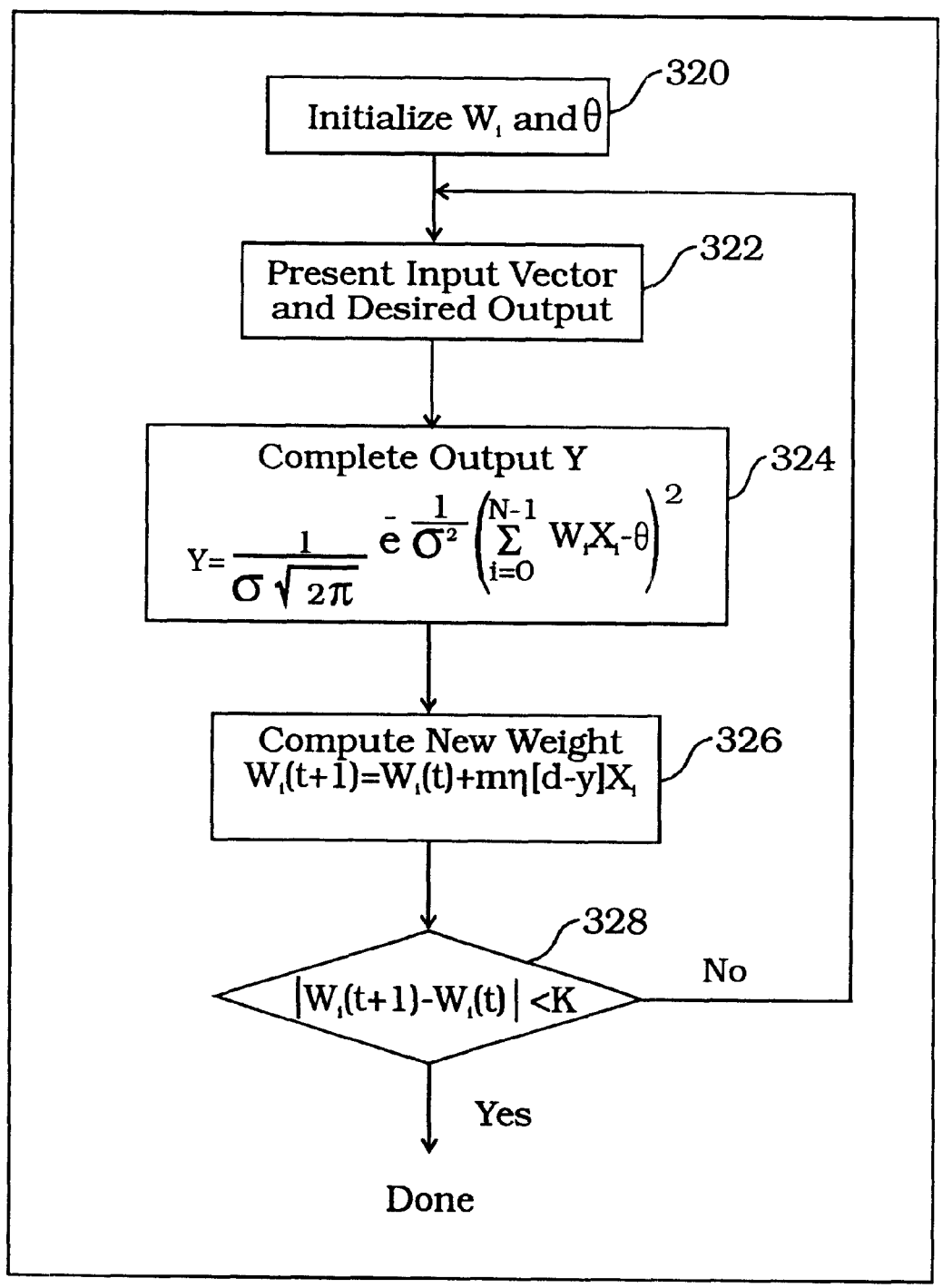
FIG. 9 is a flow chart of the procedure for training and utilizing the neural network with gaussian activation function of the present invention.

Although the preferred neural network uses a sinusoidal activation function in some of its neurons, gaussian activation function is contemplated as well. Block 324 of FIG. 9 shows the corresponding neuron input and output computations using the gaussian activation function.

Tests done in the present invention indicate that the neural network is able to generalize well with new cases. Tests were conducted using features derived from the CAS-200 system and the Zeis-IBAS system separately, as well as in partial combination.

The network was first trained using data from the CAS-200 image analysis system. Table 1 reports the test results and overall classification rate on a 98 cell set. Values listed in Table 1 for each test run are: (1) the network output value; and (2) the square of the deviation [(error) $^2$] from the desired target output. An output of indicates abnormality, while "0" indicates normal cell structure.

Table 1 results indicate that the network trained by raw cell images were capable of correctly classifying 72% of the test cells. However, using extracted features such as the features of area, intensity, texture and shape, the network was able to correctly classify 93% of the sample images. These data are most encouraging considering the fact that several low grade bladder carcinoma cells were included in the abnormal cell array. The positive results are most comparable if not better than those obtainable by an expert cytopathologist.

When pgDNA feature is utilized in combination with other features, the accuracy rate improves to 98%. This indicates the pgDNA and other nuclear cell texture information is significant in the detection of cancerous cells.

The set of samples of M-344 cells was tested in three different configurations. In the first configuration, fifty percent (50%) of M-344 positive, negative and noise cell data were allocated for training, and the rest of data, including the entire false positive data, were used for testing. The individual classification results and overall rate were analyzed and the misclassified cells were determined. The threshold used for classification is 0.5. It was found that the feature vector trained network results in a higher average (taking all four groups into account) classification rate than the raw image trained one, 75.5% versus 69.8%. The score for false positive data is low, at about 55.7% and 57.6% for feature vector and raw image, respectively. But when calculated only for positive, negative and noise data, the classification rate increases to 88.4% and 77.8%.

Under a second configuration, feature vector data from M-344 each group were split equally for training and testing. The experiment results for feature vector trained network were compared with previous input data configuration. There was an overall improvement, from 75.5% to 82.7% correct identification. This is probably because false-positive individuals were included in the training set.

Neural networks were also studied in a third configuration when only positive and false-positive M-344 data are presented. Data were allocated evenly between training and testing. Next when only positive and false-positive were calculated, there was an increase in overall classification rate compared with configuration 1 for both feature vector and raw image trained networks. However, as far as the effect of false-positive cell identification participation of training is concerned, the results are consistent with that from configuration 2.

Turning now to a more in-depth discussion of the present invention with specific reference to FIG. 1, the screening device is shown with particular emphasis on the classification elements embodied in the processing system. In the preferred embodiment, the processing system includes an image processor with digitizer and a neural network implemented on a general purpose processor. For improved recognition speed, the neural network can be implemented in hardware.

The general processor is preferably a Sun SPARC IPC workstation although it may be another computer-type device suitable for efficient execution of the functions described herein such as an Intel Pentium or a Motorola PowerPC class computer system. The general processor controls the functioning of and the flow of data between components of the device, may cause execution of additional primary feature extraction algorithms, and handles the storage of image and classification information. The general processor additionally controls peripheral devices such as a printer, a storage device such as an optical or magnetic hard disk, a tape drive, etc., as well as other data collection devices.

Although the neurons in the preferred embodiment have been implemented in software, the neurons can be implemented in specialized hardware or software running on conventional computer systems. Thus, it should be recognized that neural networks can be implemented in software or in hardware, including digital or analog VLSI circuitry or in optical-computing media via spatial-light modulators and holograms.

It will be appreciated by a person of ordinary skill in the art that, while particular resolutions and image sizes were described above, these particular values are exemplary. It will further be appreciated that different resolutions, image parameters, magnification levels, etc., can be employed to accomplish the same or similar results as the particular embodiment of the invention described above, and that all such differing resolutions, image parameters, imaging variable data items, neuron count, etc. are within the scope of the present invention.

It should be further recognized that, although the preferred embodiment describes a neural network with one hidden layer, a plurality of hidden layers may be used. Also, different number of neurons may be used in input, output or hidden layers. In addition, it should further be recognized that while the image processor with digitizer and the general processor are described operating in a serial manner, in actual practice as many functions will be performed in parallel as is possible. Hence, the components may process different slide segments or different areas of a segment concurrently, greatly reducing the time required to screen a sample. L/C"v"

APPENDIX I
/*********************************************************************

File:       sigsin.c
Contents:   Back Propagation neural networks with
            sigmoid, sinusoid and gaussian activation
            function. Data normalized by mean and std.
Date:       Dec, 17, 1992

*********************************************************************/

```c
#include     <math.h>
#include     <stdio.h>
#define      TRUE           1
#define      FALSE          0
#define      EQUAL          0
#define      SAMPLED        1
#define      UNSAMPLED      0
#define      SINUSOID       0
#define      SIGMOID        1
#define      GAUSSIAN       2
#define      LINEAR         3
#define      NEWEXP         1
#define      RESUM          0
#define      SIG(x)         1.0/(1.0 + exp((double)(-x/10.0)))
#define      SIN(f, x)      sin((double)(f*x))
#define      GAUS(x)        exp((double)(-x*x/40.0))
#define      SLOPE(f, x)    cos((double)(f*x))
#define      MaxPtns        1000      /*Max training + test patterns*/
#define      MaxLayerN      2         /*Max LayerN in configuration*/
#define      MaxWtN         40        /*Max weights per nuron*/
#define      MaxStrLen      100       /*Maximum String Length*/
#define      MaxInputN      20        /*Maximum data input lines*/
#define      NxtLn(s, File) fgets((char*)s,MaxStrLen,(FILE*)File)

/*Network configuration
and control parameters*/ int      TrainPtns = 16;                         /*Total training patterns*/
int      TestPtns = 16;                          /*Total test patterns*/
int      InputN = 4;                             /*Total input nurons*/
int      OutputN = 1;                            /*Total output nurons*/
int      LayerN = 2;                             /*Total LayerN*/
int      NeuronInLayer[MaxLayerN] = {8, 1};      /*Total nurons in each layer*/
int      ActInLayer[MaxLayerN] = {1, 1};         /*Action function configs*/
float    LearnRate = 0.5;                        /*Learning rate*/
float    Threshold = 0.01;                       /*Termination condition*/
float    Frequency = 3.0;                        /*Sinusoid frequency*/
float    InitialRange = 2.0;                     /*Initial range for network*/
float    InputScale = 1.0;                       /*Input Normlization Factor*/
int      RptRate = 20;                           /*Reprot rate*/
int      MaxLoops = 2000;                        /*Maximum loops*/
int      RandSeed = 123456789;                   /*Random seed*/
char     TrainFile[20] = "Traing";               /*Traingin data file name*/
char     TestFile[20] = "Ttest";                 /*Test data file name*/
char     ReportFile[20] = "Report";              /*Output download file*/
char     NetworkFile[20] = "Network";            /*Final NN sctructure*/

/*Input data*/
float    *DataIn[MaxPtns];                       /*Normalized training patterns*/
float    *DataOut[MaxPtns];                      /*Normalized training patterns*/
float    mean[MaxInputN];                        /*Input data mean buffer*/
float    std[MaxInputN];                         /*Input data std buffer*/
float    *InputLayer;                            /*Array of input nurons*/
float    *Target;
char     TrainPrefix[MaxStrLen] = "../cdi-data2/";/*Train data file prefix*/
char     TestPrefix[MaxStrLen] = "../cdi-data2/"; /*Test data file prefix*/
```

40

```
typedef struct Neuron {
                        float    Wt[MaxWtN];
                        float    Biase;
                        float    Sum;
                        float    Out;
                        float    Error;
                        float    Delta;
                        int      Activation;
                        }NEURON;

NEURON          *Layer[MaxLayerN];

char *HELP = "Usage:    sigsin NewExpFlag.\n";

main(argc, argv)
int     argc;
char    **argv;
{
int             Loops, Pattern;
int             Spool[MaxPtns], RandSample;
float           SumError;
double          drand48();
void            Initialization();
void            Resum();
void            Output();
void            BackPropagation();
void            DumpOutput();

if((argc==1)||(atoi(argv[1])==NEWEXP))
        Initialization();
else if(atoi(argv[1]) == RESUM)
        Resum();
else{
        printf("%s\n", HELP);
        exit(0);
        }

Loops = 0;
SumError = (float)HUGE;
while((Loops++ <= MaxLoops) && (SumError >= Threshold)){
        for(Pattern=0; Pattern < TrainPtns; Pattern++)   /*Mark as unsampled*/
                Spool[Pattern] = UNSAMPLED;

SumError = 0.0;
        for(Pattern = 0; Pattern < TrainPtns; Pattern++){
                RandSample = TrainPtns * drand48();      /*Randomly sample patns*/
                while(Spool[RandSample] == SAMPLED)
                        RandSample = TrainPtns * drand48();/*Sampled? try other*/
                Output(RandSample);
                BackPropagation();
                DumpOutput(Pattern, Loops, RandSample, &SumError);
                Spool[RandSample] = SAMPLED;             /*Marked as sampled*/
                }
        } if(TestPtns){
        SumError = 0.0;
        for(Pattern = TrainPtns; Pattern < TestPtns + TrainPtns; Pattern++){
                Output(Pattern);
                DumpOutput(Pattern, -1, Pattern, &SumError);
                }
        } exit();
```

```
                                        41
}

/***********************************************************

Routine:        Initialization()

Get in arguments, allocate memory.

***********************************************************/ void    Initialization()
{
void    ReportArg();
void    GetArguments();
void    AllocateMemory();
void    GetData();
void    srand48();
void    InitialNetwork();
void    NormData();

GetArguments();
ReportArg(NEWEXP);
AllocateMemory();
GetData();
NormData();
srand48(RandSeed);
InitialNetwork();
}

/***********************************************************

Routine:        GetArguments()

Collect control and network
                configuration parameters.

***********************************************************/ void    GetArguments()
{
int             i, *ip, tmp;
char            TmpC, TmpS[100];
FILE            *ArgFile;
void            ReadInStr();

if((ArgFile = fopen("arg", "r")) == NULL){
        printf("cannot open file arg to read\n");
        exit(1);
        } while((TmpC = getc(ArgFile)) != EOF){
        ungetc(TmpC, ArgFile);
        ReadInStr(TmpS, ArgFile);
        if(strcmp(TmpS, "Training Data File:")==EQUAL)
                ReadInStr(TrainFile, ArgFile);
        else if(strcmp(TmpS, "Test Data File:")==EQUAL)
                ReadInStr(TestFile, ArgFile);
        else if(strcmp(TmpS, "Report Data File:")==EQUAL)
                ReadInStr(ReportFile, ArgFile);
        else if(strcmp(TmpS, "Network Structure File:")==EQUAL)
                ReadInStr(NetworkFile, ArgFile);
        else if(strcmp(TmpS, "Training Patterns:")==EQUAL){
                fscanf(ArgFile, "%d", &TrainPtns);
                NxtLn(TmpS, ArgFile);
                }
```

42

```
        else if(strcmp(TmpS, "Test Patterns:")==EQUAL){
                fscanf(ArgFile, "%d", &TestPtns);
                NxtLn(TmpS, ArgFile);
        }
        else if(strcmp(TmpS, "Input Neurons:")==EQUAL){
                fscanf(ArgFile, "%d", &InputN);
                NxtLn(TmpS, ArgFile);
        }
        else if(strcmp(TmpS, "Output Neurons:")==EQUAL){
                fscanf(ArgFile, "%d", &OutputN);
                NxtLn(TmpS, ArgFile);
        }
        else if(strcmp(TmpS, "Layers:")==EQUAL){
                fscanf(ArgFile, "%d", &LayerN);
                NxtLn(TmpS, ArgFile);
        }
        else if(strcmp(TmpS, "Neurons in Layer:")==EQUAL){
                for(i=0; i<LayerN; i++)
                        fscanf(ArgFile, "%d", &NeuronInLayer[i]);
                NxtLn(TmpS, ArgFile);
        }
        else if(strcmp(TmpS, "Activation in Layer:")==EQUAL){
                for(i=0; i<LayerN; i++)
                        fscanf(ArgFile, "%d", &ActInLayer[i]);
                NxtLn(TmpS, ArgFile);
        }
        else if(strcmp(TmpS, "Learning Rate:")==EQUAL){
                fscanf(ArgFile, "%f", &LearnRate);
                NxtLn(TmpS, ArgFile);
        }
        else if(strcmp(TmpS, "Random Seed:")==EQUAL){
                fscanf(ArgFile, "%d", &RandSeed);
                NxtLn(TmpS, ArgFile);
        }
        else if(strcmp(TmpS, "Input Scaling:")==EQUAL){
                fscanf(ArgFile, "%f", &InputScale);
                if(InputScale==0.0){
                        printf("Warning: 0 scaling factor\n");
                        exit(0);
                }
                NxtLn(TmpS, ArgFile);
        }
        else if(strcmp(TmpS, "Ending Threshold:")==EQUAL){
                fscanf(ArgFile, "%f", &Threshold);
                NxtLn(TmpS, ArgFile);
        }
        else if(strcmp(TmpS, "Frequency:")==EQUAL){
                fscanf(ArgFile, "%f", &Frequency);
                NxtLn(TmpS, ArgFile);
        }
        else if(strcmp(TmpS, "Initial Range:")==EQUAL){
                fscanf(ArgFile, "%f", &InitialRange);
                NxtLn(TmpS, ArgFile);
        }
        else if(strcmp(TmpS, "Report Rate:")==EQUAL){
                fscanf(ArgFile, "%d", &RptRate);
                NxtLn(TmpS, ArgFile);
        }
        else if(strcmp(TmpS, "Maximum Loops:")==EQUAL){
                fscanf(ArgFile, "%d", &MaxLoops);
                NxtLn(TmpS, ArgFile);
        }
} fclose(ArgFile);
}
```

43

```
/*************************************************************
Routine:      ReadInStr Read into string, disgard newline character

*************************************************************/ void    ReadInStr(Str, InFile)
char    *Str;
FILE    *InFile;
{
int     Len;

fgets(Str, MaxStrLen, InFile);
*(Str + strlen(Str) - 1) = '\0';         /*Disgard newline and pad null*/
}

/*************************************************************
Routine:      ReportArg Reporte the input arguments.

*************************************************************/ void        ReportArg(NewExpFlag)
int             NewExpFlag;
{
register        i, *ip;
FILE            *RptFile;

if(NewExpFlag){
        if((RptFile=fopen(ReportFile, "w"))==NULL){
                printf("cannot open file %s to write\n", ReportFile);
                exit(1);
                }
        }
else{
        if((RptFile=fopen(ReportFile, "a"))==NULL){
                printf("cannot open file %s to append\n", ReportFile);
                exit(1);
                }
        } if(!NewExpFlag)
        fprintf(RptFile, "\nRESUMED FROM THE PREVIOUSLY STOPED PROCESS\n\n");
fprintf(RptFile, "Training Data File: %s\n", TrainFile);
fprintf(RptFile, "Test Data File: %s\n", TestFile);
fprintf(RptFile, "Report Data File: %s\n", ReportFile);
fprintf(RptFile, "Network Structure File: %s\n", NetworkFile);
fprintf(RptFile, "Training Patterns: %d\n", TrainPtns);
fprintf(RptFile, "Test Patterns: %d\n", TestPtns);
fprintf(RptFile, "Input Neurons: %d\n", InputN);
fprintf(RptFile, "Output Neurons: %d\n", OutputN);
fprintf(RptFile,"Layers: %d\n", LayerN);
fprintf(RptFile, "Neurons in Layer: ");

ip = NeuronInLayer;
for(i=0; i<LayerN; i++)
        fprintf(RptFile, "%d\t", *ip++);

fprintf(RptFile, "\n");
fprintf(RptFile, "Activation in Layer: ");
```

```
                                          44
ip = ActInLayer;
for(i=0; i<LayerN; i++)
        fprintf(RptFile, "%d\t", *ip++);

fprintf(RptFile, "\n");
fprintf(RptFile,"Learn Rate: %f\n", LearnRate);
fprintf(RptFile,"Random Seed: %d\n", RandSeed);
fprintf(RptFile,"Input Scaling: %f\n", InputScale);
fprintf(RptFile,"Ending Threshold: %f\n", Threshold);
fprintf(RptFile,"Frequency: %f\n", Frequency);
fprintf(RptFile,"Initial Range %f\n", InitialRange);
fprintf(RptFile,"Report Rate %d\n", RptRate);
fprintf(RptFile,"Maximum Loops %d\n", MaxLoops);

fclose(RptFile);
}

/****************************************************

Routine:       GetData

Read in training and test data from file

****************************************************/ void    GetData()
{
register       i, j;
float          *fp1, *fp2, ftmp;
char           *TmpStr;
FILE           *DataFile;

/*Get training data*/
TmpStr = (char *)strcat(TrainPrefix, TrainFile);
if((DataFile = fopen(TmpStr,  "r")) == NULL){
        printf("cannot open file %s to read\n", TmpStr);
        exit(1);
        } for(i=0; i<TrainPtns; i++){
        fp1 = DataIn[i];
        fp2 = DataOut[i];
        for(j=0; j<InputN; j++){
                fscanf(DataFile, "%f", &ftmp);
                *fp1++ = ftmp/InputScale;
                }
        for(j=0; j<OutputN; j++)
                fscanf(DataFile, "%f", fp2++);
        }

/*Get test data*/
TmpStr = (char *)strcat(TestPrefix, TestFile);
if(TestPtns){
        if((DataFile = fopen(TmpStr,  "r")) == NULL){
                printf("cannot open file %s to read\n", TmpStr);
                exit(1);
                } for(i=TrainPtns; i<TrainPtns + TestPtns; i++){
                fp1 = DataIn[i];
                fp2 = DataOut[i];
                for(j=0; j<InputN; j++){
                        fscanf(DataFile, "%f", &ftmp);
                        *fp1++ = ftmp/InputScale;
                        }
                for(j=0; j<OutputN; j++)
```

```
                                        45
                        fscanf(DataFile, "%f", fp2++);
                }
        }
}

/***************************************************
Routine:        NormData

Normalize input data
                to range [0,1].

***************************************************/ void    NormData()
{
int     i, j, ptns;
float   ftmp;
FILE    *RptFile;

ptns = TrainPtns;
for(i=0; i<InputN; i++){
        ftmp = 0.0;
        for(j=0; j<ptns; j++)
                ftmp += DataIn[j][i];
        mean[i] = ftmp/ptns;
        } for(i=0; i<InputN; i++){
        ftmp = 0.0;
        for(j=0; j<ptns; j++)
                ftmp += pow((DataIn[j][i] - mean[i]),2.0);
        std[i] = pow((ftmp/ptns),0.5);
        } ptns = TrainPtns + TestPtns;
for(i=0; i<InputN; i++)
        for(j=0; j<ptns; j++)
                DataIn[j][i] = (DataIn[j][i]-mean[i])/std[i];

if((RptFile = fopen(ReportFile, "a"))==NULL){
        printf("cannot open file %s to write\n", ReportFile);
        exit(0);
        } fprintf(RptFile, "Mean\tSTD\n");
for(i=0; i<InputN; i++){
        fprintf(RptFile, "%f\t", mean[i]);
        fprintf(RptFile, "%f\n", std[i]);
        printf("%f\t", mean[i]);
        printf("%f\n", std[i]);
        }
fprintf(RptFile,"\n\n");
fprintf(RptFile, "Loops\tPtns\tNN-Out\tTarget\tSq-Err\n");
fclose(RptFile);
}

/***************************************************
Routine:        AllocateMemory Allocate memory to nuron
                structure and other arrays

***************************************************/ void    AllocateMemory()
{
```

```
                                           46
register       i;

/*Allocate space
for training data*/ for(i=0; i<TrainPtns + TestPtns; i++){
        if((DataIn[i] = (float*)calloc(InputN, sizeof(float)))==NULL){
                printf("cannot allocate memory to DataIn\n");
                exit(1);
                }
        if((DataOut[i] = (float*)calloc(OutputN, sizeof(float)))==NULL){
                printf("cannot allocate memory to DataOut\n");
                exit(1);
                }
        }

/*Allocate space for
input layer nurons*/ if((InputLayer = (float*)calloc(InputN, sizeof(float)))==NULL){
        printf("cannot allocate memory to InputLayer\n");
        exit(1);
        }

/*Allocate space for nurons
in the rest of Layers*/ for(i=0; i<LayerN; i++)
        if((Layer[i]=(NEURON *)calloc(NeuronInLayer[i],sizeof(NEURON)))==NULL){
                printf("cannot allocate memory to Layer[%d]\n", i);
                exit(1);
                }

/*Allocate space for target values*/ if((Target = (float*)calloc(OutputN, sizeof(float)))==NULL){
        printf("cannot allocate memory to Target\n");
        exit(1);
        }
}

/*********************************************************************

Routine:        InitialNetwork

Initialize the activation function configuration for
                each layer (nuron) and nuron structure in the network.

*********************************************************************/ void    InitialNetwork()
{
register        i, j, k;
float           *fp;
NEURON          *NeuronP;
double          drand48();

for(i=0; i<LayerN; i++){
        for(NeuronP = Layer[i], j=0; j<NeuronInLayer[i]; NeuronP++, j++){
                NeuronP->Activation = ActInLayer[i];
                NeuronP->Biase = (drand48() - 0.5) * InitialRange;
                NeuronP->Sum = 0.0;
                NeuronP->Out = 0.0;
                NeuronP->Error = 0.0;
                fp = NeuronP->Wt;
```

```
                        47
                if(i==0)
                        for(k=0; k<InputN; k++)
                                *fp++ = (drand48() - 0.5) * InitialRange;
                else
                        for(k=0; k<NeuronInLayer[i-1]; k++)
                                *fp++ = (drand48() - 0.5) * InitialRange;
        }
}

/*******************************************************************************

Routine:        ReadInNetwork

Initialize the activation function configuration for
                each layer (nuron) and read in the network weight
                values from stoped process.

*******************************************************************************/ void    ReadInNetwork()
{
register        i, j, k;
char            Header, Ctmp;
float           *fp;
NEURON          *NeuronP;
FILE            *NetFp;

if((NetFp=fopen(NetworkFile, "r"))==NULL){
        printf("cannot open file file %s to read\n", NetworkFile);
        exit(1);
        }

Header = 7 + InputN;
while(--Header){                                        /*Read off network file header*/
        fscanf(NetFp, "%c", &Ctmp);
        while(Ctmp!='\n')
                fscanf(NetFp, "%c", &Ctmp);
        } for(i=0; i<LayerN; i++){
        for(NeuronP = Layer[i], j=0; j<NeuronInLayer[i]; NeuronP++, j++){
                NeuronP->Activation = ActInLayer[i];
                fscanf(NetFp, "%f", &(NeuronP->Biase));
                fp = NeuronP->Wt;
                if(i==0)
                        for(k=0; k<InputN; k++)
                                fscanf(NetFp, "%f", fp++);
                else
                        for(k=0; k<NeuronInLayer[i-1]; k++)
                                fscanf(NetFp, "%f", fp++);
                }
        } fclose(NetFp);
}

/*******************************************************************************

Routine:        Resum()

Resum a stoped process.

*******************************************************************************/
```

```
                                        48
void    Resum()
{
void    ReportArg();
void    GetArguments();
void    AllocateMemory();
void    GetData();
void    InitialNetwork();
void    NormData();

GetArguments();
ReportArg(RESUM);
AllocateMemory();
GetData();
NormData();
ReadInNetwork();
}

/****************************************************************************

Routine:    Output

Calculate the output for each nuron.

****************************************************************************/
void    Output(Pattern)
int     Pattern;
{
int             i, j;
float           Tmp, rt;
NEURON          *NeuronP;
void            GetPattern();
float           GetSum();

GetPattern(Pattern);

for(i=0; i<LayerN; i++){
        NeuronP = Layer[i];
        for(j=0; j<NeuronInLayer[i]; j++, NeuronP++){
                rt = GetSum(i, j);
                Tmp = rt + NeuronP->Biase;
                NeuronP->Sum = Tmp;
                switch (NeuronP->Activation){
                        case SIGMOID:
                                NeuronP->Out = SIG(Tmp);
                                break;
                        case SINUSOID:
                                NeuronP->Out = SIN(Frequency, Tmp);
                                break;
                        case GAUSSIAN:
                                NeuronP->Out = GAUS(Tmp);
                                break;
                        case LINEAR:
                                NeuronP->Out = Tmp;
                                break;
                        default:
                                printf("invalide activation function type\n");
                                exit(0);
                }
        }
}
}
/****************************************************************************

Routine:    GetPattern
```

49

```
                Get input pattern for network

**********************************************************************/ void    GetPattern(Pattern)
int     Pattern;
{
register        i, j;
float           *fp1, *fp2;

fp1 = InputLayer;
fp2 = DataIn[Pattern];
for(i=0; i<InputN; i++)
        *fp1++ = *fp2++;

fp1 = Target;
fp2 = DataOut[Pattern];
for(i=0; i<OutputN; i++)
        *fp1++ = *fp2++;
}

/***********************************************************************

Routine:        GetSum()

Calculate the sum input for each nuron

**********************************************************************/ float   GetSum(LayerIndex, NeuronIndex)
int     LayerIndex, NeuronIndex;
{
register        i, j;
float           Sum, *fp1, *fp2;
NEURON          *NeuronP1, *NeuronP2;

if(LayerIndex == 0){
        NeuronP1 = (NEURON *)(Layer[LayerIndex] + NeuronIndex);
        fp1 = InputLayer;
        fp2 = NeuronP1->Wt;
        for(Sum=0.0, i=0; i<InputN; i++)
                Sum += (*fp1++ * *fp2++);
        }
else{
        NeuronP1 = (NEURON *)(Layer[LayerIndex] + NeuronIndex);
        NeuronP2 = Layer[LayerIndex - 1];
        fp1 = NeuronP1->Wt;
        for(Sum=0.0, i=0; i<NeuronInLayer[LayerIndex-1]; i++, NeuronP2++)
                Sum += (NeuronP2->Out * *fp1++);
        }
return(Sum);
}

/***********************************************************************

Routine:        BackPropgation

Modify network through backpropgation.

**********************************************************************/ void    BackPropagation()
{
void    GetDelta();
void    UpdateWt();
```

```
GetDelta();
UpdateWt();

}

/******************************************************************************
Routine:    GetDelta Calculate delta values for each nuron in the
            network, out layer and internal layer;
******************************************************************************/ void    GetDelta()
{
register        i;
void            OutLayerDelta();
void            InterLayerDelta();

OutLayerDelta();

for(i=LayerN-2; i>=0; i--)
        InterLayerDelta(i);

}

/******************************************************************************
Routine:    OutLayerDelta Calculate output layer delta
******************************************************************************/ void    OutLayerDelta()
{
register        i;
float           TmpOut;
NEURON          *NeuronP;

for(NeuronP = Layer[LayerN-1], i=0; i<NeuronInLayer[LayerN-1]; NeuronP++, i++){
        TmpOut = NeuronP->Out;
        NeuronP->Error = Target[i] - TmpOut;
        switch (NeuronP->Activation){
                case SIGMOID:
                        NeuronP->Delta = TmpOut * (1 - TmpOut) * NeuronP->Error;
                        break;
                case SINUSOID:
                        NeuronP->Delta =SLOPE(Frequency, NeuronP->Sum) * NeuronP->Error;
                        break;
                case GAUSSIAN:
                        NeuronP->Delta = -NeuronP->Sum * TmpOut * NeuronP->Error/20;
                        break;
                case LINEAR:
                        NeuronP->Delta = NeuronP->Error;
                        break;
                default:
                        printf("invalide activation function type\n");
                        exit(0);
                }
        }
}
```

51

```
/************************..,************************************************
Routine:      InterLayerDelta Calculate internal layer Delta
*****************************************************************************/
void    InterLayerDelta(LayerIndex)
int     LayerIndex;
{
register        i;
float           TmpOut;
NEURON          *NeuronP;
float           NeuronError();

for(NeuronP=Layer[LayerIndex],i=0; i<NeuronInLayer[LayerIndex]; NeuronP++,i++){
        TmpOut = NeuronP->Out;
        NeuronP->Error = NeuronError(LayerIndex, i);
        switch (NeuronP->Activation){
                case SIGMOID:
                        NeuronP->Delta = TmpOut * (1 - TmpOut) * NeuronP->Error;
                        break;
                case SINUSOID:
                        NeuronP->Delta =SLOPE(Frequency, NeuronP->Sum) * NeuronP->Error;
                        break;
                case GAUSSIAN:
                        NeuronP->Delta = -2 * NeuronP->Sum * TmpOut * NeuronP->Error;
                        break;
                case LINEAR:
                        NeuronP->Delta = NeuronP->Error;
                        break;
                default:
                        printf("invalide activation function type\n");
                        exit(0);
                }
        }
}

/****************************************************************************
Routine:      NeuronError Calculate error for each nuron in the internal LayerN.
*****************************************************************************/
float   NeuronError(LayerIndex, NeuronIndex)
int     LayerIndex, NeuronIndex;
{
register        i;
float           Error;
NEURON          *NeuronP;

Error = 0.0;
for(NeuronP=Layer[LayerIndex+1],i=0;i<NeuronInLayer[LayerIndex+1];NeuronP++,i++)
        Error += (NeuronP->Wt[NeuronIndex] * NeuronP->Delta);

return(Error);
}

/****************************************************************************
Routine:      UpdateWt Modify the weights associated with each nuron.
```

52

```
***************************************************************/
void      UpdateWt()
{
register      i;
void          FirstLayerWt();
void          RestLayerWt();

FirstLayerWt();

for(i=1; i<LayerN; i++)
        RestLayerWt(i);
}

/***********************************************************************

Routine:      FirstLayerWt

Modify the weights related to the first layer nurons.
***************************************************************/ void      FirstLayerWt()
{
register      i, j;
float         *fp1, *fp2;
NEURON        *NeuronP;

for(NeuronP = Layer[0], i=0; i<NeuronInLayer[0]; NeuronP++, i++){
        fp1 = InputLayer;
        fp2 = NeuronP->Wt;
        for(j=0; j<InputN; j++)
                *fp2++ += LearnRate * NeuronP->Delta * *fp1++;
        NeuronP->Biase += (LearnRate * NeuronP->Delta);
        }
}

/***********************************************************************

Routine:      RestLayerWt

Modify the weights related to the nurons of other LayerN.
***************************************************************/ void      RestLayerWt(LayerIndex)
{
register      i, j;
float         *fp;
NEURON        *NeuronP1, *NeuronP2;

for(NeuronP1=Layer[LayerIndex],i=0;i<NeuronInLayer[LayerIndex];NeuronP1++,i++){
        fp = NeuronP1->Wt;
        NeuronP2 = Layer[LayerIndex - 1];
        for(j=0; j<NeuronInLayer[LayerIndex - 1]; j++){
                *fp++ += (LearnRate*NeuronP1->Delta*NeuronP2->Out);
                NeuronP2++;
                }
        NeuronP1->Biase += (LearnRate * NeuronP1->Delta);
        }
}

/***********************************************************************
```

```
Routine:    DumpOutput

Save output to report file and rturn it to main.
***********************************************************************/ void    DumpOutput(PtnCnt, Loops, PtnSampled, SumError)
float   *SumError;
int     Loops, PtnCnt, PtnSampled;
{
register        i;
float           SqError, OutError, *fp;
NEURON          *NeuronP;
FILE            *RptFile;
void            DumpNetwork();

fp = DataOut[PtnSampled];
NeuronP = Layer[LayerN-1];
SqError = 0.0;
for(i=0;i<OutputN;fp++,NeuronP++,i++){
        OutError = *fp - NeuronP->Out;
        SqError += OutError*OutError;
        }
*SumError += SqError;

if((Loops % RptRate == 0) || (Loops == -1)){
        if((RptFile=fopen(ReportFile, "a"))==NULL){
                printf("cannot open file %s to append.\n", ReportFile);
                exit(1);
                } fprintf(RptFile, "%d\t%d\t", Loops, PtnSampled);
        NeuronP = Layer[LayerN-1];
        for(NeuronP=Layer[LayerN-1],i=0;i<NeuronInLayer[LayerN-1];NeuronP++,i++)
                fprintf(RptFile, "%6.4f\t", NeuronP->Out);

fp = DataOut[PtnSampled];
        for(i=0; i<OutputN; i++)
                fprintf(RptFile, "%6.4f\t", *fp++);

fprintf(RptFile, "%6.4f\t", SqError);

fprintf(RptFile, "\n");
        fclose(RptFile);
        } if(((Loops%RptRate==0)&&(PtnCnt==TrainPtns-1))||(PtnCnt==TrainPtns+TestPtns-1)){
        if((RptFile=fopen(ReportFile, "a"))==NULL){
                printf("cannot open file %s to append.\n", ReportFile);
                exit(1);
                }
        fprintf(RptFile, "SumError %6.4f\n\n\n", *SumError);
        fclose(RptFile);

DumpNetwork();
        }
}

/***********************************************************************

Routine:    DumpNetwork()

Save the final network configuration, including network
            parameters(layers, layer configuration, activation function
            configuration), weights, biases.
```

```
****************************************************************************/
void DumpNetwork()
{
register        i, j, k, WtN;
float           *fp;
NEURON          *NeuronP;
FILE            *NetFile;

if((NetFile=fopen(NetworkFile, "w"))==NULL){
        printf("cannot open file %s to write\n", NetworkFile);
        exit(1);
        } fprintf(NetFile, "%d\t%d\n", InputN, OutputN);
fprintf(NetFile, "%d\n", LayerN);
for(i=0; i<LayerN; i++)
        fprintf(NetFile, "%d\t", NeuronInLayer[i]);
fprintf(NetFile, "\n");
for(i=0; i<LayerN; i++)
        fprintf(NetFile, "%d\t", ActInLayer[i]);
fprintf(NetFile, "\n%6.4f\n", Frequency);
for(i=0; i<InputN; i++){
        fprintf(NetFile, "%f\t", mean[i]);
        fprintf(NetFile, "%f\n", std[i]);
        }
fprintf(NetFile, "\n\n");

for(i=0;i<LayerN;i++){
        WtN = i==0 ? InputN : NeuronInLayer[i-1];
        for(NeuronP=Layer[i],j=0;j<NeuronInLayer[i];NeuronP++,j++){
                fprintf(NetFile, "\n%6.4f\n", NeuronP->Biase);
                for(fp=NeuronP->Wt, k=0; k<WtN; k++){
                        fprintf(NetFile, "%6.4f   ", *fp++);
                        if(k%8==7)
                                fprintf(NetFile, "\n");
                        }
                }
        } fclose(NetFile);
}
```

Table 1, CDI Data Features

| Cell Name | TU-Features | | | | CDI-Features | | | |
|---|---|---|---|---|---|---|---|---|
| | Area | Intensity | Texture | Shape | Area | Shape1 | Shape2 | pg DNA |
| 1abnm1.llm | 404.0000 | 32.7401 | 1.9435 | 16.4808 | 210.0000 | 13.9700 | 1.0544 | 6.7600 |
| 2abnm1.llm | 684.0000 | 20.8582 | 1.0148 | 16.6349 | 372.0000 | 14.3900 | 1.0701 | 7.4300 |
| 3abnm1.llm | 897.0000 | 15.8283 | 1.0310 | 16.0489 | 491.0000 | 14.2200 | 1.0638 | 7.5400 |
| 4abnm1.llm | 451.0000 | 32.9889 | 2.0970 | 17.8400 | 243.0000 | 14.3100 | 1.0671 | 7.6000 |
| 5abnm1.llm | 941.0000 | 15.3900 | 0.9219 | 17.3134 | 499.0000 | 15.4500 | 1.1088 | 7.6100 |
| 6abnm1.llm | 875.0000 | 16.6069 | 0.8237 | 16.9775 | 464.0000 | 16.1900 | 1.1351 | 7.6400 |
| 7abnm1.llm | 803.0000 | 18.2416 | 1.0214 | 16.5426 | 431.0000 | 14.8400 | 1.0867 | 7.6600 |
| 8abnm1.llm | 960.0000 | 15.0896 | 0.8628 | 18.2120 | 512.0000 | 16.3500 | 1.1407 | 7.6700 |
| 9abnm1.llm | 524.0000 | 28.5573 | 1.8362 | 16.9286 | 280.0000 | 13.9100 | 1.0521 | 7.6800 |
| 10abnm1.llm | 555.0000 | 27.0739 | 1.2852 | 16.2654 | 294.0000 | 14.2300 | 1.0641 | 7.7100 |
| 11abnm1.llm | 721.0000 | 20.6963 | 1.0218 | 16.3786 | 381.0000 | 15.6900 | 1.1174 | 7.7100 |
| 12abnm1.llm | 744.0000 | 19.9516 | 1.1133 | 16.4619 | 402.0000 | 14.6200 | 1.0786 | 7.7200 |
| 13abnm1.llm | 795.0000 | 18.5912 | 0.9361 | 15.2432 | 425.0000 | 14.1000 | 1.0593 | 7.7200 |
| 14abnm1.llm | 867.0000 | 16.9977 | 1.2946 | 16.2816 | 462.0000 | 15.4800 | 1.1099 | 7.7400 |
| 15abnm1.llm | 537.0000 | 28.2235 | 2.3415 | 15.2271 | 282.0000 | 13.9100 | 1.0521 | 7.7400 |
| 16abnm1.llm | 989.0000 | 17.3225 | 0.8767 | 12.8355 | 434.0000 | 13.8900 | 1.0513 | 7.7400 |
| 17abnm1.llm | 458.0000 | 33.0044 | 2.2592 | 18.1822 | 242.0000 | 16.5300 | 1.1469 | 7.7400 |
| 18abnm1.llm | 666.0000 | 26.2312 | 1.3776 | 12.6925 | 252.0000 | 13.4300 | 1.0338 | 7.7500 |
| 19abnm1.llm | 680.0000 | 22.0353 | 1.3246 | 17.4438 | 363.0000 | 15.5400 | 1.1120 | 7.7500 |
| 20abnm1.llm | 763.0000 | 19.4666 | 0.9721 | 15.5462 | 410.0000 | 13.6700 | 1.0430 | 7.7500 |
| 21abnm1.llm | 848.0000 | 17.4469 | 1.0151 | 16.8109 | 451.0000 | 15.8600 | 1.1234 | 7.7600 |
| 22abnm1.llm | 614.0000 | 24.4902 | 1.0553 | 17.1677 | 325.0000 | 15.4600 | 1.1092 | 7.7700 |
| 23abnm1.llm | 634.0000 | 23.7461 | 1.3670 | 16.9748 | 333.0000 | 14.4300 | 1.0716 | 7.7900 |
| 24abnm1.llm | 839.0000 | 17.7199 | 1.0374 | 16.7563 | 448.0000 | 15.6000 | 1.1142 | 7.7900 |
| 25abnm1.llm | 1319.0000 | 10.9303 | 0.7964 | 15.3883 | 711.0000 | 14.4700 | 1.0731 | 7.8000 |
| 26abnm1.llm | 765.0000 | 19.5739 | 1.2852 | 15.8410 | 412.0000 | 13.6500 | 1.0422 | 7.8200 |
| 27abnm1.llm | 608.0000 | 24.9408 | 1.2900 | 16.7486 | 319.0000 | 15.7000 | 1.1178 | 7.8200 |
| 28abnm1.llm | 639.0000 | 23.7011 | 1.3287 | 15.5996 | 344.0000 | 13.5500 | 1.0384 | 7.8300 |
| 29abnm1.llm | 583.0000 | 26.0223 | 1.1690 | 15.9486 | 312.0000 | 13.8600 | 1.0502 | 7.8500 |
| 30abnm1.llm | 847.0000 | 17.6411 | 1.0447 | 16.7624 | 455.0000 | 14.8300 | 1.0863 | 7.8500 |
| 31abnm1.llm | 468.0000 | 32.8077 | 1.5527 | 16.2680 | 245.0000 | 14.9500 | 1.0907 | 7.8500 |
| 32abnm1.llm | 714.0000 | 21.3725 | 1.2128 | 18.5722 | 378.0000 | 15.9700 | 1.1273 | 7.8600 |
| 33abnm1.llm | 653.0000 | 23.1700 | 1.5059 | 16.8230 | 348.0000 | 16.0500 | 1.1301 | 7.8800 |

| Cell Name | TU-Features | | | CDI-Features | | | | |
|---|---|---|---|---|---|---|---|---|
| | Area | Intensity | Texture | Shape | Area | Shape1 | Shape2 | pg DNA |
| 34abnm1.llm | 741.0000 | 20.4345 | 1.0367 | 15.6945 | 398.0000 | 13.9800 | 1.0547 | 7.8800 |
| 35abnm1.llm | 625.0000 | 24.5552 | 1.3995 | 15.9490 | 330.0000 | 14.3500 | 1.0686 | 7.8900 |
| 36abnm1.llm | 827.0000 | 18.2116 | 1.2222 | 15.9670 | 442.0000 | 14.4800 | 1.0734 | 7.8900 |
| 37abnm1.llm | 571.0000 | 26.8757 | 1.3419 | 17.2182 | 298.0000 | 15.1100 | 1.0965 | 7.9000 |
| 38abnm1.llm | 479.0000 | 32.2338 | 1.6522 | 15.8944 | 250.0000 | 14.9400 | 1.0904 | 7.9000 |
| 39abnm1.llm | 583.0000 | 26.5575 | 1.3061 | 19.0904 | 302.0000 | 16.4900 | 1.1455 | 7.9100 |
| 40abnm1.llm | 712.0000 | 21.5534 | 0.9922 | 15.2154 | 381.0000 | 13.5500 | 1.0384 | 7.9200 |
| 41abnm1.llm | 626.0000 | 24.5415 | 1.2514 | 15.2162 | 336.0000 | 13.7000 | 1.0441 | 7.9300 |
| 42abnm1.llm | 533.0000 | 28.9231 | 1.7094 | 16.2313 | 284.0000 | 14.5400 | 1.0757 | 7.9400 |
| 43abnm1.llm | 441.0000 | 35.3424 | 2.7101 | 18.5831 | 236.0000 | 15.5000 | 1.1106 | 7.9400 |
| 44abnm1.llm | 415.0000 | 37.6361 | 2.2546 | 16.5080 | 219.0000 | 13.8000 | 1.0479 | 7.9600 |
| 45abnm1.llm | 702.0000 | 21.8490 | 1.4025 | 16.6410 | 374.0000 | 14.6000 | 1.0779 | 7.9600 |
| 46abnm1.llm | 645.0000 | 23.9209 | 1.5235 | 15.1991 | 347.0000 | 13.3100 | 1.0292 | 7.9600 |
| 47abnm1.llm | 695.0000 | 22.2590 | 1.0682 | 16.1923 | 372.0000 | 14.8600 | 1.0874 | 7.9900 |
| 48abnm1.llm | 652.0000 | 23.5813 | 1.3141 | 15.6184 | 354.0000 | 14.7600 | 1.0838 | 7.9900 |
| 49abnm1.llm | 551.0000 | 28.3067 | 2.0550 | 16.9599 | 291.0000 | 14.6000 | 1.0779 | 8.0000 |
| 50abnm1.llm | 695.0000 | 22.2734 | 1.4163 | 18.9664 | 369.0000 | 17.1300 | 1.1675 | 8.0000 |
| 51abnm1.llm | 748.0000 | 20.5321 | 1.3564 | 16.1001 | 400.0000 | 15.1800 | 1.0991 | 8.0200 |
| 52abnm1.llm | 734.0000 | 21.0286 | 1.0749 | 15.3320 | 390.0000 | 14.0500 | 1.0574 | 8.0200 |
| 53abnm1.llm | 755.0000 | 20.5629 | 1.0419 | 15.7109 | 402.0000 | 14.1100 | 1.0596 | 8.0300 |
| 54abnm1.llm | 633.0000 | 24.7267 | 0.9780 | 16.3067 | 338.0000 | 14.8700 | 1.0878 | 8.0600 |
| 55abnm1.llm | 558.0000 | 28.2724 | 1.3482 | 17.2407 | 297.0000 | 15.8900 | 1.1245 | 8.0600 |
| 56abnm1.llm | 783.0000 | 19.9438 | 1.0594 | 15.3805 | 418.0000 | 14.5400 | 1.0757 | 8.1100 |
| 57abnm1.llm | 796.0000 | 19.6834 | 1.0522 | 16.9288 | 428.0000 | 14.6800 | 1.0808 | 8.1300 |
| 58abnm1.llm | 532.0000 | 29.9680 | 1.7831 | 15.8547 | 279.0000 | 15.0000 | 1.0925 | 8.1300 |
| 59abnm1.llm | 779.0000 | 27.7691 | 1.4229 | 18.2256 | 417.0000 | 16.5000 | 1.1459 | 8.1900 |
| 60abnm1.llm | 1546.0000 | 13.8493 | 0.6295 | 17.9554 | 842.0000 | 17.6000 | 1.1835 | 11.0900 |
| 61abnm1.llm | 891.0000 | 25.0314 | 1.2790 | 18.7919 | 479.0000 | 16.3300 | 1.1400 | 11.4500 |
| 62abnm1.llm | 1018.0000 | 21.6660 | 1.2232 | 17.3903 | 553.0000 | 16.2800 | 1.1382 | 11.4900 |
| 63abnm1.llm | 1099.0000 | 20.0937 | 1.0398 | 17.7788 | 578.0000 | 17.6300 | 1.1845 | 11.4900 |
| 65abnm1.llm | 1094.0000 | 20.4031 | 1.0792 | 15.1430 | 587.0000 | 14.2900 | 1.0664 | 11.5200 |
| 66abnm1.llm | 1018.0000 | 21.9804 | 1.2311 | 17.9704 | 553.0000 | 15.5700 | 1.1131 | 11.5300 |
| 67abnm1.llm | 1506.0000 | 14.4874 | 0.8500 | 15.2686 | 818.0000 | 14.4600 | 1.0727 | 11.5800 |

| Cell Name | TU-Features | | | CDI-Features | | | | |
|---|---|---|---|---|---|---|---|---|
| | Area | Intensity | Texture | Shape | Area | Shape1 | CDI1 | Shape2 | pg DNA |
| 68abnm1.llm | 940.0000 | 24.0564 | 1.1558 | 18.7647 | 505.0000 | 16.7400 | 1.1542 | 11.6600 |
| 69abnm1.llm | 1016.0000 | 22.1142 | 1.1709 | 15.7069 | 545.0000 | 14.2200 | 1.0638 | 11.6700 |
| 70abnm1.llm | 1379.0000 | 16.1523 | 1.0323 | 15.6601 | 745.0000 | 14.5100 | 1.0746 | 11.7300 |
| 71abnm1.llm | 1140.0000 | 19.6860 | 1.0514 | 15.2009 | 616.0000 | 13.9500 | 1.0536 | 11.7400 |
| 72abnm1.llm | 1098.0000 | 20.5683 | 1.1892 | 16.3247 | 593.0000 | 14.8600 | 1.0874 | 11.7400 |
| 73abnm1.llm | 946.0000 | 24.0222 | 1.0597 | 16.9072 | 501.0000 | 16.3600 | 1.1410 | 11.7600 |
| 74abnm1.llm | 1081.0000 | 20.9926 | 1.1222 | 17.3148 | 577.0000 | 15.7200 | 1.1185 | 11.7800 |
| 75abnm1.llm | 1118.0000 | 20.2996 | 0.9812 | 17.3556 | 596.0000 | 17.8000 | 1.1902 | 11.8300 |
| 76abnm1.llm | 1028.0000 | 22.2753 | 1.0360 | 15.4394 | 551.0000 | 14.0200 | 1.0563 | 11.8400 |
| 77abnm1.llm | 733.0000 | 31.6426 | 1.5604 | 16.9906 | 389.0000 | 15.5700 | 1.1131 | 11.8500 |
| 78abnm1.llm | 1387.0000 | 16.2408 | 1.0663 | 16.3235 | 746.0000 | 15.5800 | 1.1135 | 11.8500 |
| 79abnm1.llm | 861.0000 | 26.8235 | 1.0502 | 16.8836 | 456.0000 | 15.8900 | 1.1245 | 11.8800 |
| 80abnm1.llm | 1235.0000 | 18.5036 | 0.9911 | 17.4284 | 667.0000 | 16.4200 | 1.1431 | 11.9200 |
| 81abnm1.llm | 1120.0000 | 20.4009 | 0.8903 | 17.6172 | 602.0000 | 17.2200 | 1.1706 | 11.9200 |
| 82abnm1.llm | 1438.0000 | 15.8442 | 0.9469 | 16.5407 | 779.0000 | 14.7100 | 1.0819 | 11.9800 |
| 83abnm1.llm | 1096.0000 | 21.1268 | 0.8739 | 15.4732 | 592.0000 | 14.3200 | 1.0675 | 12.0000 |
| 84abnm1.llm | 1377.0000 | 16.6609 | 0.9296 | 16.0602 | 740.0000 | 15.2900 | 1.1031 | 12.0300 |
| 85abnm1.llm | 1151.0000 | 20.0756 | 0.9736 | 15.5730 | 620.0000 | 13.8900 | 1.0513 | 12.0600 |
| 86abnm1.llm | 1154.0000 | 20.3293 | 1.0914 | 15.5325 | 618.0000 | 14.3300 | 1.0679 | 12.1800 |
| 87abnm1.llm | 1451.0000 | 15.8994 | 0.8416 | 17.0083 | 781.0000 | 16.3600 | 1.1410 | 12.1900 |
| 88abnm1.llm | 865.0000 | 27.5376 | 1.4785 | 15.4216 | 460.0000 | 14.2600 | 1.0653 | 12.2000 |
| 89abnm1.llm | 734.0000 | 32.3379 | 1.1446 | 15.9871 | 393.0000 | 15.0700 | 1.0951 | 12.2200 |
| 90abnm1.llm | 1140.0000 | 20.6746 | 0.8654 | 15.2802 | 617.0000 | 14.1400 | 1.0608 | 12.2300 |
| 91abnm1.llm | 793.0000 | 29.9710 | 1.7612 | 15.7734 | 430.0000 | 14.3800 | 1.0697 | 12.2700 |
| 92abnm1.llm | 1177.0000 | 20.1793 | 0.9459 | 16.5669 | 631.0000 | 15.6400 | 1.1156 | 12.3300 |
| 93abnm1.llm | 1130.0000 | 21.0513 | 1.1186 | 15.4722 | 610.0000 | 14.1500 | 1.0611 | 12.3700 |
| 94abnm1.llm | 948.0000 | 25.3070 | 1.3397 | 15.1496 | 512.0000 | 13.6700 | 1.0430 | 12.3700 |
| 95abnm1.llm | 1320.0000 | 18.0159 | 0.9754 | 16.8859 | 707.0000 | 17.0600 | 1.1652 | 12.4000 |
| 96abnm1.llm | 1136.0000 | 21.0731 | 0.8169 | 15.3340 | 615.0000 | 14.2200 | 1.0638 | 12.4100 |
| 97abnm1.llm | 744.0000 | 32.7325 | 1.3343 | 15.6312 | 393.0000 | 13.9600 | 1.0540 | 12.4100 |
| 98abnm1.llm | 1632.0000 | 14.3002 | 0.7740 | 16.4651 | 875.0000 | 15.6800 | 1.1170 | 12.4100 |
| 99abnm1.llm | 1336.0000 | 17.8144 | 0.9249 | 15.6963 | 720.0000 | 15.0100 | 1.0929 | 12.4300 |
| 100abnm1.llm | 844.0000 | 28.6931 | 0.9949 | 17.7586 | 445.0000 | 16.4800 | 1.1452 | 12.4600 |

| Cell Name | TU-Features ||||| CDI-Features ||| pg DNA |
|---|---|---|---|---|---|---|---|---|
| | Area | Intensity | Texture | Shape | Area | Shape1 | Shape2 | |
| 101abnm1.llm | 1164.0000 | 20.6443 | 0.8691 | 16.0468 | 635.0000 | 14.9000 | 1.0889 | 12.4700 |
| 102abnm1.llm | 1409.0000 | 16.8701 | 0.8862 | 17.0943 | 752.0000 | 16.5700 | 1.1483 | 12.4800 |
| 103abnm1.llm | 1401.0000 | 17.0678 | 0.8643 | 16.4130 | 748.0000 | 15.3300 | 1.1045 | 12.5300 |
| 104abnm1.llm | 1307.0000 | 18.2869 | 1.0545 | 17.2668 | 717.0000 | 15.8000 | 1.1213 | 12.5300 |
| 105abnm1.llm | 1488.0000 | 15.9913 | 0.9101 | 15.9640 | 796.0000 | 15.7900 | 1.1209 | 12.5400 |
| 106abnm1.llm | 1321.0000 | 18.1923 | 0.9148 | 16.6864 | 707.0000 | 16.0600 | 1.1305 | 12.5700 |
| 107abnm1.llm | 977.0000 | 24.9079 | 1.4657 | 16.2453 | 520.0000 | 15.2700 | 1.1023 | 12.5700 |
| 108abnm1.llm | 662.0000 | 37.5393 | 1.4370 | 15.9982 | 352.0000 | 13.8200 | 1.0487 | 12.6900 |
| 109abnm1.llm | 1454.0000 | 16.5983 | 0.9594 | 17.2492 | 790.0000 | 15.8000 | 1.1213 | 12.7000 |
| 110abnm1.llm | 785.0000 | 31.6395 | 1.2069 | 17.1363 | 420.0000 | 15.3100 | 1.1038 | 12.7600 |
| 111abnm1.llm | 1037.0000 | 23.8457 | 1.0985 | 15.8200 | 558.0000 | 14.6000 | 1.0779 | 12.7900 |
| 112abnm1.llm | 783.0000 | 32.0038 | 1.4774 | 16.2823 | 419.0000 | 14.3300 | 1.0679 | 12.8200 |
| 113abnm1.llm | 1132.0000 | 22.5062 | 1.1370 | 15.1956 | 615.0000 | 14.3300 | 1.0679 | 13.1700 |
| 114abnm1.llm | 1877.0000 | 13.1598 | 0.7661 | 15.6586 | 1011.0000 | 14.6500 | 1.0797 | 13.1800 |
| 115abnm1.llm | 1746.0000 | 14.2526 | 0.8653 | 15.9450 | 941.0000 | 15.2500 | 1.1016 | 13.2100 |
| 116abnm1.llm | 952.0000 | 27.0483 | 1.4664 | 17.2437 | 502.0000 | 16.9000 | 1.1597 | 13.2300 |
| 117abnm1.llm | 1474.0000 | 17.0943 | 0.9871 | 16.3616 | 802.0000 | 15.2000 | 1.0998 | 13.2500 |
| 118abnm1.llm | 1884.0000 | 13.3073 | 0.6489 | 15.4500 | 1034.0000 | 15.6600 | 1.1163 | 13.4700 |
| 119abnm1.llm | 1418.0000 | 18.1770 | 1.0256 | 16.6468 | 767.0000 | 15.2900 | 1.1031 | 13.4900 |
| 120abnm1.llm | 678.0000 | 39.3717 | 2.0172 | 16.0092 | 364.0000 | 13.8600 | 1.0502 | 13.5800 |
| 121abnm1.llm | 1218.0000 | 21.5755 | 1.3997 | 15.2359 | 663.0000 | 13.9900 | 1.0551 | 13.6800 |
| 122abnm1.llm | 1797.0000 | 14.5058 | 0.8205 | 16.4213 | 981.0000 | 15.0500 | 1.0944 | 13.8200 |
| 123abnm1.llm | 1043.0000 | 25.8025 | 1.1909 | 16.9116 | 561.0000 | 14.9100 | 1.0893 | 13.9000 |
| 124abnm1.llm | 887.0000 | 30.7046 | 1.7210 | 16.0065 | 478.0000 | 15.3600 | 1.1056 | 13.9600 |
| 125abnm1.llm | 1083.0000 | 25.1191 | 1.1881 | 15.2968 | 586.0000 | 14.3100 | 1.0671 | 14.0700 |
| 126abnm1.llm | 1410.0000 | 19.1809 | 0.9226 | 15.7355 | 760.0000 | 15.2000 | 1.0998 | 14.0800 |
| 127abnm1.llm | 1194.0000 | 23.4079 | 0.7628 | 15.5746 | 635.0000 | 15.2300 | 1.1009 | 14.4600 |
| 128abnm1.llm | 1545.0000 | 18.4783 | 0.9397 | 16.7973 | 838.0000 | 15.5200 | 1.1113 | 14.9700 |
| 129abnm1.llm | 1460.0000 | 19.8527 | 1.2218 | 15.7584 | 784.0000 | 14.9900 | 1.0922 | 15.0700 |
| 130abnm1.llm | 1442.0000 | 20.3786 | 0.9962 | 15.5789 | 770.0000 | 15.1400 | 1.0976 | 15.2800 |
| 131abnm1.llm | 1963.0000 | 15.0912 | 1.0344 | 15.3240 | 1058.0000 | 15.1800 | 1.0991 | 15.6600 |
| 132abnm1.llm | 784.0000 | 39.3852 | 1.8592 | 18.0357 | 411.0000 | 19.4400 | 1.2438 | 15.7100 |
| 133abnm1.llm | 2245.0000 | 13.2517 | 0.8534 | 16.0843 | 1215.0000 | 15.4900 | 1.1102 | 15.8800 |

| Cell Name | TU-Features | | | | CDI-Features | | | | |
|---|---|---|---|---|---|---|---|---|---|
| | Area | Intensity | Texture | Shape | Area | Shape1 | Shape2 | | pg DNA |
| 134abnm1.llm | 1293.0000 | 24.0495 | 1.1681 | 18.0934 | 697.0000 | 17.3500 | 1.1750 | | 16.1000 |
| 135abnm1.llm | 1351.0000 | 23.2324 | 1.1507 | 16.5522 | 735.0000 | 15.3000 | 1.1034 | | 16.2700 |
| 136abnm1.llm | 1287.0000 | 24.6931 | 0.9586 | 15.5126 | 690.0000 | 14.8900 | 1.0885 | | 16.3900 |
| 137abnm1.llm | 975.0000 | 32.8636 | 1.0944 | 16.3046 | 530.0000 | 14.7900 | 1.0849 | | 16.4600 |
| 138abnm1.llm | 1070.0000 | 30.1832 | 1.5486 | 18.0971 | 581.0000 | 16.5200 | 1.1466 | | 16.5400 |
| 139abnm1.llm | 1765.0000 | 18.3768 | 1.0051 | 15.5714 | 957.0000 | 14.7800 | 1.0845 | | 16.9500 |
| 140abnm1.llm | 1493.0000 | 21.9350 | 0.9110 | 16.2249 | 808.0000 | 14.7100 | 1.0819 | | 16.9600 |
| 141abnm1.llm | 1393.0000 | 24.4329 | 0.9520 | 16.5163 | 749.0000 | 15.6200 | 1.1149 | | 17.6100 |
| 142abnm1.llm | 1449.0000 | 24.0476 | 1.0109 | 17.0754 | 788.0000 | 17.0300 | 1.1641 | | 18.0600 |
| 143abnm1.llm | 1266.0000 | 27.7401 | 1.2332 | 15.9554 | 689.0000 | 14.9600 | 1.0911 | | 18.0800 |
| 144abnm1.llm | 2031.0000 | 17.2344 | 0.7801 | 15.9749 | 1100.0000 | 15.3600 | 1.1056 | | 18.3800 |
| 145abnm1.llm | 1498.0000 | 23.6555 | 0.9618 | 17.2937 | 801.0000 | 17.0900 | 1.1662 | | 18.4000 |
| 146abnm1.llm | 1355.0000 | 28.1225 | 1.4012 | 16.0867 | 739.0000 | 14.9900 | 1.0922 | | 19.5800 |
| 147abnm1.llm | 1748.0000 | 21.9399 | 0.8656 | 17.1126 | 952.0000 | 16.7100 | 1.1531 | | 19.9400 |
| 148abnm1.llm | 2859.0000 | 12.7300 | 0.6679 | 16.8645 | 1615.0000 | 16.9700 | 1.1621 | | 19.9800 |
| 149abnm1.llm | 1816.0000 | 20.7015 | 0.9646 | 16.3144 | 995.0000 | 16.8100 | 1.1497 | | 20.0100 |
| 150abnm1.llm | 950.0000 | 41.7105 | 2.2477 | 16.0544 | 508.0000 | 14.9000 | 1.0889 | | 20.5500 |
| 151abnm1.llm | 1915.0000 | 20.5499 | 0.8933 | 31.5557 | 1045.0000 | 16.3200 | 1.1396 | | 20.5500 |
| 152abnm1.llm | 1104.0000 | 36.8016 | 1.1934 | 17.4787 | 597.0000 | 15.7400 | 1.1192 | | 20.7300 |
| 153abnm1.llm | 1893.0000 | 21.1141 | 0.9175 | 15.4823 | 1027.0000 | 14.7700 | 1.0841 | | 20.7900 |
| 154abnm1.llm | 2087.0000 | 19.4878 | 0.8729 | 16.3909 | 1145.0000 | 16.6400 | 1.1507 | | 21.3900 |
| 155abnm1.llm | 1740.0000 | 23.7466 | 1.3319 | 15.4621 | 948.0000 | 14.3900 | 1.0701 | | 21.4000 |
| 156abnm1.llm | 1529.0000 | 28.0340 | 1.2063 | 15.3007 | 825.0000 | 14.4400 | 1.0720 | | 21.9700 |
| 157abnm1.llm | 1476.0000 | 29.1159 | 1.2682 | 18.3581 | 795.0000 | 17.1300 | 1.1675 | | 22.0300 |
| 158abnm1.llm | 1885.0000 | 22.6992 | 1.0380 | 15.1689 | 1019.0000 | 15.1500 | 1.0980 | | 22.1600 |
| 159abnm1.llm | 2036.0000 | 21.0550 | 0.9702 | 16.3784 | 1112.0000 | 15.3300 | 1.1045 | | 22.3200 |
| 160abnm1.llm | 1924.0000 | 23.0223 | 1.0306 | 16.9166 | 1031.0000 | 17.2200 | 1.1706 | | 22.9300 |
| 161abnm1.llm | 2771.0000 | 15.6860 | 0.9472 | 15.9922 | 1522.0000 | 15.3200 | 1.1041 | | 23.0100 |
| 162abnm1.llm | 1500.0000 | 30.2700 | 1.3682 | 16.3722 | 802.0000 | 15.8200 | 1.1220 | | 23.2700 |
| 163abnm1.llm | 2459.0000 | 18.1114 | 0.9580 | 15.4244 | 1340.0000 | 14.7300 | 1.0827 | | 23.3800 |
| 164abnm1.llm | 1999.0000 | 22.6398 | 1.2989 | 15.6463 | 1091.0000 | 14.9200 | 1.0896 | | 23.4800 |
| 165abnm1.llm | 2097.0000 | 22.6762 | 1.6668 | 17.0259 | 1331.0000 | 14.8900 | 1.0885 | | 23.9800 |
| 166abnm1.llm | 1881.0000 | 25.0229 | 1.2004 | 15.1140 | 1014.0000 | 14.5400 | 1.0757 | | 24.1700 |

| Cell Name | TU-Features ||||  Area | CDI-Features ||| pg DNA |
|---|---|---|---|---|---|---|---|---|---|
| | Area | Intensity | Texture | Shape | | Shape1 | Shape2 | | |
| 167abnm1.llm | 1523.0000 | 31.1136 | 1.1826 | 17.6129 | 813.0000 | 16.8900 | 1.1593 | 24.2100 |
| 168abnm1.llm | 2433.0000 | 19.4891 | 1.0838 | 40.8814 | 1281.0000 | 14.3000 | 1.0668 | 24.3000 |
| 169abnm1.llm | 2713.0000 | 15.6775 | 0.9759 | 6.9643 | 1681.0000 | 15.8300 | 1.1224 | 24.5600 |
| 170abnm1.llm | 2202.0000 | 21.4655 | 1.1188 | 15.6983 | 1201.0000 | 14.8800 | 1.0882 | 24.6100 |
| 171abnm1.llm | 1665.0000 | 28.9532 | 1.5529 | 16.6035 | 891.0000 | 16.1500 | 1.1337 | 24.7400 |
| 172abnm1.llm | 1965.0000 | 24.4458 | 0.9328 | 17.2607 | 1061.0000 | 16.8000 | 1.1562 | 24.8900 |
| 173abnm1.llm | 2497.0000 | 19.3440 | 0.8735 | 15.1675 | 1369.0000 | 14.2200 | 1.0638 | 25.2700 |
| 174abnm1.llm | 2171.0000 | 22.9083 | 1.3483 | 15.2784 | 1191.0000 | 14.4400 | 1.0720 | 25.8100 |
| 175abnm1.llm | 1432.0000 | 35.3715 | 1.6716 | 16.0151 | 775.0000 | 14.9100 | 1.0893 | 25.8900 |
| 176abnm1.llm | 1995.0000 | 25.4120 | 0.7999 | 15.7817 | 1097.0000 | 15.6500 | 1.1160 | 26.2200 |
| 177abnm1.llm | 1876.0000 | 30.6311 | 0.9774 | 17.4348 | 1017.0000 | 20.1300 | 1.2657 | 29.4700 |
| 178abnm1.llm | 1705.0000 | 35.8721 | 1.7585 | 17.1206 | 912.0000 | 16.7000 | 1.1528 | 31.2500 |
| 179abnm1.llm | 1976.0000 | 36.1437 | 1.4052 | 16.8758 | 1074.0000 | 17.8100 | 1.1905 | 36.6200 |
| 180abnm1.llm | 3208.0000 | 25.9451 | 1.0129 | 22.7934 | 1939.0000 | 14.5300 | 1.0753 | 45.0300 |
| 181abnm1.llm | 2438.0000 | 38.1686 | 1.6592 | 16.4342 | 1334.0000 | 17.2000 | 1.1699 | 47.6200 |
| 182abnm1.llm | 3844.0000 | 30.4919 | 0.9972 | 16.2145 | 3990.0000 | 14.3200 | 1.0675 | 96.7700 |
| 1abnm2.llm | 477.0000 | 35.5639 | 1.8254 | 18.7324 | 257.0000 | 15.0700 | 1.0951 | 8.8500 |
| 2abnm2.llm | 470.0000 | 36.1362 | 1.8660 | 15.9820 | 242.0000 | 14.1800 | 1.0623 | 8.8700 |
| 3abnm2.llm | 527.0000 | 32.6433 | 2.1437 | 16.1250 | 274.0000 | 14.7700 | 1.0841 | 8.9500 |
| 4abnm2.llm | 404.0000 | 42.8267 | 1.7417 | 16.0510 | 214.0000 | 13.7000 | 1.0441 | 8.9900 |
| 5abnm2.llm | 537.0000 | 32.3315 | 1.0615 | 16.1104 | 284.0000 | 14.7300 | 1.0827 | 9.0900 |
| 6abnm2.llm | 381.0000 | 48.1995 | 1.9848 | 15.7056 | 199.0000 | 13.6400 | 1.0418 | 9.4800 |
| 7abnm2.llm | 326.0000 | 59.2761 | 3.7149 | 16.2436 | 169.0000 | 13.5900 | 1.0399 | 9.9700 |
| 8abnm2.llm | 387.0000 | 49.8605 | 2.1865 | 15.6568 | 202.0000 | 13.8500 | 1.0498 | 9.9900 |
| 9abnm2.llm | 428.0000 | 44.9416 | 2.4008 | 16.6935 | 225.0000 | 13.7000 | 1.0441 | 9.9900 |
| 10abnm2.llm | 596.0000 | 32.6510 | 1.4181 | 17.2848 | 316.0000 | 15.5700 | 1.1131 | 10.1600 |
| 11abnm2.llm | 499.0000 | 39.2064 | 1.9465 | 17.1195 | 260.0000 | 15.2800 | 1.1027 | 10.1700 |
| 12abnm2.llm | 651.0000 | 30.0661 | 1.4512 | 16.4543 | 347.0000 | 14.9700 | 1.0915 | 10.2800 |
| 13abnm2.llm | 537.0000 | 36.8492 | 2.2211 | 15.2271 | 285.0000 | 13.3200 | 1.0295 | 10.2900 |
| 14abnm2.llm | 548.0000 | 36.1715 | 1.5235 | 15.9865 | 288.0000 | 13.6600 | 1.0426 | 10.3800 |
| 15abnm2.llm | 432.0000 | 47.8426 | 2.2626 | 17.5258 | 221.0000 | 15.0900 | 1.0958 | 10.6700 |
| 16abnm2.llm | 428.0000 | 48.4556 | 2.7023 | 16.0065 | 222.0000 | 14.4600 | 1.0727 | 10.7500 |
| 17abnm2.llm | 732.0000 | 31.3702 | 1.7642 | 13.4584 | 306.0000 | 15.4800 | 1.1099 | 11.1800 |

61

| Cell Name | TU-Features | | | | CDI-Features | | | |
|---|---|---|---|---|---|---|---|---|
| | Area | Intensity | Texture | Shape | Area | Shape1 | Shape2 | pg DNA |
| 18abnm2.llm | 401.0000 | 56.7357 | 2.7270 | 15.7039 | 210.0000 | 13.4000 | 1.0326 | 11.7600 |
| 19abnm2.llm | 679.0000 | 34.3299 | 1.2473 | 18.4217 | 360.0000 | 15.9100 | 1.1252 | 12.0900 |
| 20abnm2.llm | 759.0000 | 31.1555 | 1.1989 | 17.4711 | 403.0000 | 15.7400 | 1.1192 | 12.3500 |
| 21abnm2.llm | 430.0000 | 59.1628 | 2.4349 | 17.8042 | 227.0000 | 13.6200 | 1.0411 | 13.1700 |
| 22abnm2.llm | 471.0000 | 54.2654 | 2.4414 | 16.1644 | 249.0000 | 14.5000 | 1.0742 | 13.2500 |
| 23abnm2.llm | 651.0000 | 39.5914 | 1.3388 | 16.6411 | 343.0000 | 14.2800 | 1.0660 | 13.4100 |
| 24abnm2.llm | 545.0000 | 47.8000 | 2.2031 | 17.4418 | 283.0000 | 15.4800 | 1.1099 | 13.4500 |
| 25abnm2.llm | 510.0000 | 54.1745 | 1.3759 | 15.6205 | 269.0000 | 13.8600 | 1.0502 | 14.3000 |
| 26abnm2.llm | 780.0000 | 35.5987 | 1.2775 | 18.5930 | 411.0000 | 16.7200 | 1.1535 | 14.3800 |
| 27abnm2.llm | 814.0000 | 35.0528 | 1.4628 | 15.6622 | 433.0000 | 14.2300 | 1.0641 | 14.9400 |
| 28abnm2.llm | 565.0000 | 51.0177 | 2.7816 | 16.5053 | 297.0000 | 14.1100 | 1.0596 | 14.9400 |
| 29abnm2.llm | 585.0000 | 50.3436 | 2.1761 | 16.3974 | 311.0000 | 14.2100 | 1.0634 | 15.3100 |
| 30abnm2.llm | 780.0000 | 37.8000 | 1.8214 | 16.8995 | 406.0000 | 16.3200 | 1.1396 | 15.3300 |
| 31abnm2.llm | 772.0000 | 38.5298 | 1.4750 | 17.2794 | 412.0000 | 15.3700 | 1.1059 | 15.4200 |
| 32abnm2.llm | 711.0000 | 41.6428 | 2.2090 | 16.5042 | 376.0000 | 14.7400 | 1.0830 | 15.4400 |
| 33abnm2.llm | 486.0000 | 62.8539 | 3.0140 | 17.5775 | 253.0000 | 16.9800 | 1.1624 | 15.7900 |
| 34abnm2.llm | 848.0000 | 35.7170 | 1.3513 | 16.1853 | 456.0000 | 14.8500 | 1.0871 | 15.9100 |
| 35abnm2.llm | 468.0000 | 66.0064 | 2.2814 | 15.6928 | 248.0000 | 13.9100 | 1.0521 | 15.9500 |
| 36abnm2.llm | 524.0000 | 58.9905 | 2.5618 | 16.0118 | 272.0000 | 13.3900 | 1.0323 | 15.9800 |
| 37abnm2.llm | 789.0000 | 39.1039 | 1.6719 | 18.6784 | 415.0000 | 17.2600 | 1.1720 | 16.0500 |
| 38abnm2.llm | 587.0000 | 53.0698 | 2.4273 | 17.5498 | 309.0000 | 14.7600 | 1.0838 | 16.0800 |
| 39abnm2.llm | 721.0000 | 43.2899 | 1.6570 | 18.1282 | 379.0000 | 16.1100 | 1.1323 | 16.1700 |
| 40abnm2.llm | 682.0000 | 45.8988 | 1.8282 | 16.8675 | 361.0000 | 14.6100 | 1.0783 | 16.2700 |
| 41abnm2.llm | 756.0000 | 41.7725 | 1.6405 | 15.6203 | 407.0000 | 13.9100 | 1.0521 | 16.4800 |
| 42abnm2.llm | 737.0000 | 43.4179 | 1.5955 | 17.2986 | 394.0000 | 15.0700 | 1.0951 | 16.5500 |
| 43abnm2.llm | 521.0000 | 61.6257 | 2.5109 | 16.6410 | 280.0000 | 15.0300 | 1.0936 | 16.5800 |
| 44abnm2.llm | 680.0000 | 47.7471 | 2.6447 | 17.8211 | 365.0000 | 15.0500 | 1.0944 | 16.8200 |
| 45abnm2.llm | 652.0000 | 49.7362 | 2.4748 | 16.1671 | 351.0000 | 13.9700 | 1.0544 | 16.8400 |
| 46abnm2.llm | 968.0000 | 33.6973 | 0.8768 | 15.5197 | 507.0000 | 14.4800 | 1.0734 | 16.8600 |
| 47abnm2.llm | 704.0000 | 46.7003 | 1.9030 | 17.5053 | 371.0000 | 16.4400 | 1.1438 | 17.0600 |
| 48abnm2.llm | 611.0000 | 54.1129 | 1.8770 | 18.0139 | 318.0000 | 17.6000 | 1.1835 | 17.1000 |
| 49abnm2.llm | 819.0000 | 40.6081 | 1.4529 | 17.8506 | 435.0000 | 16.1600 | 1.1340 | 17.1700 |
| 50abnm2.llm | 635.0000 | 52.4677 | 2.2400 | 15.8060 | 342.0000 | 13.6800 | 1.0434 | 17.2000 |

| Cell Name | TU-Features | | | | CDI-Features | | | pg DNA |
|---|---|---|---|---|---|---|---|---|
| | Area | Intensity | Texture | Shape | Area | Shape1 | Shape2 | |
| 51abnm2.IIm | 614.0000 | 54.5635 | 2.2703 | 15.5909 | 322.0000 | 14.2500 | 1.0649 | 17.3100 |
| 52abnm2.IIm | 899.0000 | 37.3393 | 1.6733 | 17.0987 | 480.0000 | 15.6700 | 1.1167 | 17.4600 |
| 53abnm2.IIm | 764.0000 | 44.3181 | 1.5985 | 19.6181 | 412.0000 | 17.2100 | 1.1703 | 17.5200 |
| 54abnm2.IIm | 712.0000 | 47.6826 | 1.7734 | 16.5116 | 379.0000 | 14.2300 | 1.0641 | 17.5700 |
| 55abnm2.IIm | 844.0000 | 39.8969 | 1.3950 | 15.5135 | 458.0000 | 14.6200 | 1.0786 | 17.7600 |
| 56abnm2.IIm | 740.0000 | 46.4351 | 1.4458 | 15.6158 | 394.0000 | 14.1900 | 1.0626 | 17.8100 |
| 57abnm2.IIm | 839.0000 | 41.0155 | 1.5330 | 18.7419 | 441.0000 | 16.3000 | 1.1389 | 17.8400 |
| 58abnm2.IIm | 512.0000 | 70.6855 | 3.2284 | 17.3254 | 271.0000 | 14.9500 | 1.0907 | 18.6000 |
| 59abnm2.IIm | 972.0000 | 36.7109 | 1.4588 | 15.9022 | 521.0000 | 14.4100 | 1.0708 | 18.6100 |
| 60abnm2.IIm | 587.0000 | 63.0852 | 2.5453 | 16.2745 | 309.0000 | 14.4500 | 1.0723 | 19.1000 |
| 61abnm2.IIm | 687.0000 | 54.5298 | 2.0675 | 19.0588 | 368.0000 | 16.4700 | 1.1448 | 19.3900 |
| 62abnm2.IIm | 712.0000 | 53.3455 | 1.5209 | 16.4073 | 378.0000 | 14.6700 | 1.0805 | 19.5700 |
| 63abnm2.IIm | 649.0000 | 59.1972 | 2.6843 | 16.9591 | 339.0000 | 15.8300 | 1.1224 | 19.7600 |
| 64abnm2.IIm | 1252.0000 | 30.6478 | 1.3334 | 16.1015 | 668.0000 | 16.0300 | 1.1294 | 20.0200 |
| 65abnm2.IIm | 1029.0000 | 37.5267 | 1.3449 | 16.6911 | 548.0000 | 15.8700 | 1.1238 | 20.1000 |
| 66abnm2.IIm | 983.0000 | 39.4201 | 1.1333 | 15.2829 | 526.0000 | 14.1300 | 1.0604 | 20.1100 |
| 67abnm2.IIm | 575.0000 | 68.8939 | 2.6924 | 15.6997 | 306.0000 | 13.2500 | 1.0268 | 20.3100 |
| 68abnm2.IIm | 666.0000 | 60.8453 | 1.9989 | 16.0084 | 352.0000 | 14.2700 | 1.0656 | 20.9000 |
| 69abnm2.IIm | 787.0000 | 54.1855 | 1.5609 | 15.2347 | 414.0000 | 13.5500 | 1.0384 | 21.8800 |
| 70abnm2.IIm | 1127.0000 | 37.6114 | 0.9986 | 15.2066 | 608.0000 | 13.5600 | 1.0388 | 21.9900 |
| 71abnm2.IIm | 936.0000 | 46.5438 | 1.8174 | 16.4228 | 505.0000 | 13.9600 | 1.0540 | 22.8500 |
| 72abnm2.IIm | 1252.0000 | 35.3395 | 1.3506 | 16.8619 | 670.0000 | 15.8900 | 1.1245 | 23.1100 |
| 73abnm2.IIm | 671.0000 | 81.2712 | 2.9781 | 16.0388 | 356.0000 | 14.4400 | 1.0720 | 28.0800 |
| 74abnm2.IIm | 1085.0000 | 51.8636 | 2.3402 | 15.8883 | 579.0000 | 14.8200 | 1.0860 | 29.1000 |
| 75abnm2.IIm | 1263.0000 | 45.2597 | 1.2462 | 16.5250 | 669.0000 | 16.3900 | 1.1420 | 29.5600 |
| 76abnm2.IIm | 981.0000 | 60.6361 | 2.0419 | 18.1121 | 527.0000 | 16.0700 | 1.1308 | 30.7000 |
| 77abnm2.IIm | 1099.0000 | 56.1292 | 1.7948 | 15.6519 | 595.0000 | 14.1800 | 1.0623 | 31.8100 |
| 78abnm2.IIm | 1145.0000 | 54.8533 | 1.6015 | 15.9772 | 608.0000 | 14.9700 | 1.0915 | 32.4300 |
| 79abnm2.IIm | 1182.0000 | 54.8553 | 1.7803 | 15.2975 | 637.0000 | 14.2600 | 1.0653 | 33.5600 |
| 80abnm2.IIm | 1299.0000 | 54.4457 | 1.5456 | 15.2639 | 696.0000 | 14.5100 | 1.0746 | 36.5600 |
| 81abnm2.IIm | 1311.0000 | 53.9306 | 1.6455 | 16.9467 | 710.0000 | 15.5000 | 1.1106 | 36.6100 |
| 82abnm2.IIm | 922.0000 | 78.5011 | 3.3264 | 16.1386 | 489.0000 | 15.5100 | 1.1110 | 37.2400 |
| 83abnm2.IIm | 1702.0000 | 68.1181 | 2.1465 | 17.4359 | 918.0000 | 17.0100 | 1.1634 | 59.6900 |

62

63

| Cell Name | TU-Features | | | | Area | CDI-Features | | pg DNA |
|---|---|---|---|---|---|---|---|---|
| | Area | Intensity | Texture | Shape | | Shape1 | Shape2 | |
| 1norm1.Ilm | 829.0000 | 13.9976 | 0.5204 | 15.5388 | 445.0000 | 14.1200 | 1.0600 | 5.8400 |
| 2norm1.Ilm | 400.0000 | 30.5900 | 1.3702 | 15.7432 | 211.0000 | 13.0600 | 1.0195 | 5.8900 |
| 3norm1.Ilm | 929.0000 | 12.6200 | 0.4814 | 15.4335 | 500.0000 | 13.8200 | 1.0487 | 5.9200 |
| 4norm1.Ilm | 854.0000 | 13.9227 | 0.9088 | 16.0716 | 458.0000 | 14.1600 | 1.0615 | 5.9400 |
| 5norm1.Ilm | 899.0000 | 13.7831 | 0.7461 | 15.5476 | 477.0000 | 15.1400 | 1.0976 | 6.2000 |
| 6norm1.Ilm | 784.0000 | 15.9566 | 0.7729 | 15.9258 | 417.0000 | 13.8000 | 1.0479 | 6.2300 |
| 7norm1.Ilm | 970.0000 | 12.9247 | 0.6221 | 15.4877 | 519.0000 | 14.2500 | 1.0649 | 6.2600 |
| 8norm1.Ilm | 1001.0000 | 12.5514 | 0.6883 | 15.8558 | 533.0000 | 13.8200 | 1.0487 | 6.2700 |
| 9norm1.Ilm | 734.0000 | 17.7466 | 0.8364 | 15.5018 | 390.0000 | 13.8100 | 1.0483 | 6.4000 |
| 10norm1.Ilm | 699.0000 | 18.7668 | 0.5711 | 16.0997 | 370.0000 | 13.9900 | 1.0551 | 6.4400 |
| 11norm1.Ilm | 783.0000 | 16.7676 | 0.8280 | 15.2167 | 415.0000 | 14.0200 | 1.0563 | 6.4700 |
| 12norm1.Ilm | 875.0000 | 14.9417 | 0.6716 | 15.3095 | 472.0000 | 13.7800 | 1.0472 | 6.5000 |
| 13norm1.Ilm | 857.0000 | 15.2439 | 0.7673 | 17.1276 | 465.0000 | 15.1000 | 1.0962 | 6.5200 |
| 14norm1.Ilm | 525.0000 | 25.7181 | 1.1933 | 16.0661 | 280.0000 | 13.6100 | 1.0407 | 6.5400 |
| 15norm1.Ilm | 564.0000 | 23.8138 | 1.5553 | 16.0877 | 296.0000 | 13.5200 | 1.0372 | 6.5500 |
| 16norm1.Ilm | 909.0000 | 14.4962 | 0.5906 | 15.4027 | 489.0000 | 13.5900 | 1.0399 | 6.5600 |
| 17norm1.Ilm | 893.0000 | 14.7973 | 0.6538 | 15.2798 | 482.0000 | 13.8100 | 1.0483 | 6.6000 |
| 18norm1.Ilm | 888.0000 | 15.0214 | 0.6497 | 15.7669 | 477.0000 | 13.9800 | 1.0547 | 6.6400 |
| 19norm1.Ilm | 578.0000 | 23.7232 | 0.9702 | 15.9723 | 304.0000 | 14.1700 | 1.0619 | 6.6700 |
| 20norm1.Ilm | 934.0000 | 14.2794 | 0.6503 | 15.9313 | 498.0000 | 14.7300 | 1.0827 | 6.6800 |
| 21norm1.Ilm | 1103.0000 | 12.0943 | 0.5795 | 15.7108 | 591.0000 | 14.1700 | 1.0619 | 6.7100 |
| 22norm1.Ilm | 694.0000 | 19.8199 | 0.9172 | 15.3625 | 372.0000 | 13.7200 | 1.0449 | 6.7500 |
| 23norm1.Ilm | 701.0000 | 19.9244 | 1.1098 | 15.6286 | 368.0000 | 13.7400 | 1.0457 | 6.7500 |
| 24norm1.Ilm | 589.0000 | 23.5722 | 1.0210 | 15.5950 | 312.0000 | 13.8600 | 1.0502 | 6.8000 |
| 25norm1.Ilm | 884.0000 | 15.7048 | 0.9203 | 15.1536 | 465.0000 | 13.8000 | 1.0479 | 6.8400 |
| 26norm1.Ilm | 619.0000 | 22.8611 | 0.9762 | 15.9931 | 325.0000 | 13.2700 | 1.0276 | 6.8400 |
| 27norm1.Ilm | 774.0000 | 17.9432 | 0.9931 | 16.6430 | 417.0000 | 14.2800 | 1.0660 | 6.9300 |
| 28norm1.Ilm | 913.0000 | 15.3034 | 0.5987 | 15.9861 | 486.0000 | 14.6600 | 1.0801 | 6.9300 |
| 29norm1.Ilm | 873.0000 | 16.0447 | 0.7130 | 15.9721 | 473.0000 | 13.6900 | 1.0438 | 6.9400 |
| 30norm1.Ilm | 421.0000 | 34.1829 | 1.3731 | 15.8153 | 220.0000 | 14.3000 | 1.0668 | 6.9500 |
| 31norm1.Ilm | 628.0000 | 23.0239 | 0.9891 | 15.6871 | 333.0000 | 13.6900 | 1.0438 | 6.9900 |
| 32norm1.Ilm | 846.0000 | 16.7589 | 0.7663 | 16.5497 | 455.0000 | 14.1800 | 1.0623 | 7.0000 |
| 33norm1.Ilm | 922.0000 | 15.3905 | 0.7614 | 15.7032 | 494.0000 | 14.2200 | 1.0638 | 7.0400 |

| Cell Name | TU-Features | | | | CDI-Features | | | |
|---|---|---|---|---|---|---|---|---|
| | Area | Intensity | Texture | Shape | Area | Shape1 | Shape2 | pg DNA |
| 34norm1.llm | 734.0000 | 19.7398 | 0.6940 | 15.1631 | 391.0000 | 13.6500 | 1.0422 | 7.0500 |
| 35norm1.llm | 769.0000 | 18.6983 | 1.0086 | 17.5232 | 413.0000 | 15.3300 | 1.1045 | 7.0700 |
| 36norm1.llm | 804.0000 | 17.8234 | 0.6859 | 15.0726 | 433.0000 | 13.5300 | 1.0376 | 7.0800 |
| 37norm1.llm | 908.0000 | 15.7379 | 0.7508 | 15.5727 | 494.0000 | 13.5500 | 1.0384 | 7.0900 |
| 38norm1.llm | 750.0000 | 19.4213 | 1.2244 | 15.5760 | 399.0000 | 14.1400 | 1.0608 | 7.1100 |
| 39norm1.llm | 986.0000 | 14.5112 | 0.7487 | 15.2364 | 528.0000 | 14.0700 | 1.0581 | 7.1300 |
| 40norm1.llm | 965.0000 | 14.8922 | 0.6741 | 15.7171 | 521.0000 | 13.5700 | 1.0392 | 7.1600 |
| 41norm1.llm | 761.0000 | 19.1485 | 0.7621 | 15.5177 | 408.0000 | 13.6300 | 1.0415 | 7.1600 |
| 42norm1.llm | 723.0000 | 20.4952 | 0.8950 | 15.4941 | 383.0000 | 13.9000 | 1.0517 | 7.1900 |
| 43norm1.llm | 1025.0000 | 14.1727 | 0.7472 | 15.3409 | 548.0000 | 14.0400 | 1.0570 | 7.2100 |
| 44norm1.llm | 740.0000 | 19.9608 | 0.9139 | 17.7378 | 389.0000 | 16.2700 | 1.1379 | 7.2100 |
| 45norm1.llm | 1140.0000 | 12.6895 | 0.9041 | 15.6094 | 605.0000 | 13.7700 | 1.0468 | 7.2400 |
| 46norm1.llm | 848.0000 | 17.3597 | 0.7561 | 15.4132 | 455.0000 | 13.8800 | 1.0510 | 7.2800 |
| 47norm1.llm | 842.0000 | 17.7019 | 0.9171 | 15.7488 | 450.0000 | 14.4500 | 1.0723 | 7.3100 |
| 48norm1.llm | 853.0000 | 17.4478 | 0.6947 | 15.5458 | 451.0000 | 14.2300 | 1.0641 | 7.3300 |
| 49norm1.llm | 821.0000 | 18.1328 | 1.2696 | 18.3710 | 438.0000 | 16.1800 | 1.1347 | 7.3300 |
| 50norm1.llm | 426.0000 | 35.8826 | 1.7100 | 17.1022 | 222.0000 | 14.4500 | 1.0723 | 7.3500 |
| 51norm1.llm | 1101.0000 | 13.3170 | 0.7811 | 15.2076 | 591.0000 | 14.5800 | 1.0771 | 7.3500 |
| 52norm1.llm | 750.0000 | 20.0480 | 1.1810 | 15.2402 | 401.0000 | 14.3500 | 1.0686 | 7.3900 |
| 53norm1.llm | 643.0000 | 23.7123 | 1.2457 | 17.5018 | 342.0000 | 15.1300 | 1.0973 | 7.4300 |
| 54norm1.llm | 872.0000 | 17.2569 | 0.9886 | 15.2978 | 476.0000 | 13.8200 | 1.0487 | 7.5000 |
| 55norm1.llm | 512.0000 | 33.3730 | 1.5203 | 15.7643 | 271.0000 | 13.5600 | 1.0388 | 8.2000 |
| 56norm1.llm | 845.0000 | 25.3349 | 0.9582 | 15.3369 | 452.0000 | 14.0100 | 1.0559 | 10.4000 |
| 57norm1.llm | 782.0000 | 31.5665 | 1.0186 | 15.4001 | 416.0000 | 14.1200 | 1.0630 | 11.9000 |
| 58norm1.llm | 1611.0000 | 15.1651 | 0.6805 | 15.6159 | 867.0000 | 14.2100 | 1.0600 | 12.1700 |
| 59norm1.llm | 1102.0000 | 23.9020 | 0.8711 | 15.6093 | 594.0000 | 14.2100 | 1.0634 | 12.8300 |
| 60norm1.llm | 1367.0000 | 19.8639 | 1.0502 | 15.3404 | 743.0000 | 14.2400 | 1.0645 | 13.3700 |
| 61norm1.llm | 1141.0000 | 25.2603 | 0.7147 | 15.3230 | 610.0000 | 14.3900 | 1.0701 | 13.9600 |
| 62norm1.llm | 1607.0000 | 25.6248 | 0.6687 | 15.0269 | 856.0000 | 14.1500 | 1.0611 | 19.6500 |
| 1norm2.llm | 739.0000 | 16.1800 | 0.6105 | 15.3969 | 397.0000 | 13.8100 | 1.0483 | 6.4800 |
| 2norm2.llm | 737.0000 | 16.6309 | 0.7365 | 15.2696 | 394.0000 | 13.4600 | 1.0349 | 6.5900 |
| 3norm2.llm | 834.0000 | 15.1247 | 0.5746 | 15.4183 | 442.0000 | 14.1200 | 1.0600 | 6.8000 |
| 4norm2.llm | 399.0000 | 32.8421 | 1.6651 | 15.4548 | 210.0000 | 12.8600 | 1.0116 | 6.8400 |

| Cell Name | TU-Features | | | | CDI-Features | | | | |
|---|---|---|---|---|---|---|---|---|---|
| | Area | Intensity | Texture | Shape | Area | Shape1 | Shape2 | pg DNA |
| 5norm2.llm | 640.0000 | 20.1453 | 0.7910 | 15.2119 | 339.0000 | 14.1500 | 1.0611 | 6.8500 |
| 6norm2.llm | 715.0000 | 17.9720 | 0.7678 | 16.0890 | 378.0000 | 15.2000 | 1.0998 | 6.8700 |
| 7norm2.llm | 786.0000 | 16.4059 | 0.4398 | 15.3498 | 419.0000 | 13.4400 | 1.0342 | 6.8900 |
| 8norm2.llm | 695.0000 | 18.5640 | 0.7117 | 16.3716 | 373.0000 | 14.8200 | 1.0860 | 6.8900 |
| 9norm2.llm | 806.0000 | 15.8313 | 0.6381 | 15.8857 | 434.0000 | 13.7600 | 1.0464 | 6.9100 |
| 10norm2.llm | 591.0000 | 22.3469 | 1.0362 | 16.3922 | 306.0000 | 14.6800 | 1.0808 | 6.9100 |
| 11norm2.llm | 606.0000 | 21.4604 | 0.8639 | 15.6861 | 323.0000 | 14.2400 | 1.0645 | 6.9200 |
| 12norm2.llm | 800.0000 | 16.0063 | 0.6230 | 15.7033 | 430.0000 | 13.3100 | 1.0292 | 6.9300 |
| 13norm2.llm | 543.0000 | 24.2910 | 1.1193 | 16.2174 | 286.0000 | 13.9300 | 1.0529 | 6.9500 |
| 14norm2.llm | 352.0000 | 38.0795 | 2.0224 | 15.4303 | 186.0000 | 12.6500 | 1.0033 | 6.9500 |
| 15norm2.llm | 1054.0000 | 12.0503 | 0.5816 | 15.4815 | 570.0000 | 13.9600 | 1.0540 | 6.9800 |
| 16norm2.llm | 893.0000 | 14.3987 | 0.7698 | 15.9907 | 475.0000 | 14.6700 | 1.0805 | 6.9800 |
| 17norm2.llm | 646.0000 | 20.2678 | 0.8043 | 15.9470 | 343.0000 | 13.7900 | 1.0476 | 6.9800 |
| 18norm2.llm | 746.0000 | 17.4812 | 0.6793 | 15.2524 | 400.0000 | 13.4600 | 1.0349 | 6.9900 |
| 19norm2.llm | 564.0000 | 23.6312 | 1.0450 | 16.6868 | 297.0000 | 14.1800 | 1.0623 | 6.9900 |
| 20norm2.llm | 954.0000 | 13.4319 | 0.5617 | 15.3861 | 515.0000 | 14.0600 | 1.0578 | 7.0000 |
| 21norm2.llm | 966.0000 | 13.3375 | 0.5634 | 15.2559 | 521.0000 | 16.4100 | 1.1427 | 7.0400 |
| 22norm2.llm | 739.0000 | 17.7564 | 0.6593 | 16.1227 | 390.0000 | 13.5600 | 1.0388 | 7.0500 |
| 23norm2.llm | 1051.0000 | 12.2731 | 0.6192 | 15.3007 | 565.0000 | 14.1800 | 1.0623 | 7.0500 |
| 24norm2.llm | 581.0000 | 23.0637 | 0.8578 | 16.6743 | 305.0000 | 14.9900 | 1.0922 | 7.0600 |
| 25norm2.llm | 592.0000 | 22.4476 | 1.0138 | 15.0614 | 315.0000 | 13.9200 | 1.0525 | 7.0600 |
| 26norm2.llm | 872.0000 | 14.9656 | 0.6327 | 15.6097 | 471.0000 | 13.5200 | 1.0372 | 7.0700 |
| 27norm2.llm | 879.0000 | 14.7850 | 0.6401 | 15.9938 | 472.0000 | 14.6500 | 1.0797 | 7.0700 |
| 28norm2.llm | 662.0000 | 20.0332 | 0.8027 | 15.9229 | 351.0000 | 14.1300 | 1.0604 | 7.0700 |
| 29norm2.llm | 766.0000 | 17.1358 | 0.7652 | 15.1823 | 413.0000 | 13.6800 | 1.0434 | 7.0700 |
| 30norm2.llm | 811.0000 | 16.1541 | 0.6651 | 15.9517 | 431.0000 | 14.4800 | 1.0734 | 7.0700 |
| 31norm2.llm | 750.0000 | 17.5067 | 0.7456 | 16.1578 | 391.0000 | 15.9000 | 1.1248 | 7.0800 |
| 32norm2.llm | 945.0000 | 13.7344 | 0.5718 | 15.0494 | 510.0000 | 13.7600 | 1.0464 | 7.0800 |
| 33norm2.llm | 698.0000 | 18.8453 | 0.8129 | 15.1731 | 372.0000 | 13.6600 | 1.0426 | 7.0800 |
| 34norm2.llm | 794.0000 | 16.5025 | 0.7168 | 16.1258 | 423.0000 | 14.7200 | 1.0823 | 7.0900 |
| 35norm2.llm | 647.0000 | 20.7342 | 1.0379 | 16.1833 | 340.0000 | 15.1900 | 1.0994 | 7.0900 |
| 36norm2.llm | 668.0000 | 19.8817 | 0.6944 | 15.2747 | 357.0000 | 13.5300 | 1.0376 | 7.0900 |
| 37norm2.llm | 995.0000 | 13.1045 | 0.5972 | 15.6561 | 525.0000 | 14.7900 | 1.0849 | 7.1000 |

66

| Cell Name | TU-Features | | | | CDI-Features | | | pg DNA |
|---|---|---|---|---|---|---|---|---|
| | Area | Intensity | Texture | Shape | Area | Shape1 | Shape2 | |
| 38norm2.llm | 896.0000 | 14.6496 | 0.6724 | 15.6637 | 475.0000 | 14.7000 | 1.0816 | 7.1000 |
| 39norm2.llm | 852.0000 | 15.4378 | 0.6386 | 16.1761 | 453.0000 | 15.4200 | 1.1077 | 7.1100 |
| 40norm2.llm | 671.0000 | 19.9791 | 0.8681 | 15.8145 | 358.0000 | 13.4900 | 1.0361 | 7.1100 |
| 41norm2.llm | 939.0000 | 13.9340 | 0.6596 | 15.5435 | 503.0000 | 14.0600 | 1.0578 | 7.1100 |
| 42norm2.llm | 912.0000 | 14.3300 | 0.6747 | 16.3805 | 487.0000 | 15.8700 | 1.1238 | 7.1200 |
| 43norm2.llm | 713.0000 | 18.5905 | 0.7097 | 15.4368 | 379.0000 | 14.1600 | 1.0615 | 7.1200 |
| 44norm2.llm | 683.0000 | 19.5564 | 0.7648 | 15.6834 | 363.0000 | 14.4400 | 1.0720 | 7.1200 |
| 45norm2.llm | 654.0000 | 20.4465 | 0.8594 | 17.3189 | 349.0000 | 14.4800 | 1.0734 | 7.1200 |
| 46norm2.llm | 620.0000 | 21.6613 | 0.8223 | 15.8896 | 328.0000 | 13.6200 | 1.0411 | 7.1200 |
| 47norm2.llm | 920.0000 | 14.2065 | 0.6332 | 15.0939 | 503.0000 | 13.2500 | 1.0268 | 7.1300 |
| 48norm2.llm | 682.0000 | 19.6892 | 0.8686 | 15.2075 | 368.0000 | 13.8800 | 1.0510 | 7.1400 |
| 49norm2.llm | 635.0000 | 21.0866 | 0.9653 | 16.1457 | 337.0000 | 14.3200 | 1.0675 | 7.1400 |
| 50norm2.llm | 777.0000 | 17.0849 | 0.6788 | 15.5963 | 416.0000 | 13.8300 | 1.0491 | 7.1500 |
| 51norm2.llm | 781.0000 | 17.0845 | 0.7675 | 15.0250 | 418.0000 | 14.1300 | 1.0604 | 7.1600 |
| 52norm2.llm | 757.0000 | 17.6473 | 0.6650 | 15.8384 | 410.0000 | 14.1300 | 1.0604 | 7.1600 |
| 53norm2.llm | 751.0000 | 17.8123 | 0.7231 | 16.2075 | 396.0000 | 14.4100 | 1.0708 | 7.1600 |
| 54norm2.llm | 728.0000 | 18.4396 | 0.7574 | 15.6295 | 390.0000 | 13.8900 | 1.0513 | 7.1700 |
| 55norm2.llm | 743.0000 | 18.1427 | 0.6481 | 15.2156 | 395.0000 | 13.6200 | 1.0411 | 7.1700 |
| 56norm2.llm | 698.0000 | 19.1633 | 0.7414 | 15.2745 | 376.0000 | 13.6900 | 1.0438 | 7.1800 |
| 57norm2.llm | 437.0000 | 31.5057 | 1.6531 | 15.2362 | 228.0000 | 13.0000 | 1.0171 | 7.1800 |
| 58norm2.llm | 940.0000 | 14.0979 | 0.7010 | 14.9559 | 506.0000 | 13.8100 | 1.0483 | 7.1900 |
| 59norm2.llm | 845.0000 | 15.7929 | 0.7005 | 15.8530 | 448.0000 | 14.6000 | 1.0779 | 7.1900 |
| 60norm2.llm | 778.0000 | 17.2969 | 0.7458 | 15.0154 | 415.0000 | 13.8800 | 1.0510 | 7.2000 |
| 61norm2.llm | 584.0000 | 23.1781 | 0.8527 | 15.3789 | 312.0000 | 13.4100 | 1.0330 | 7.2100 |
| 62norm2.llm | 847.0000 | 15.7462 | 0.7271 | 15.3660 | 454.0000 | 13.6100 | 1.0407 | 7.2100 |
| 63norm2.llm | 690.0000 | 19.6812 | 0.8149 | 15.4515 | 364.0000 | 13.6400 | 1.0418 | 7.2200 |
| 64norm2.llm | 755.0000 | 17.7642 | 0.8051 | 15.6121 | 401.0000 | 14.5100 | 1.0746 | 7.2200 |
| 65norm2.llm | 759.0000 | 17.6443 | 0.6277 | 15.4605 | 406.0000 | 13.3700 | 1.0315 | 7.2200 |
| 66norm2.llm | 716.0000 | 19.0042 | 0.7604 | 15.0599 | 380.0000 | 13.8400 | 1.0495 | 7.2300 |
| 67norm2.llm | 876.0000 | 15.1667 | 0.5883 | 16.0485 | 474.0000 | 14.4300 | 1.0716 | 7.2300 |
| 68norm2.llm | 380.0000 | 36.5632 | 1.8022 | 15.9864 | 198.0000 | 12.6900 | 1.0049 | 7.2300 |
| 69norm2.llm | 483.0000 | 28.6998 | 1.1076 | 15.3781 | 251.0000 | 13.9500 | 1.0536 | 7.2400 |
| 70norm2.llm | 767.0000 | 17.6271 | 0.6738 | 15.7996 | 412.0000 | 13.6500 | 1.0422 | 7.2400 |

| Cell Name | TU-Features | | | | CDI-Features | | | pg DNA |
|---|---|---|---|---|---|---|---|---|
| | Area | Intensity | Texture | Shape | Area | Shape1 | Shape2 | |
| 71norm2.llm | 865.0000 | 15.6428 | 0.6649 | 14.8921 | 462.0000 | 13.6800 | 1.0434 | 7.2500 |
| 72norm2.llm | 908.0000 | 14.6189 | 0.6734 | 14.9908 | 497.0000 | 13.6000 | 1.0403 | 7.2500 |
| 73norm2.llm | 864.0000 | 15.6285 | 0.7256 | 14.7559 | 459.0000 | 13.8100 | 1.0483 | 7.2600 |
| 74norm2.llm | 539.0000 | 25.5213 | 1.5552 | 16.0159 | 282.0000 | 13.0500 | 1.0191 | 7.2600 |
| 75norm2.llm | 961.0000 | 14.0021 | 0.6421 | 14.9196 | 512.0000 | 13.6900 | 1.0438 | 7.2700 |
| 76norm2.llm | 853.0000 | 15.8523 | 0.6956 | 14.8820 | 458.0000 | 13.5000 | 1.0365 | 7.2800 |
| 77norm2.llm | 865.0000 | 15.4936 | 0.6182 | 15.2389 | 459.0000 | 14.4400 | 1.0720 | 7.2900 |
| 78norm2.llm | 876.0000 | 15.3139 | 0.6823 | 14.9468 | 479.0000 | 13.4100 | 1.0330 | 7.3000 |
| 79norm2.llm | 808.0000 | 16.7364 | 0.8149 | 18.0211 | 441.0000 | 15.1300 | 1.0973 | 7.3000 |
| 80norm2.llm | 705.0000 | 19.3730 | 0.7534 | 15.1228 | 380.0000 | 13.6300 | 1.0415 | 7.3100 |
| 81norm2.llm | 757.0000 | 18.0568 | 0.7334 | 15.0308 | 405.0000 | 13.6500 | 1.0422 | 7.3200 |
| 82norm2.llm | 786.0000 | 17.3003 | 0.8023 | 15.9830 | 425.0000 | 14.0600 | 1.0578 | 7.3300 |
| 83norm2.llm | 746.0000 | 18.4718 | 0.7732 | 15.9005 | 391.0000 | 14.0200 | 1.0563 | 7.3400 |
| 84norm2.llm | 779.0000 | 17.5135 | 0.7765 | 16.1267 | 417.0000 | 14.5700 | 1.0768 | 7.3400 |
| 85norm2.llm | 821.0000 | 16.4446 | 0.6473 | 15.8247 | 445.0000 | 13.9300 | 1.0529 | 7.3500 |
| 86norm2.llm | 573.0000 | 24.3106 | 1.0435 | 15.2890 | 307.0000 | 12.8600 | 1.0116 | 7.3600 |
| 87norm2.llm | 660.0000 | 21.0955 | 0.8349 | 16.7084 | 356.0000 | 14.0800 | 1.0585 | 7.3700 |
| 88norm2.llm | 937.0000 | 14.5592 | 0.6495 | 15.7281 | 493.0000 | 14.5100 | 1.0746 | 7.3900 |
| 89norm2.llm | 563.0000 | 24.8188 | 0.8633 | 15.7759 | 302.0000 | 13.4900 | 1.0361 | 7.4000 |
| 90norm2.llm | 1134.0000 | 11.8995 | 0.5854 | 15.6114 | 606.0000 | 14.4800 | 1.0734 | 7.4200 |
| 91norm2.llm | 834.0000 | 16.5360 | 0.7361 | 15.2210 | 452.0000 | 13.4300 | 1.0338 | 7.4700 |
| 92norm2.llm | 622.0000 | 22.6383 | 1.1292 | 16.8668 | 333.0000 | 14.0800 | 1.0585 | 7.4800 |
| 93norm2.llm | 875.0000 | 15.7931 | 0.7155 | 14.9376 | 467.0000 | 13.9000 | 1.0517 | 7.4800 |
| 94norm2.llm | 583.0000 | 24.2727 | 1.1245 | 16.8980 | 310.0000 | 14.6500 | 1.0797 | 7.4900 |
| 95norm2.llm | 933.0000 | 14.9550 | 0.6153 | 16.0382 | 500.0000 | 14.3900 | 1.0701 | 7.5100 |
| 96norm2.llm | 924.0000 | 14.9719 | 0.7008 | 16.3499 | 501.0000 | 14.3900 | 1.0701 | 7.5200 |
| 97norm2.llm | 671.0000 | 21.2861 | 0.9806 | 15.3832 | 358.0000 | 13.2800 | 1.0280 | 7.5300 |
| 98norm2.llm | 776.0000 | 18.3595 | 0.8475 | 15.6164 | 411.0000 | 13.5600 | 1.0388 | 7.6000 |
| 99norm2.llm | 878.0000 | 16.0991 | 0.6365 | 15.1933 | 475.0000 | 13.5200 | 1.0372 | 7.6000 |
| 100norm2.llm | 868.0000 | 19.8618 | 0.7124 | 16.0368 | 463.0000 | 14.3100 | 1.0671 | 7.4900 |
| 101norm2.llm | 873.0000 | 27.6884 | 0.7917 | 16.1037 | 467.0000 | 13.7700 | 1.0468 | 9.1900 |
| 102norm2.llm | 2110.0000 | 11.1948 | 0.5846 | 17.7600 | 1137.0000 | 19.6800 | 1.2514 | 12.7600 |
| 103norm2.llm | 1146.0000 | 23.4773 | 0.6890 | 15.3355 | 619.0000 | 13.6300 | 1.0415 | 14.3100 |

| Cell Name | TU-Features | | | | Area | CDI-Features | | | pg DNA |
|---|---|---|---|---|---|---|---|---|---|
| | Area | Intensity | Texture | Shape | | Shape1 | Shape2 | | |
| 104norm2.llm | 1062.0000 | 25.5650 | 0.9174 | 16.6950 | 558.0000 | 15.8900 | 1.1245 | | 14.4300 |
| 1norm3.llm | 662.0000 | 31.5967 | 0.9416 | 15.4131 | 356.0000 | 13.5700 | 1.0392 | | 10.8700 |
| 2norm3.llm | 931.0000 | 25.2041 | 0.7704 | 15.4003 | 501.0000 | 13.9800 | 1.0547 | | 12.2400 |
| 3norm3.llm | 1146.0000 | 21.1134 | 0.6810 | 16.5070 | 609.0000 | 15.7300 | 1.1188 | | 12.6600 |
| 4norm3.llm | 1516.0000 | 16.0580 | 0.5672 | 16.6663 | 819.0000 | 15.6800 | 1.1170 | | 12.9700 |
| 5norm3.llm | 1152.0000 | 21.9661 | 0.6350 | 15.3115 | 621.0000 | 13.8700 | 1.0506 | | 13.3100 |
| 6norm3.llm | 1276.0000 | 20.0259 | 0.5936 | 15.1536 | 690.0000 | 13.8500 | 1.0498 | | 13.4300 |
| 7norm3.llm | 1014.0000 | 25.6963 | 0.7331 | 15.9807 | 536.0000 | 15.2700 | 1.1023 | | 13.4900 |
| 8norm3.llm | 647.0000 | 40.9675 | 1.0666 | 15.6948 | 341.0000 | 13.7700 | 1.0468 | | 13.5800 |
| 9norm3.llm | 997.0000 | 26.1565 | 0.8438 | 15.7360 | 536.0000 | 14.3800 | 1.0697 | | 13.6400 |
| 10norm3.llm | 1155.0000 | 22.8225 | 0.5694 | 15.2717 | 618.0000 | 13.4000 | 1.0326 | | 13.8300 |
| 11norm3.llm | 1075.0000 | 24.5042 | 0.6402 | 15.4929 | 569.0000 | 14.9200 | 1.0896 | | 13.8400 |
| 12norm3.llm | 639.0000 | 43.3599 | 1.0454 | 15.5239 | 341.0000 | 13.2800 | 1.0280 | | 14.1600 |
| 13norm3.llm | 957.0000 | 28.6740 | 0.6615 | 15.2765 | 513.0000 | 13.7700 | 1.0468 | | 14.2600 |
| 1norm4.llm | 1384.0000 | 19.1091 | 0.7725 | 16.4865 | 740.0000 | 16.3000 | 1.1389 | | 13.6600 |
| 2norm4.llm | 915.0000 | 29.7541 | 0.7900 | 15.5167 | 483.0000 | 14.4300 | 1.0716 | | 13.6500 |
| 3norm4.llm | 1843.0000 | 14.3728 | 0.5569 | 15.2120 | 997.0000 | 14.4800 | 1.0734 | | 13.8000 |
| 4norm4.llm | 1757.0000 | 16.4178 | 0.6671 | 15.4864 | 963.0000 | 14.4100 | 1.0708 | | 14.9800 |
| 5norm4.llm | 2663.0000 | 10.6864 | 0.5441 | 17.2468 | 1438.0000 | 20.2700 | 1.2701 | | 15.1800 |
| 6norm4.llm | 1338.0000 | 22.3176 | 0.8211 | 16.5507 | 716.0000 | 16.1300 | 1.1330 | | 15.3400 |
| 7norm4.llm | 2140.0000 | 13.9631 | 0.5631 | 15.8492 | 1159.0000 | 15.0800 | 1.0955 | | 15.6200 |
| 8norm4.llm | 1538.0000 | 20.2672 | 0.7191 | 15.1629 | 829.0000 | 13.8200 | 1.0487 | | 15.9300 |
| 9norm4.llm | 1693.0000 | 18.5629 | 0.5542 | 15.6185 | 918.0000 | 14.2300 | 1.0641 | | 16.1100 |
| 10norm4.llm | 2595.0000 | 22.4570 | 0.5070 | 27.4379 | 1442.0000 | 14.5500 | 1.0760 | | 29.9000 |
| 1norm5.llm | 799.0000 | 21.7897 | 0.5657 | 15.3960 | 431.0000 | 13.8100 | 1.0483 | | 10.1100 |
| 2norm5.llm | 1173.0000 | 18.0409 | 0.5346 | 15.3593 | 624.0000 | 14.1100 | 1.0596 | | 12.3000 |
| 3norm5.llm | 719.0000 | 30.5090 | 0.6662 | 15.4795 | 383.0000 | 13.8000 | 1.0479 | | 12.5300 |
| 4norm5.llm | 1225.0000 | 17.9665 | 0.4974 | 15.8625 | 661.0000 | 14.0900 | 1.0589 | | 12.8800 |
| 5norm5.llm | 1292.0000 | 18.0944 | 0.4856 | 15.1666 | 701.0000 | 13.8400 | 1.0495 | | 13.6600 |
| 6norm5.llm | 1248.0000 | 19.0288 | 0.4665 | 15.2336 | 664.0000 | 13.9500 | 1.0536 | | 13.7600 |
| 7norm5.llm | 863.0000 | 27.9177 | 0.6415 | 15.6799 | 462.0000 | 13.7700 | 1.0468 | | 13.8100 |
| 8norm5.llm | 1219.0000 | 19.6833 | 0.6466 | 16.3217 | 644.0000 | 16.5700 | 1.1483 | | 14.0400 |
| 9norm5.llm | 987.0000 | 24.9939 | 0.6710 | 15.5742 | 517.0000 | 14.6700 | 1.0805 | | 14.1000 |

69

| Cell Name | TU-Features ||| | CDI-Features ||||
| | Area | Intensity | Texture | Shape | Area | Shape1 | Shape2 | pg DNA |
|---|---|---|---|---|---|---|---|---|
| 10norm5.IIm | 1678.0000 | 14.5524 | 0.5234 | 15.3921 | 893.0000 | 14.6500 | 1.0797 | 14.2900 |
| 11norm5.IIm | 1185.0000 | 20.7713 | 0.5567 | 15.9075 | 639.0000 | 14.3000 | 1.0668 | 14.2900 |
| 12norm5.IIm | 663.0000 | 38.0694 | 0.9322 | 15.2119 | 357.0000 | 14.0300 | 1.0566 | 14.4500 |
| 13norm5.IIm | 1185.0000 | 21.1840 | 0.5674 | 15.3920 | 637.0000 | 14.0200 | 1.0563 | 14.5800 |
| 14norm5.IIm | 1289.0000 | 19.4942 | 0.5014 | 15.3074 | 699.0000 | 14.4000 | 1.0705 | 14.6400 |

Table 2, Classification for CDI Data

| Seq# | Cell Name | Target | Raw Data | | CDI Features | | TU Features | | TU's + pgDNA | | CDI's + Texture | | Sinusoidal | |
|---|---|---|---|---|---|---|---|---|---|---|---|---|---|---|
| | | | Output | Error | Output | Error | Output | Error | Output | Error | Output | Error | Output | Error |
| 0 | 105abnm1.llm | 1.0000 | 0.3257 | 0.4547 | 0.9980 | 0.0000 | 1.0000 | 0.0000 | 1.0000 | 0.0000 | 1.0000 | 0.0000 | 0.9986 | 0.0000 |
| 1 | 10abnm1.llm | 1.0000 | 0.8866 | 0.0129 | 0.9531 | 0.0022 | 0.1032 | 0.8043 | 0.8289 | 0.0293 | 0.8587 | 0.0200 | 0.7395 | 0.0679 |
| 2 | 10abnm2.llm | 1.0000 | 0.8804 | 0.0143 | 1.0000 | 0.0000 | 1.0000 | 0.0000 | 0.9999 | 0.0000 | 1.0000 | 0.0000 | 0.9959 | 0.0000 |
| 3 | 110abnm1.llm | 1.0000 | 0.9996 | 0.0000 | 0.9994 | 0.0000 | 1.0000 | 0.0000 | 0.9999 | 0.0000 | 1.0000 | 0.0000 | 0.9982 | 0.0000 |
| 4 | 112abnm1.llm | 1.0000 | 0.9853 | 0.0002 | 0.8289 | 0.1377 | 1.0000 | 0.0000 | 1.0000 | 0.0000 | 1.0000 | 0.0000 | 0.9994 | 0.0000 |
| 5 | 119abnm1.llm | 1.0000 | 0.8525 | 0.0218 | 0.9717 | 0.0008 | 1.0000 | 0.0000 | 1.0000 | 0.0000 | 1.0000 | 0.0000 | 0.9999 | 0.0000 |
| 6 | 120abnm1.llm | 1.0000 | 0.9976 | 0.0000 | 0.2565 | 0.5529 | 1.0000 | 0.0000 | 1.0000 | 0.0000 | 1.0000 | 0.0000 | 0.9987 | 0.0000 |
| 7 | 125abnm1.llm | 1.0000 | 0.9996 | 0.0000 | 0.2227 | 0.6042 | 1.0000 | 0.0000 | 1.0000 | 0.0000 | 1.0000 | 0.0000 | 0.9995 | 0.0000 |
| 8 | 132abnm1.llm | 1.0000 | 0.9868 | 0.0002 | 0.9651 | 0.0012 | 1.0000 | 0.0000 | 1.0000 | 0.0000 | 1.0000 | 0.0000 | 0.9937 | 0.0000 |
| 9 | 133abnm1.llm | 1.0000 | 0.9733 | 0.0007 | 0.9606 | 0.0015 | 1.0000 | 0.0000 | 1.0000 | 0.0000 | 1.0000 | 0.0000 | 0.9977 | 0.0000 |
| 10 | 138abnm1.llm | 1.0000 | 0.9982 | 0.0000 | 0.9610 | 0.0015 | 1.0000 | 0.0000 | 0.9997 | 0.0000 | 1.0000 | 0.0000 | 0.9995 | 0.0000 |
| 11 | 13abnm1.llm | 1.0000 | 0.9358 | 0.0041 | 1.0000 | 0.0000 | 1.0000 | 0.0000 | 1.0000 | 0.0000 | 1.0000 | 0.0000 | 1.0000 | 0.0000 |
| 12 | 140abnm1.llm | 1.0000 | 0.9985 | 0.0000 | 0.9608 | 0.0015 | 1.0000 | 0.0000 | 0.9989 | 0.0000 | 1.0000 | 0.0000 | 0.9840 | 0.0003 |
| 13 | 141abnm1.llm | 1.0000 | 0.9987 | 0.0000 | 0.9609 | 0.0015 | 1.0000 | 0.0000 | 0.9994 | 0.0000 | 1.0000 | 0.0000 | 0.9880 | 0.0001 |
| 14 | 146abnm1.llm | 1.0000 | 0.9786 | 0.0005 | 0.9609 | 0.0015 | 1.0000 | 0.0000 | 1.0000 | 0.0000 | 1.0000 | 0.0000 | 0.9992 | 0.0000 |
| 15 | 152abnm1.llm | 1.0000 | 1.0000 | 0.0000 | 0.9609 | 0.0015 | 1.0000 | 0.0000 | 0.9996 | 0.0000 | 0.9741 | 0.0007 | 0.9990 | 0.0000 |
| 16 | 156abnm1.llm | 1.0000 | 0.9552 | 0.0020 | 0.9609 | 0.0015 | 1.0000 | 0.0000 | 1.0000 | 0.0000 | 0.9741 | 0.0007 | 0.9999 | 0.0000 |
| 17 | 158abnm1.llm | 1.0000 | 0.4619 | 0.2896 | 0.9609 | 0.0015 | 1.0000 | 0.0000 | 1.0000 | 0.0000 | 0.9915 | 0.0000 | 0.9998 | 0.0000 |
| 18 | 159abnm1.llm | 1.0000 | 0.1416 | 0.7369 | 0.9609 | 0.0015 | 1.0000 | 0.0000 | 0.9995 | 0.0000 | 0.9741 | 0.0007 | 0.9993 | 0.0000 |
| 19 | 162abnm1.llm | 1.0000 | 0.9999 | 0.0000 | 0.9609 | 0.0015 | 1.0000 | 0.0000 | 1.0000 | 0.0000 | 0.9680 | 0.0010 | 0.9998 | 0.0000 |
| 20 | 180abnm1.llm | 1.0000 | 0.9997 | 0.0000 | 0.9245 | 0.0057 | 0.9898 | 0.0001 | 0.7857 | 0.0459 | 1.0000 | 0.0000 | 1.0000 | 0.0000 |
| 21 | 20abnm1.llm | 1.0000 | 0.0001 | 0.9997 | 0.3701 | 0.3968 | 1.0000 | 0.0000 | 0.8172 | 0.0334 | 0.1499 | 0.7226 | 0.3710 | 0.3956 |
| 22 | 21abnm1.llm | 1.0000 | 0.9998 | 0.0000 | 0.6686 | 0.1098 | 1.0000 | 0.0000 | 1.0000 | 0.0000 | 1.0000 | 0.0000 | 0.9970 | 0.0000 |
| 23 | 23abnm1.llm | 1.0000 | 0.9977 | 0.0000 | 0.9517 | 0.0023 | 1.0000 | 0.0000 | 0.9993 | 0.0000 | 0.9708 | 0.0009 | 0.9794 | 0.0004 |
| 24 | 28abnm2.llm | 1.0000 | 0.3269 | 0.4531 | 0.9917 | 0.0001 | 0.3950 | 0.3661 | 1.0000 | 0.0000 | 1.0000 | 0.0000 | 0.9997 | 0.0000 |
| 25 | 29abnm1.llm | 1.0000 | 0.9998 | 0.0000 | 0.9937 | 0.0000 | 0.9996 | 0.0000 | 0.8139 | 0.0346 | 0.9745 | 0.0007 | 0.6979 | 0.0913 |
| 26 | 30abnm1.llm | 1.0000 | 0.1431 | 0.7342 | 0.9979 | 0.0000 | 0.9934 | 0.0000 | 0.9995 | 0.0000 | 0.9615 | 0.0015 | 0.9512 | 0.0024 |
| 27 | 37abnm1.llm | 1.0000 | 0.2709 | 0.5316 | 0.1006 | 0.8089 | 0.9844 | 0.0002 | 0.9834 | 0.0003 | 0.9998 | 0.0000 | 0.9375 | 0.0039 |
| 28 | 3abnm1.llm | 1.0000 | 0.0018 | 0.9965 | 1.0000 | 0.0000 | 1.0000 | 0.0000 | 0.9484 | 0.0027 | 0.1499 | 0.7226 | 0.9078 | 0.0085 |
| 29 | 3abnm2.llm | 1.0000 | 0.2415 | 0.5754 | 0.9875 | 0.0002 | 0.9655 | 0.0012 | 1.0000 | 0.0000 | 1.0000 | 0.0000 | 0.9998 | 0.0000 |
| 30 | 44abnm1.llm | 1.0000 | 0.7599 | 0.0576 | 0.9997 | 0.0000 | 1.0000 | 0.0000 | 1.0000 | 0.0000 | 0.9695 | 0.0009 | 1.0000 | 0.0000 |
| 31 | 48abnm1.llm | 1.0000 | 0.0011 | 0.9979 | 0.9997 | 0.0000 | 1.0000 | 0.0000 | 0.9949 | 0.0000 | 0.9983 | 0.0000 | 0.6934 | 0.0940 |
| 32 | 51abnm2.llm | 1.0000 | 0.3849 | 0.3783 | 0.9610 | 0.0015 | 1.0000 | 0.0000 | 1.0000 | 0.0000 | 1.0000 | 0.0000 | 0.9946 | 0.0000 |

| Seq# | Cell Name | Target | Raw Data | | CDI Features | | TU Features | | TU's + pgDNA | | CDI's + Texture | | Sinusoidal | |
|---|---|---|---|---|---|---|---|---|---|---|---|---|---|---|
| | | | Output | Error | Output | Error | Output | Error | Output | Error | Output | Error | Output | Error |
| 33 | 52abnm2.llm | 1.0000 | 0.9926 | 0.0001 | 0.9610 | 0.0015 | 1.0000 | 0.0000 | 1.0000 | 0.0000 | 1.0000 | 0.0000 | 0.9955 | 0.0000 |
| 34 | 54abnm1.llm | 1.0000 | 0.0995 | 0.8108 | 0.9998 | 0.0000 | 0.6782 | 0.1035 | 0.9501 | 0.0025 | 0.9859 | 0.0002 | 0.4559 | 0.2960 |
| 35 | 59abnm2.llm | 1.0000 | 0.3938 | 0.3675 | 0.9609 | 0.0015 | 1.0000 | 0.0000 | 1.0000 | 0.0000 | 0.9741 | 0.0007 | 0.9981 | 0.0000 |
| 36 | 5abnm1.llm | 1.0000 | 0.0072 | 0.9856 | 0.2827 | 0.5145 | 0.9999 | 0.0000 | 0.9906 | 0.0001 | 0.6020 | 0.1584 | 0.9469 | 0.0028 |
| 37 | 60abnm2.llm | 1.0000 | 0.9925 | 0.0001 | 0.9609 | 0.0015 | 1.0000 | 0.0000 | 1.0000 | 0.0000 | 1.0000 | 0.0000 | 0.9999 | 0.0000 |
| 38 | 61abnm2.llm | 1.0000 | 1.0000 | 0.0000 | 0.9609 | 0.0015 | 1.0000 | 0.0000 | 1.0000 | 0.0000 | 1.0000 | 0.0000 | 0.9297 | 0.0049 |
| 39 | 62abnm2.llm | 1.0000 | 0.9764 | 0.0006 | 0.9609 | 0.0015 | 1.0000 | 0.0000 | 0.9999 | 0.0000 | 0.9741 | 0.0007 | 0.9998 | 0.0000 |
| 40 | 64abnm2.llm | 1.0000 | 0.8428 | 0.0033 | 0.9609 | 0.0015 | 1.0000 | 0.0000 | 1.0000 | 0.0000 | 1.0000 | 0.0000 | 0.9996 | 0.0000 |
| 41 | 77abnm1.llm | 1.0000 | 0.9522 | 0.0023 | 1.0000 | 0.0000 | 1.0000 | 0.0000 | 1.0000 | 0.0000 | 1.0000 | 0.0000 | 0.9991 | 0.0000 |
| 42 | 78abnm2.llm | 1.0000 | 1.0000 | 0.0000 | 0.9609 | 0.0015 | 1.0000 | 0.0000 | 0.9998 | 0.0000 | 0.9741 | 0.0007 | 0.9991 | 0.0000 |
| 43 | 79abnm1.llm | 1.0000 | 0.7383 | 0.0696 | 1.0000 | 0.0000 | 1.0000 | 0.0000 | 0.9988 | 0.0000 | 1.0000 | 0.0000 | 0.9955 | 0.0000 |
| 44 | 79abnm2.llm | 1.0000 | 0.9999 | 0.0000 | 1.0000 | 0.0000 | 1.0000 | 0.0000 | 1.0000 | 0.0000 | 0.9741 | 0.0007 | 0.9948 | 0.0000 |
| 45 | 7abnm.llm | 1.0000 | 0.9997 | 0.0000 | 0.9609 | 0.0015 | 1.0000 | 0.0000 | 1.0000 | 0.0000 | 1.0000 | 0.0000 | 0.0004 | 0.9993 |
| 46 | 82abnm2.llm | 1.0000 | 1.0000 | 0.0000 | 0.9609 | 0.0015 | 1.0000 | 0.0000 | 0.9996 | 0.0000 | 0.9741 | 0.0007 | 0.6918 | 0.0950 |
| 47 | 83abnm1.llm | 1.0000 | 1.0000 | 0.0000 | 0.9542 | 0.0021 | 1.0000 | 0.0000 | 1.0000 | 0.0000 | 0.9741 | 0.0007 | 0.9993 | 0.0000 |
| 48 | 88abnm1.llm | 1.0000 | 0.0001 | 0.9997 | 0.9999 | 0.0000 | 1.0000 | 0.0000 | 1.0000 | 0.0000 | 1.0000 | 0.0000 | 0.9993 | 0.0000 |
| 49 | 92abnm1.llm | 1.0000 | 0.9989 | 0.0000 | 0.8809 | 0.0142 | 1.0000 | 0.0000 | 1.0000 | 0.0000 | 1.0000 | 0.0000 | 0.9980 | 0.0000 |
| 50 | 9abnm1.llm | 1.0000 | 0.3620 | 0.4070 | 1.0000 | 0.0000 | 1.0000 | 0.0000 | 0.9958 | 0.0000 | 0.9758 | 0.0006 | 0.9164 | 0.0070 |
| 51 | 9abnm2.llm | 1.0000 | 0.9133 | 0.0075 | 0.4105 | 0.1685 | 1.0000 | 0.0000 | 1.0000 | 0.0000 | 1.0000 | 0.0000 | 1.0000 | 0.0000 |
| 52 | 101norm1.llm | 0.0000 | 0.0274 | 0.0007 | 0.9663 | 0.9337 | 0.0004 | 0.0000 | 0.0040 | 0.0000 | 0.0000 | 0.0000 | 0.0467 | 0.0022 |
| 53 | 104norm1.llm | 0.0000 | 0.4975 | 0.2475 | 0.0000 | 0.0000 | 1.0000 | 1.0000 | 0.2887 | 0.0833 | 1.0000 | 1.0000 | 0.9545 | 0.9111 |
| 54 | 10norm1.llm | 0.0000 | 0.0017 | 0.0000 | 0.2146 | 0.0460 | 0.0000 | 0.0000 | 0.0000 | 0.0000 | 0.0000 | 0.0000 | 0.0072 | 0.0001 |
| 55 | 10norm3.llm | 0.0000 | 0.9828 | 0.9659 | 0.9684 | 0.9378 | 0.0000 | 0.0000 | 0.0006 | 0.0000 | 0.0000 | 0.0000 | 0.0010 | 0.0000 |
| 56 | 11norm3.llm | 0.0000 | 0.7177 | 0.5151 | 0.2153 | 0.0464 | 0.0000 | 0.0000 | 0.0038 | 0.0000 | 0.0000 | 0.0000 | 0.0023 | 0.0000 |
| 57 | 11norm5.llm | 0.0000 | 0.3818 | 0.1458 | 0.0001 | 0.0000 | 0.0010 | 0.0000 | 0.0005 | 0.0000 | 0.0000 | 0.0000 | 0.0045 | 0.0000 |
| 58 | 12norm1.llm | 0.0000 | 0.0003 | 0.0000 | 0.2140 | 0.0458 | 0.0000 | 0.0000 | 0.0000 | 0.0000 | 0.0000 | 0.0000 | 0.0109 | 0.0001 |
| 59 | 12norm2.llm | 0.0000 | 0.0017 | 0.0000 | 0.2111 | 0.0448 | 0.0009 | 0.0000 | 0.0002 | 0.0000 | 0.0000 | 0.0000 | 0.0059 | 0.0000 |
| 60 | 13norm3.llm | 0.0000 | 0.9735 | 0.9477 | 0.9999 | 0.9998 | 0.1288 | 0.0166 | 0.0059 | 0.0000 | 0.0003 | 0.0000 | 0.0005 | 0.0000 |
| 61 | 13norm5.llm | 0.0000 | 0.7979 | 0.6366 | 0.9784 | 0.9572 | 0.0000 | 0.0000 | 0.0062 | 0.0000 | 0.0000 | 0.0000 | 0.0016 | 0.0000 |
| 62 | 1norm3.llm | 0.0000 | 0.7734 | 0.5981 | 1.0000 | 0.9999 | 0.0000 | 0.0000 | 0.0000 | 0.0000 | 1.0000 | 1.0000 | 0.0109 | 0.0000 |
| 63 | 1norm4.llm | 0.0000 | 0.7464 | 0.5572 | 0.0000 | 0.0000 | 0.0000 | 0.0000 | 0.0000 | 0.0000 | 0.0000 | 0.0000 | 0.1729 | 0.0299 |
| 64 | 1norm5.llm | 0.0000 | 0.1984 | 0.0394 | 1.0000 | 0.9999 | 0.0000 | 0.0000 | 0.0000 | 0.0000 | 0.0003 | 0.0000 | 0.8893 | 0.7908 |
| 65 | 20norm2.llm | 0.0000 | 0.0003 | 0.0000 | 0.0001 | 0.0000 | 0.0000 | 0.0000 | 0.0000 | 0.0000 | 0.0000 | 0.0000 | 0.0203 | 0.0004 |
| | | | | | | | | | | | | | 0.0050 | 0.0000 |

72

| Seq# | Cell Name | Target | Raw Data Output | Raw Data Error | CDI Features Output | CDI Features Error | TU Features Output | TU Features Error | TU's + pgDNA Output | TU's + pgDNA Error | CDI's + Texture Output | CDI's + Texture Error | Sinusoidal Output | Sinusoidal Error |
|---|---|---|---|---|---|---|---|---|---|---|---|---|---|---|
| 66 | 21norm2.IIm | 0.0000 | 0.0001 | 0.0000 | 0.0064 | 0.0000 | 0.0000 | 0.0000 | 0.0000 | 0.0000 | 0.0000 | 0.0000 | 0.0062 | 0.0000 |
| 67 | 23norm2.IIm | 0.0000 | 0.0000 | 0.0000 | 0.0003 | 0.0000 | 0.0000 | 0.0000 | 0.0000 | 0.0000 | 0.0000 | 0.0000 | 0.0157 | 0.0002 |
| 68 | 25norm2.IIm | 0.0000 | 0.0023 | 0.0000 | 0.0225 | 0.0005 | 0.0002 | 0.0000 | 0.0002 | 0.0000 | 0.0014 | 0.0000 | 0.2320 | 0.0538 |
| 69 | 29norm1.IIm | 0.0000 | 0.8627 | 0.7443 | 0.0001 | 0.0000 | 0.0000 | 0.0000 | 0.0000 | 0.0000 | 0.0002 | 0.0000 | 0.0276 | 0.0008 |
| 70 | 30norm1.IIm | 0.0000 | 0.3761 | 0.1414 | 0.0984 | 0.0097 | 0.0481 | 0.0023 | 0.0000 | 0.0000 | 0.0000 | 0.0000 | 0.7610 | 0.5792 |
| 71 | 37norm1.IIm | 0.0000 | 0.0011 | 0.0000 | 0.0001 | 0.0000 | 0.0000 | 0.0000 | 0.0001 | 0.0000 | 0.0000 | 0.0000 | 0.0582 | 0.0034 |
| 72 | 3norm1.IIm | 0.0000 | 0.0007 | 0.0000 | 0.0001 | 0.0000 | 0.0000 | 0.0000 | 0.0000 | 0.0000 | 0.0000 | 0.0000 | 0.0046 | 0.0000 |
| 73 | 40norm1.IIm | 0.0000 | 0.0234 | 0.0005 | 0.0003 | 0.0000 | 0.0000 | 0.0000 | 0.0000 | 0.0000 | 0.0000 | 0.0000 | 0.0323 | 0.0010 |
| 74 | 41norm1.IIm | 0.0000 | 0.2489 | 0.0620 | 0.0005 | 0.0000 | 0.0000 | 0.0000 | 0.0000 | 0.0000 | 0.0000 | 0.0000 | 0.0433 | 0.0019 |
| 75 | 45norm1.IIm | 0.0000 | 0.0001 | 0.0000 | 0.0028 | 0.0000 | 0.9998 | 0.9997 | 0.0588 | 0.0035 | 0.0230 | 0.0005 | 0.9855 | 0.9712 |
| 76 | 47norm1.IIm | 0.0000 | 0.0241 | 0.0006 | 0.0043 | 0.0000 | 0.0189 | 0.0004 | 0.0373 | 0.0014 | 0.0252 | 0.0006 | 0.4245 | 0.1802 |
| 77 | 51norm1.IIm | 0.0000 | 0.0040 | 0.0000 | 0.0009 | 0.0000 | 0.0000 | 0.0000 | 0.0001 | 0.0000 | 0.0001 | 0.0000 | 0.0331 | 0.0011 |
| 78 | 53norm1.IIm | 0.0000 | 0.1773 | 0.0314 | 0.5048 | 0.2549 | 1.0000 | 1.0000 | 0.2157 | 0.0465 | 0.0907 | 0.0082 | 0.9539 | 0.9100 |
| 79 | 55norm1.IIm | 0.0000 | 0.0377 | 0.0014 | 0.9996 | 0.9992 | 0.9925 | 0.9850 | 0.9801 | 0.9606 | 0.9936 | 0.9872 | 0.9117 | 0.8311 |
| 80 | 5norm1.IIm | 0.0000 | 0.0019 | 0.0000 | 0.0000 | 0.0000 | 0.0000 | 0.0000 | 0.0000 | 0.0000 | 0.0000 | 0.0000 | 0.0230 | 0.0005 |
| 81 | 62norm1.IIm | 0.0000 | 0.9989 | 0.9978 | 0.9557 | 0.9133 | 0.9862 | 0.9726 | 0.8126 | 0.6604 | 0.0000 | 0.0000 | 0.6731 | 0.4531 |
| 82 | 69norm2.IIm | 0.0000 | 0.0742 | 0.0055 | 0.1578 | 0.0249 | 0.0002 | 0.0000 | 0.0000 | 0.0000 | 0.0183 | 0.0003 | 0.6111 | 0.3735 |
| 83 | 70norm1.IIm | 0.0000 | 0.0044 | 0.0000 | 0.0009 | 0.0000 | 0.0000 | 0.0000 | 0.0000 | 0.0000 | 0.0000 | 0.0000 | 0.0111 | 0.0001 |
| 84 | 72norm2.IIm | 0.0000 | 0.0005 | 0.0000 | 0.0005 | 0.0000 | 0.0000 | 0.0000 | 0.0001 | 0.0000 | 0.0000 | 0.0000 | 0.0154 | 0.0002 |
| 85 | 73norm1.IIm | 0.0000 | 0.0000 | 0.0000 | 0.0007 | 0.0000 | 0.0000 | 0.0000 | 0.0003 | 0.0000 | 0.0000 | 0.0000 | 0.0291 | 0.0008 |
| 86 | 7norm5.IIm | 0.0000 | 0.8436 | 0.7117 | 0.2260 | 0.0511 | 0.0000 | 0.0000 | 0.0035 | 0.0000 | 0.0000 | 0.0000 | 0.0019 | 0.0000 |
| 87 | 87norm2.IIm | 0.0000 | 0.0858 | 0.0074 | 0.1565 | 0.0245 | 0.0000 | 0.0000 | 0.0038 | 0.0000 | 0.0633 | 0.0000 | 0.0607 | 0.0037 |
| 88 | 89norm2.IIm | 0.0000 | 0.0053 | 0.0000 | 0.1772 | 0.0314 | 0.0000 | 0.0000 | 0.0000 | 0.0000 | 0.2516 | 0.0633 | 0.1409 | 0.0198 |
| 89 | 8norm2.IIm | 0.0000 | 0.0081 | 0.0000 | 0.0007 | 0.0000 | 0.0000 | 0.0000 | 0.0000 | 0.0000 | 0.0000 | 0.0000 | 0.0082 | 0.0001 |
| 90 | 92norm2.IIm | 0.0000 | 0.0360 | 0.0013 | 0.5371 | 0.2885 | 0.0057 | 0.0000 | 0.4679 | 0.2190 | 0.3786 | 0.1433 | 0.5611 | 0.3148 |
| 91 | 9norm1.IIm | 0.0000 | 0.0009 | 0.0000 | 0.0000 | 0.0000 | 0.0000 | 0.0000 | 0.0000 | 0.0001 | 0.0000 | 0.0000 | 0.0410 | 0.0017 |
| 92 | 9norm5.IIm | 0.0000 | 0.9881 | 0.9762 | 0.8638 | 0.9289 | 0.0000 | 0.0000 | 0.0084 | 0.0001 | 0.0000 | 0.0000 | 0.0048 | 0.0000 |
| 93 | 148abnm1.IIm | 1.0000 | | | 0.9609 | 0.0015 | 0.8126 | 0.0351 | 0.9967 | 0.0000 | 0.0000 | 0.0000 | | |
| 94 | 154abnm1.IIm | 1.0000 | | | 0.9609 | 0.0015 | 1.0000 | 0.0000 | 0.9882 | 0.0001 | 1.0000 | 0.0000 | | |
| 95 | 179abnm1.IIm | 1.0000 | | | 0.9609 | 0.0015 | 1.0000 | 0.0000 | 0.9999 | 0.0000 | 1.0000 | 0.0000 | | |
| 96 | 181abnm1.IIm | 1.0000 | | | 0.9609 | 0.0015 | 1.0000 | 0.0000 | 1.0000 | 0.0000 | 0.9741 | 0.0007 | | |
| 97 | 182abnm1.IIm | 1.0000 | | | 0.9609 | 0.0015 | 1.0000 | 0.0000 | 0.9983 | 0.0000 | 0.9741 | 0.0007 | | |
| | | | Score: 72% | | Score: 84.6% | | Score: 92.8% | | Score: 97.9% | | Score: 95.9% | | Score: 87.9% | |

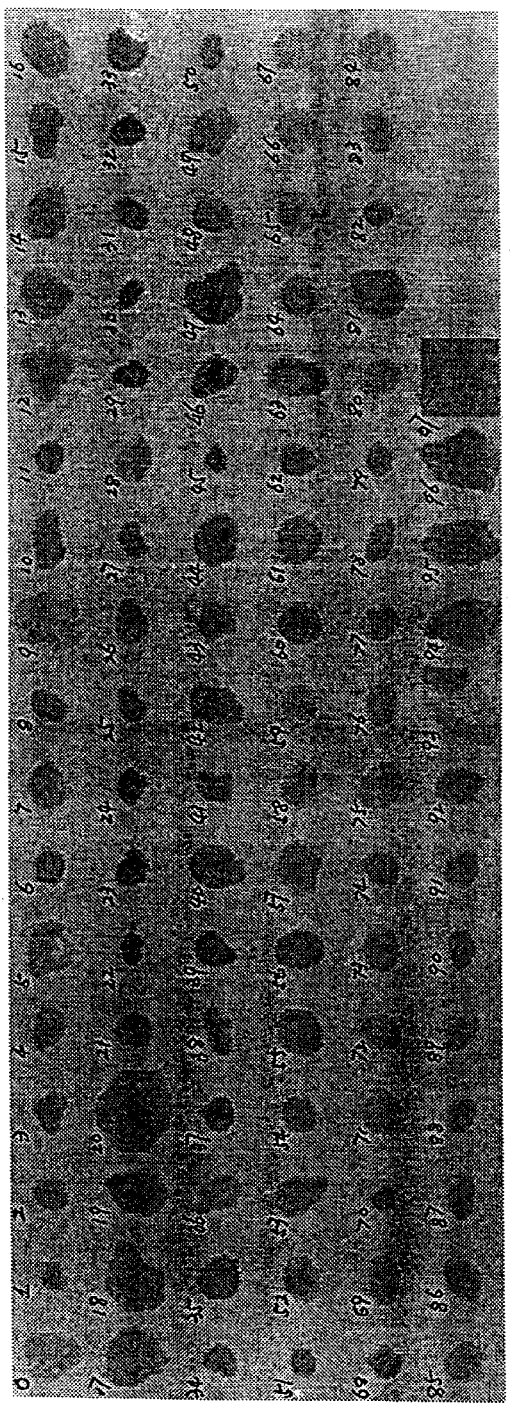

We claim:

1. A program storage device having a computer readable program code embodied therein for classifying an unknown tissue cell, said program storage device comprising:

a first computer readable code, said first computer readable code implementing a neural network having a plurality of neurons, said neural network having a plurality of interconnections coupling said plurality of neurons;

a second computer readable code, said second computer readable code having a plurality of weight factors representative of said interconnections, said weight factors having been derived by training said neural network on a training data set representative of a plurality of imaging variables from a known tissue cell, said imaging variables comprising an area, an average intensity, a shape, a texture, and a DNA content; and a third computer readable code, said third computer readable code capable of applying a sample data set from said unknown tissue cell representative of said plurality of imaging variables to said weight factors of said second computer readable code for classifying said tissue cell as normal or abnormal.

2. The program storage device of claim 1, wherein each of said neurons has an activation function, said activation comprising sinusoid, gaussian, and sigmoid functions.

3. The program storage device of claim 2, wherein said neural network has a plurality of said activation functions.

4. The program storage device of claim 2, wherein said activation function is flattened.

5. The program storage device of claim 1, wherein each of said plurality of neurons comprises:

a fourth computer readable code representative of a plurality of input ports, each of said input ports capable of storing an input value and a corresponding weight value selected from said weight factors;

a fifth computer readable code representative of an accumulator, said accumulator capable of generating an output by summing each multiplication of said input value and said corresponding weight value of each of said plurality of input ports; and a sixth computer readable code representative of a function generator having a plurality of activation functions, said function generator capable of applying one of said plurality of activation functions to the output of said accumulator to generate an output value for said neuron.

6. A program storage device readable by a machine, tangibly embodying a program of instructions executable by the machine to perform a method of detecting the presence of an abnormality in an unknown tissue cell, said method comprising the steps of:

applying a sample data set from said unknown tissue cell to a neural network, said sample data set being representative of a plurality of imaging variables from said unknown tissue cell, said imaging variables comprising an area, an average intensity, a shape, a texture, and a DNA content, said neural network having been trained to detect the presence of said abnormality on a training data set from a known tissue cell representative of said plurality of imaging variables; and classifying said tissue cell as normal or abnormal based on said training of said neural network.

7. An apparatus for classifying an unknown tissue cell, said apparatus comprising:

a plurality of data buffers, said data buffers capable of storing data corresponding to a plurality of imaging variables from said unknown tissue cell, said imaging variables comprising an area, an average intensity, a shape, a texture and a DNA content;

a neural network, said neural network coupled with said plurality of data buffers, said neural network having been trained on a training data representative of said imaging variables from a known tissue cell, said neural network classifying said unknown tissue cell as normal or abnormal based on said training of said neural network.

* * * * *